US012654415B2

(12) United States Patent (10) Patent No.: US 12,654,415 B2

Jennings et al. (45) Date of Patent: Jun. 16, 2026

(54) SHAPED OPTICAL FILMS AND METHODS OF SHAPING OPTICAL FILMS

(71) Applicant: 3M INNOVATIVE PROPERTIES COMPANY, St. Paul, MN (US)

(72) Inventors: Robert M. Jennings, Shoreview, MN (US); William T. Fay, Woodbury, MN (US); Jo A. Etter, Stillwater, MN (US); Arthur L. Kotz, Woodbury, MN (US); David J. W. Aastuen, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 295 days.

(21) Appl. No.: 18/522,621

(22) Filed: Nov. 29, 2023

(65) Prior Publication Data

US 2024/0165907 A1 May 23, 2024

Related U.S. Application Data

(63) Continuation of application No. 17/744,917, filed on May 16, 2022, now Pat. No. 11,865,808, which is a (Continued)

(51) Int. Cl.
| | |
|---|---|
| *B32B 1/00* | (2024.01) |
| *B29C 51/42* | (2006.01) |
| *B29D 11/00* | (2006.01) |

(52) U.S. Cl.
CPC .............. *B32B 1/00* (2013.01); *B29C 51/428* (2013.01); *B29D 11/00644* (2013.01);

(Continued)

(58) Field of Classification Search
CPC ... B32B 1/00; B29C 51/428; B29D 11/00644; B29D 11/0073; B29D 11/00932
See application file for complete search history.

(56) References Cited

U.S. PATENT DOCUMENTS

| | | | |
|---|---|---|---|
| 3,766,702 A | 10/1973 | Meissner et al. | |
| 5,435,963 A | 7/1995 | Rackovan et al. | |

(Continued)

FOREIGN PATENT DOCUMENTS

| | | |
|---|---|---|
| CN | 107272105 A | 10/2017 |
| FR | 2600936 A1 | 1/1988 |

(Continued)

OTHER PUBLICATIONS

International Search report for PCT International Application No. PCT/IB2018/058253 mailed on Mar. 22, 2019, 5 pages.

*Primary Examiner* — Mathieu D Vargot

(74) *Attorney, Agent, or Firm* — Clifton F. Richardson

(57) ABSTRACT

An optical film includes a plurality of polymeric layers shaped along orthogonal first and second directions. A first curve being an intersection of the optical film with a first plane orthogonal to the second direction and to a reference plane has a best-fit first circular arc subtending a first angle at a center of curvature of the first circular arc of greater than 180 degrees where the optical film has a maximum projected area in the reference plane. A second curve being an inter-section of the optical film with a second plane orthogonal to the first direction and to the reference plane has a best-fit second circular arc subtending a second angle at a center of curvature of the second circular arc of at least 30 degrees. Reflectance and transmittance of the optical film are described.

15 Claims, 49 Drawing Sheets

Related U.S. Application Data continuation of application No. 16/754,825, filed as application No. PCT/IB2018/058253 on Oct. 23, 2018, now Pat. No. 11,358,355.

(60) Provisional application No. 62/578,135, filed on Oct. 27, 2017.

(52) U.S. Cl.
CPC .... *B29D 11/0073* (2013.01); *B29D 11/00932* (2013.01); *B32B 2307/416* (2013.01)

(56)                 References Cited

U.S. PATENT DOCUMENTS

| | | | |
|---|---|---|---|
| 5,882,774 A | 3/1999 | Jonza et al. | |
| 6,609,795 B2 | 8/2003 | Weber et al. | |
| 6,843,762 B2 | 1/2005 | Munche et al. | |
| 6,916,440 B2 | 7/2005 | Jackson et al. | |
| 6,991,695 B2 | 1/2006 | Tait et al. | |
| 2010/0254002 A1 | 10/2010 | Merrill et al. | |
| 2010/0258249 A1 | 10/2010 | Kitada et al. | |
| 2017/0068100 A1 | 3/2017 | Ouderkirk et al. | |
| 2020/0241187 A1* | 7/2020 | Jennings | G02B 27/142 |

FOREIGN PATENT DOCUMENTS

| | | | |
|---|---|---|---|
| KR | 20110114593 A | 10/2011 |
| KR | 20120101401 A | 9/2012 |
| KR | 20160054517 A | 5/2016 |
| KR | 20170056016 A | 5/2017 |
| WO | 2019073329 A1 | 4/2009 |
| WO | 2018163009 A1 | 9/2018 |

* cited by examiner

873

Position

Position

- ⋅⋅+⋅⋅ Left Edge, y=-20mm
- --▣-- Mid Left, y=-10mm
- —— Center, y=0mm
- --⊙-- Mid Right, y=10mm
- ⋅⋅✕⋅⋅ Right Edge, y=20mm Condition 4 x Position [mm]

Thickness [mm]

SHAPED OPTICAL FILMS AND METHODS OF SHAPING OPTICAL FILMS

CROSS REFERENCE TO RELATED APPLICATIONS

This application is a continuation of U.S. application Ser. No. 17/744,917, filed May 16, 2022, now U.S. Pat. No. 11,865,808, which is a continuation of U.S. application Ser. No. 16/754,825, filed Apr. 9, 2020, now U.S. Pat. No. 11,358,355, which is a national stage filing under 35 U.S.C. 371 of PCT/IB2018/058253, filed Oct. 23, 2018, which claims the benefit of Provisional Application No. 62/578, 135, filed Oct. 27, 2017, the disclosures of which are incorporated by reference in their entireties herein.

BACKGROUND

An optical film can be thermoformed into a curved shape.

SUMMARY

In some aspects of the present description, a method of shaping an optical film is provided. The method includes the steps of: disposing the optical film adjacent first and second rollers such that a first portion of the optical film contacts the first roller and a second portion of the optical film contacts the second roller, where the first and second rollers are spaced apart along a first direction and the first portion of the optical film has a first width along a second direction orthogonal to the first direction; securing opposing first and second ends of the optical film, where the first and second ends are spaced apart along the first direction and the first and second portions are disposed between the first and second ends; providing a curved mold surface; and shaping the optical film by contacting the optical film with the curved mold surface while stretching the optical film along the first direction. The shaping step includes keeping a threshold distance between closest first and second points less than about the first width where the first point on the optical film contacts the first roller and the second point on the optical film contacts the curved mold surface.

In some aspects of the present description, a method of shaping an optical film is provided. The method includes the steps of: disposing the optical film adjacent first and second rollers such that a first portion of the optical film contacts the first roller and a second portion of the optical film contacts the second roller, where the first and second rollers spaced are apart along a first direction and the first portion of the optical film has a first width along a second direction orthogonal to the first direction; securing opposing first and second ends of the optical film where the first and second ends are spaced apart along the first direction and the first and second portions are disposed between the first and second ends; providing a curved mold surface; and shaping the optical film by contacting the optical film with the curved mold surface while stretching the optical film along the first direction. The shaping step includes changing a separation distance between the first and second rollers along the first direction to reduce buckling of the optical film between the first and second rollers and along the second direction between and away from longitudinal edges of the optical film.

In some aspects of the present description, a method of shaping an optical film is provided. The method includes the steps of: securing opposing first and second ends of the optical film where the first and second ends are spaced apart along a first direction; securing opposing third and fourth ends of the optical film where the third and fourth ends are spaced apart along a second direction orthogonal to the first direction; providing a curved mold surface; and shaping the optical film by contacting the optical film with the curved mold surface while stretching the optical film, resulting in a curved optical film curved along at least the first direction. Stretching the optical film during the shaping step includes stretching the optical film along the first direction greater than 3 times any stretching along the second direction.

In some aspects of the present description, a curved optical film including a plurality of polymeric layers shaped along orthogonal first and second directions is provided. A first curve being an intersection of the optical film with a first plane orthogonal to the second direction and to a reference plane has a best-fit first circular arc subtending a first angle at a center of curvature of the first circular arc of greater than 180 degrees where the optical film has a maximum projected area in the reference plane. A second curve being an intersection of the optical film with a second plane orthogonal to the first direction and to the reference plane has a best-fit second circular arc subtending a second angle at a center of curvature of the second circular arc of at least 30 degrees. Each location across at least 90% of a total area of the optical film has a reflectance greater than about 80% and a transmittance less than about 2% for normally incident light having a same predetermined wavelength and a same first polarization state.

In some aspects of the present description, a curved optical film including a plurality of polymeric layers shaped along orthogonal first and second directions is provided. A first curve being an intersection of the optical film with a first plane orthogonal to the second direction and to a reference plane has a best-fit first circular arc subtending a first angle at a center of curvature of the first circular arc of at least 90 degrees where the optical film has a maximum projected area in the reference plane. A second curve being an intersection of the optical film with a second plane orthogonal to the first direction and to the reference plane has a best-fit second circular arc subtending a second angle at a center of curvature of the second circular arc of at least 30 degrees. Each location across at least 90% of a total area of the optical film has a reflectance greater than about 80% and a transmittance less than about 2% for normally incident light having a same predetermined wavelength and a same first polarization state. The first curve passes through a center of the optical film. The optical film has a first thickness at a first location along the first curve and a second thickness at a second location along the first curve, where the second location is separated from the first location by a distance along the first curve of at least 0.7 times a radius $R1$ of the best-fit first circular arc, a distance from the center of the optical film to the first location along the first curve is no more than 0.2 $R1$, and a distance from the second location to an edge of the optical film along the first curve being no more than 0.2 $R1$. The first and second thicknesses differ by no more than 5%.

In some aspects of the present description, a curved optical film including a plurality of polymeric layers shaped along orthogonal first and second directions is provided. A first curve being an intersection of the optical film with a first plane orthogonal to the second direction and to a reference plane has a best-fit first circular arc subtending a first angle at a center of curvature of the first circular arc of at least 90 degrees where the optical film has a maximum projected area in the reference plane. A second curve being an inter-section of the optical film with a second plane orthogonal to the first direction and to the reference plane has a best-fit second circular arc subtending a second angle at a center of curvature of the second circular arc of at least 30 degrees. Each location across at least 90% of a total area of the optical film has a reflectance greater than about 80% and a transmittance less than about 2% for normally incident light having a same predetermined wavelength and a same first polarization state. The first curve passes through a center of the optical film. The optical film has a first long wavelength band edge at a first location along the first curve and a second long wavelength band edge at a second location along the first curve, where the second location is separated from the first location by a distance along the first curve of at least 0.7 times a radius R1 of the best-fit first circular arc, a distance from the center of the optical film to the first location along the first curve is no more than 0.2 R1, and a distance from the second location to an edge of the optical film along the first curve being no more than 0.2 R1. The first and second long wavelength band edges differ by no more than 5%.

In some aspects of the present description, an optical film including a plurality of polymeric layers is provided. Each location across at least 90% of a total area of the optical film has a reflectance greater than about 80% and a transmittance less than about 5% for normally incident light having a same predetermined wavelength and a same first polarization state. For orthogonal first and second planes intersecting the optical film along respective first and second curves where the first and second curves intersect each other at a center location of the optical film, the optical film has a thickness that decreases from the center location to a first edge location of the optical film along the first curve and increases from the center location to a second edge location along the second curve.

In some aspects of the present description, an optical film including a plurality of polymeric layers is provided. Each location across at least 90% of a total area of the optical film has a reflectance greater than about 80% and a transmittance less than about 5% for normally incident light having a same predetermined wavelength and a same first polarization state. For orthogonal first and second planes intersecting the optical film along respective first and second curves where the first and second curves intersect each other at a center location of the optical film, the optical film has a long wavelength band edge that decreases from the center location to a first edge location of the optical film along the first curve and increases from the center location to a second edge location along the second curve.

In some aspects of the present description, an optical film including a plurality of polymeric layers is provided. Each location across at least 90% of a total area of the optical film having a reflectance greater than about 80% and a transmittance less than about 5% for normally incident light having a same predetermined wavelength and a same first polarization state. For orthogonal first and second planes intersecting the optical film along respective first and second curves, the optical film has a first thickness distribution along the first curve that is substantially symmetric under reflection about the second plane and a second thickness distribution along the second curve that is substantially symmetric under reflection about the first plane, the first and second thickness distributions being different.

In some aspects of the present description, an optical film including a plurality of polymeric layers is provided. Each location across at least 90% of a total area of the optical film having a reflectance greater than about 80% and a transmittance less than about 5% for normally incident light having a same predetermined wavelength and a same first polarization state. For orthogonal first and second planes intersecting the optical film along respective first and second curves, the optical film has a first long wavelength band edge distribution along the first curve that is substantially symmetric under reflection about the second plane and a second long wavelength band edge distribution along the second curve that is substantially symmetric under reflection about the first plane, the first and second long wavelength band edge distributions being different.

In some aspects of the present description, a curved reflective polarizer including a plurality of polymeric layers shaped along at least orthogonal first and second directions is provided. A first ratio of a first maximum sag to a corresponding first diameter along the first direction is at least 0.1, and a second ratio of a second maximum sag to a corresponding second diameter along the second direction is at least 0.05. For normally incident light in a predetermined wavelength range, each location on the reflective polarizer has a maximum average reflectance greater than about 80% and a corresponding minimum average transmittance less than about 2% for a block polarization state, and a maximum average transmittance greater than about 80% for an orthogonal pass polarization state. Each location in a region of the reflective polarizer having an area of at least 80% of a total area of the reflective polarizer has a contrast ratio being the maximum average transmittance divided by the minimum average transmittance of at least 500.

In some aspects of the present description, a curved reflective polarizer including a plurality of polymeric layers shaped along orthogonal first and second directions is provided. A total curvature of the reflective polarizer is at least 0.25 where the total curvature is a surface integral of a Gaussian curvature of the reflective polarizer over a total area of the reflective polarizer. For normally incident light in a predetermined wavelength range, each location on the reflective polarizer has a maximum average reflectance greater than about 80% and a corresponding minimum average transmittance less than about 2% for a block polarization state, and a maximum average transmittance greater than about 80% for an orthogonal pass polarization state. Each location in a region of the reflective polarizer having an area of at least 80% of the total area of the reflective polarizer has a contrast ratio being the maximum average transmittance divided by the minimum average transmittance of at least 500.

In some aspects of the present description, a curved reflective polarizer including a plurality of polymeric layers shaped along at least orthogonal first and second directions is provided. A first ratio of a first maximum sag to a corresponding first diameter along the first direction is at least about 0.1, and a second ratio of a second maximum sag to a corresponding second diameter along the second direction is at least about 0.05. For normally incident light having a predetermined wavelength, each location over at least 80% of a total area of the reflective polarizer has a maximum reflectance greater than about 80% and a corresponding minimum transmittance less than about 0.2% for a block polarization state, and a maximum transmittance greater than about 80% for an orthogonal pass polarization state.

In some aspects of the present description, a curved reflective polarizer including a plurality of polymeric layers shaped along orthogonal first and second directions is provided. A total curvature of the reflective polarizer is at least 0.25 where the total curvature being a surface integral of a Gaussian curvature of the reflective polarizer over a total area of the reflective polarizer. For normally incident light having a predetermined wavelength, each location over at least 80% of a total area of the reflective polarizer has a maximum reflectance greater than about 80% and a corresponding minimum transmittance less than about 0.2% for a block polarization state, and a maximum transmittance greater than about 80% for an orthogonal pass polarization state.

In some aspects of the present description, an apparatus for processing optical film is provided. The apparatus includes: first and second rollers spaced apart along a first direction and disposed on respective first and second stages configured to move the first and second rollers along the first direction, where the first and second rollers have respective first and second widths along a second direction orthogonal to the first direction; first and second securing means for securing opposing first and second ends of the optical film, where the first and second rollers are disposed between the first and second securing means and the apparatus is configured such that when the first and second ends of the optical film are secured in the first and second securing means, the optical film contacts the first and second rollers; a mold having a curved mold surface and disposed on a mold stage configured to move the mold along a third direction orthogonal to the first and second directions; a means for heating the optical film; a tension measuring means for measuring a tension in the optical film; a controller communicatively coupled to the tension measuring means, the first and second stages, the first and second securing means, and the mold stage. The controller is configured to simultaneously move the mold along the third direction and move the first and second roller along the first direction while controlling the tension in the optical film.

DETAILED DESCRIPTION

Figure 1A:
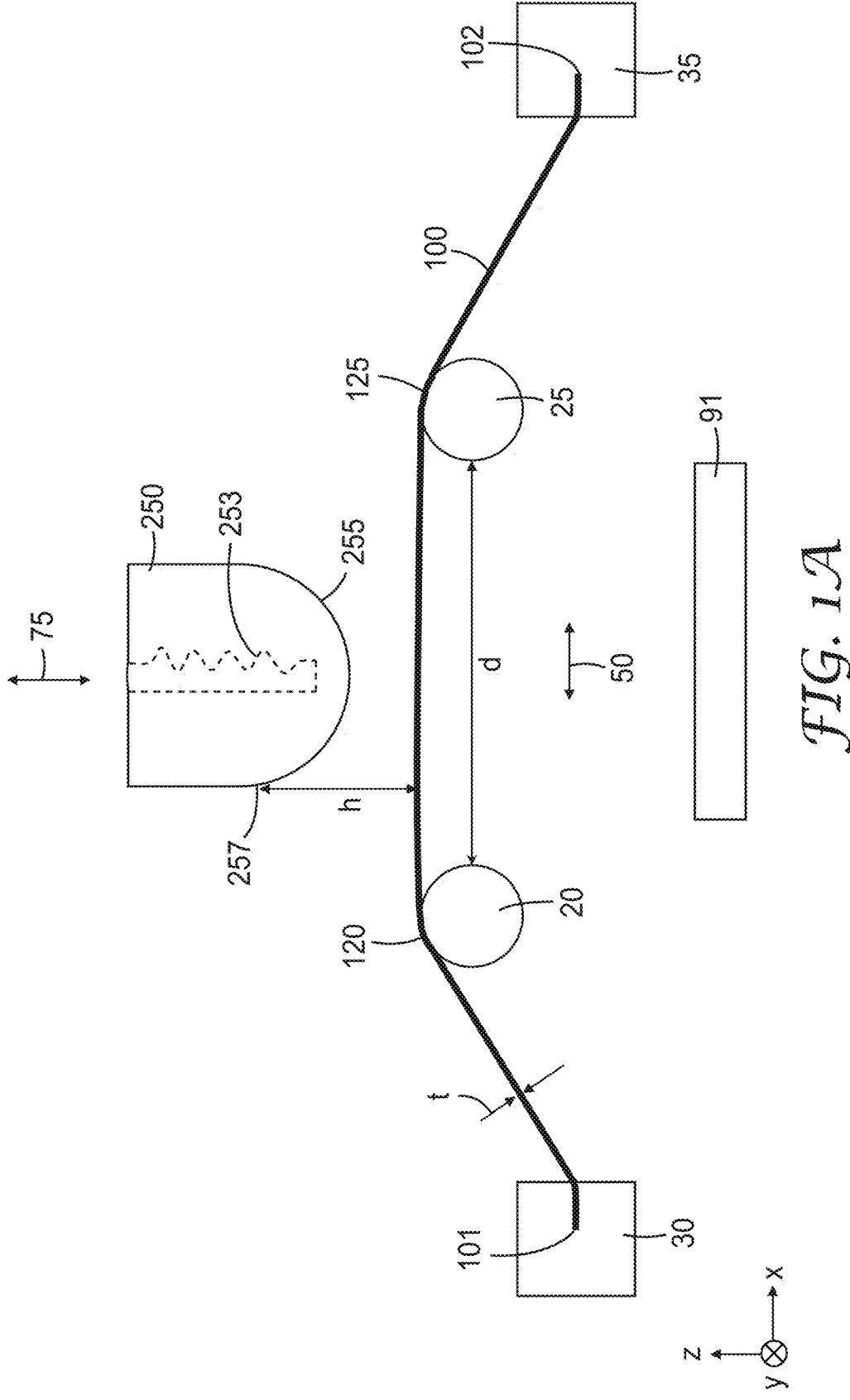
FIGS. 1A-1E are schematic illustrations of a method of shaping optical films.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, methods of shaping an optical film are provided. In some embodiments, the methods of the present description allow an optical film to be formed into shapes that would be difficult to achieve using conventional thermoforming techniques while maintain desired optical properties over most or all of the optical film. For example, an optical film can be curved to subtend an angle at a center of curvature of the optical film that is greater than 180 degrees. In some embodiments, the methods of the present description provide a thickness variation of the optical film that is different from that of optical films thermoformed by conventional methods. For example, the thickness may increase from a center of the optical film along one axis and decrease from the center along an orthogonal axis. As another example, the thickness may vary non-monotonically from a center of the optical film to an edge of the optical film along at least one direction. In some embodiments, the optical film is a reflective polarizer and the methods of the present description allow substantially more stretching of the reflective polarizer along a block axis than along a pass axis during the shaping of the reflective polarizer and this has been found to decrease the transmittance of light polarized along the block axis and increase the contrast ratio of the reflective polarizer.

The optical films of the present description may include a plurality of alternating polymeric layers and may transmit and reflect light primarily by optical interference. In some embodiments, the optical film is a mirror film and in some embodiments, the optical film is a reflective polarizer. In either case, each location over at least 80% of a total area of the shaped optical film may have a reflectance greater than about 80% for normally incident light having a same predetermined wavelength and a same first polarization state. In the case of a reflective polarizer, the transmittance for normally incident light having the predetermined wavelength and a same orthogonal second polarization state may be greater than 80% at each location over at least 80%, or at least 85%, or at least 90%, or at least 95% of the total area of the shaped optical film. In some embodiments, the predetermined wavelength is a wavelength in predetermined wavelength range.

The predetermined wavelength range may be the wavelength range over which an optical system including the optical film is designed to operate. For example, the predetermined wavelength range may be the visible range (400 nm to 700 nm) or a substantial subset of the visible range (e.g., 450 nm to 650 nm). As another example, the predetermined wavelength range may include one or more visible wavelength ranges. For example, the predetermined wavelength range may be the union of more than one narrow wavelength ranges (e.g., the union of disjoint red, green and blue wavelength ranges corresponding to light emission colors of a display panel). Such wavelength ranges are described further in U.S. Pat. Appl. Pub. No. 2017/0068100 (Ouderkirk et al.), which is hereby incorporated herein by reference to the extent that it does not contradict the present description. In some embodiments, the predetermined wavelength ranges include other wavelength ranges (e.g., infrared (e.g., near infrared (about 700 nm to about 2500 nm)), or ultraviolet (e.g., near ultraviolet (about 300 nm to about 400 nm)) as well as visible wavelength ranges. For example, the optical film may be an infrared reflector and the predetermined wavelength range may be a near infrared range. A predetermined wavelength may be any wavelength in the predetermined wavelength range. For example, a predetermined wavelength range may be from 400 nm to 700 nm and the predetermined wavelength may be 500 nm or 550 nm, for example.

Figure 1B:
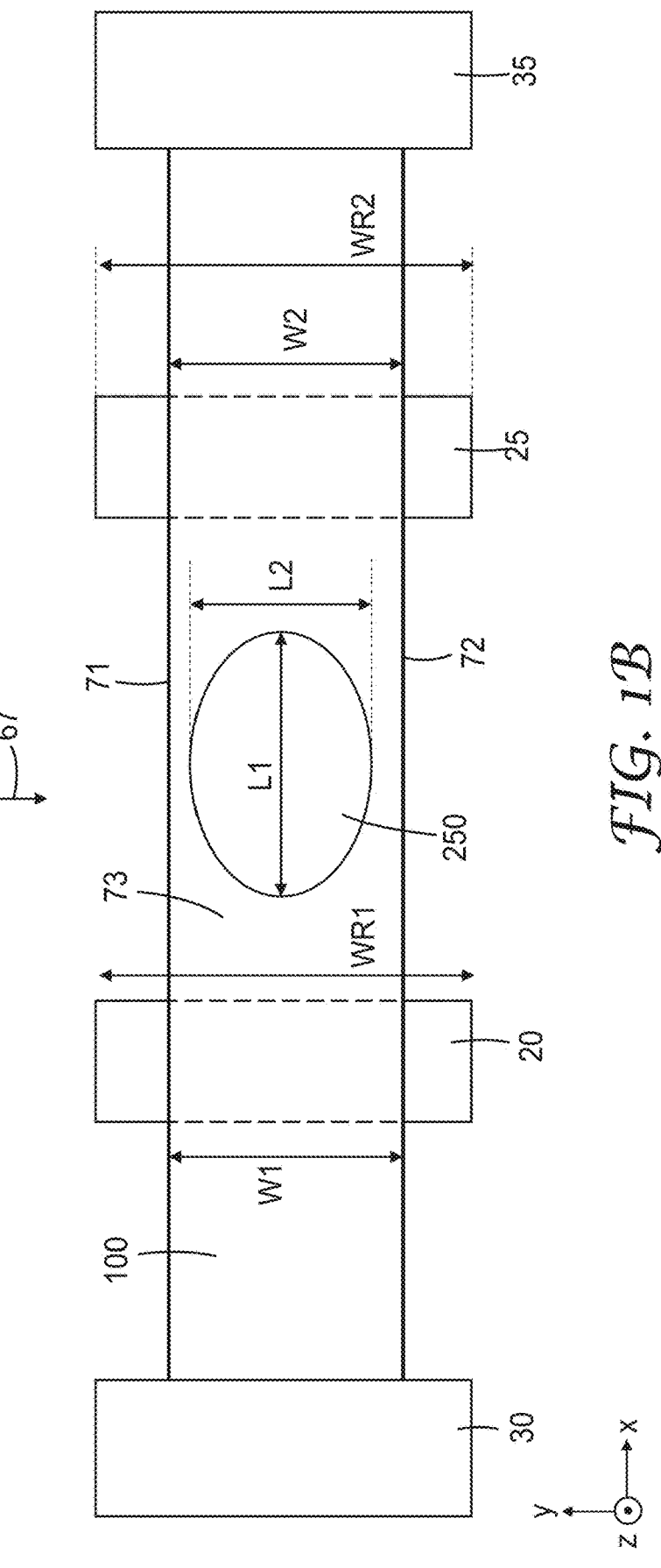

A method of shaping an optical film according to the present description is illustrated in FIGS. 1A-1E. FIG. 1A is a schematic cross-sectional view of an optical film 100 disposed adjacent first and second rollers 20 and 25 such that a first portion 120 of the optical film 100 contacts the first roller 20 and a second portion 125 of the optical film 100 contacts the second roller 25. FIG. 1B is a top schematic view of the system of FIG. 1A. The first and second rollers 20 and 25 are spaced apart along a first direction 50 (parallel to x-direction). The first portion 120 of the optical film 100 has a first width W1 along a second direction 67 (parallel to y-direction) orthogonal to the first direction 50. The first roller 20 has a first width WR1 along the second direction 67. In some embodiments, the width WR1 is greater than the width W1. The second portion 125 of the optical film 100 has a second width W2 along the second direction 67. The second roller 25 has a second width WR2 along the second direction 67. In some embodiments, the width WR2 is greater than the width W2. In some embodiments, W1 and W2 are equal or about equal. In some embodiments, the optical film has a substantially constant width (e.g., no more than 10% variation) that is about equal to W1 and to W2. In some embodiments, WR1 and WR2 are equal or about equal.

The method comprises securing the first and second ends 101 and 102 of the optical film 100. In the illustrated embodiment, securing means 30 and 35 are used to secure the first and second ends 101 and 102. The securing means 30 and 35 may be or include claps, grips or a roller (e.g., a Capstan roller) and may be configured to move along the first direction 50. The first and second ends 101 and 102 are spaced apart along the first direction 50 with the first and second portions 120 and 125 disposed between the first and second ends 101 and 102.

Figure 1C:
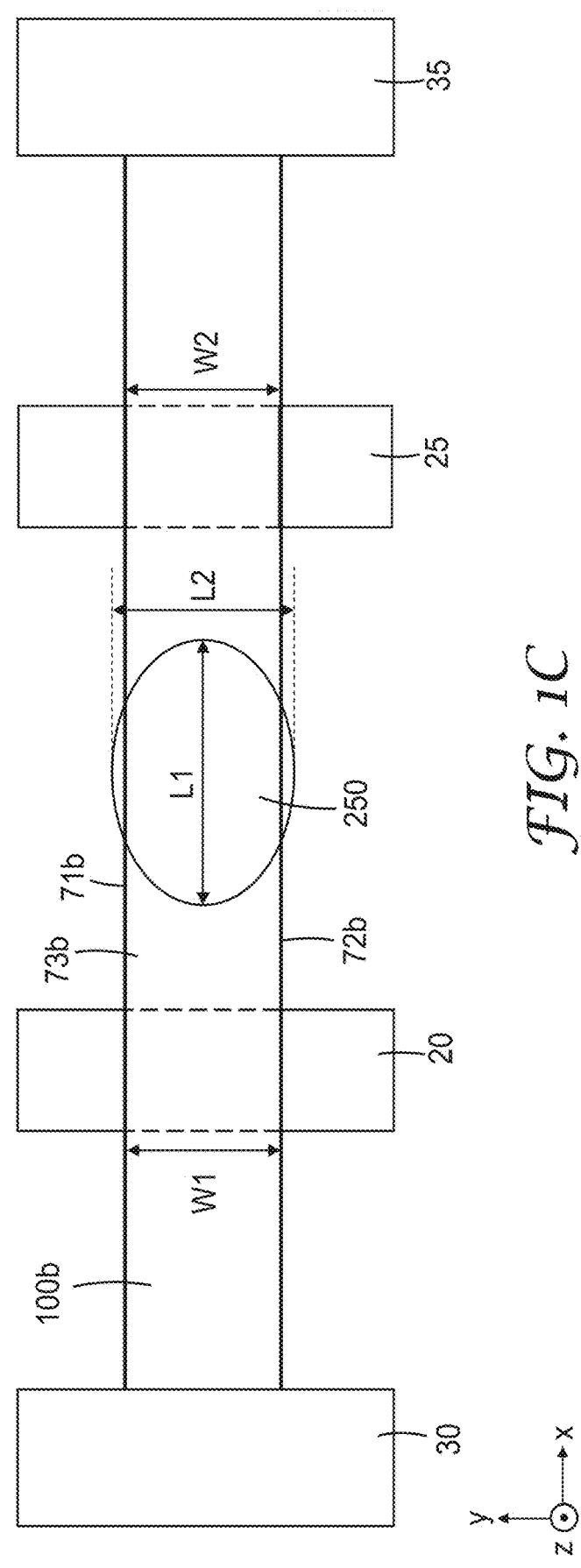

Mold 250 has a curved mold surface 255. The mold 250 has a length L1 along the first direction 50 and a length L2 along the second direction 67. The curved mold surface may have the same or similar lengths along the first and second directions. The optical film 100 may have a width (e.g., W1 and/or W2) that is larger than L2 as illustrated in FIG. 1B. In this case, a portion of the optical film 100 may be cut out after forming into a desired shape to remove edges which were not formed. In other embodiments, an optical film 100b, which may be used in place of optical film 100, may have a width (e.g., W1 and/or W2) that is smaller than L2 as illustrated in FIG. 1C. In some embodiments, the width of the optical film is about equal to the length L2 of the mold 250 along the second direction 67. Mold 250 includes optional heating element(s) 253 which may be used to heat the mold. The optional heating element(s) 253 may be disposed within the mold 250 or on a surface of the mold, for example. In some embodiments, the mold 250 is heated to a temperature higher than ambient temperature. For example, in some embodiments, the mold 250 is heated to a temperature greater than 30° C., or greater than 40° C. In some embodiments, the optical film 100 is heated to a predetermined temperature prior to shaping the optical film 100. In some embodiments, the mold 250 is heated to a temperature that is less than this predetermined temperature.

Figure 1D:
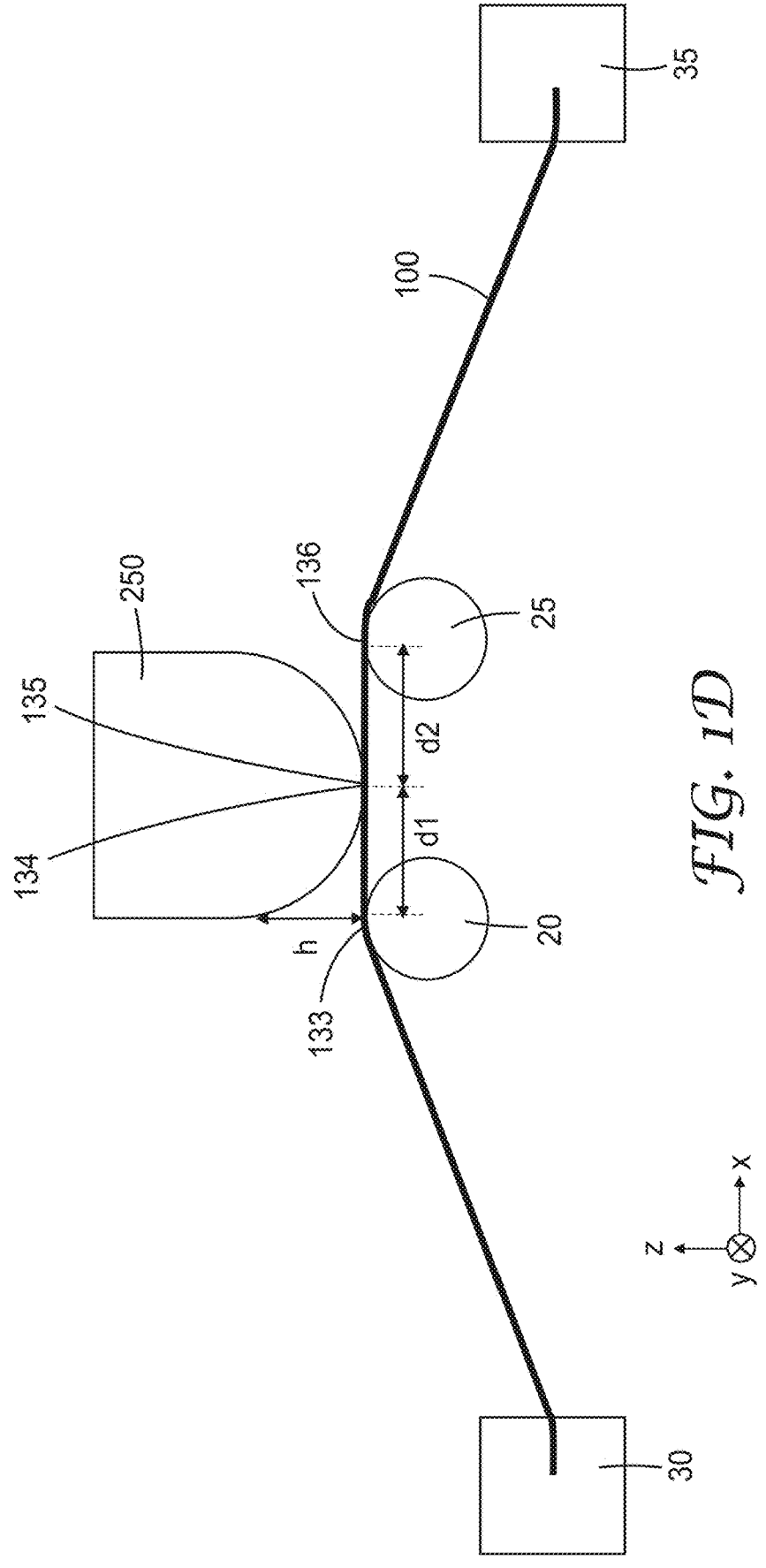
Figure 1E:
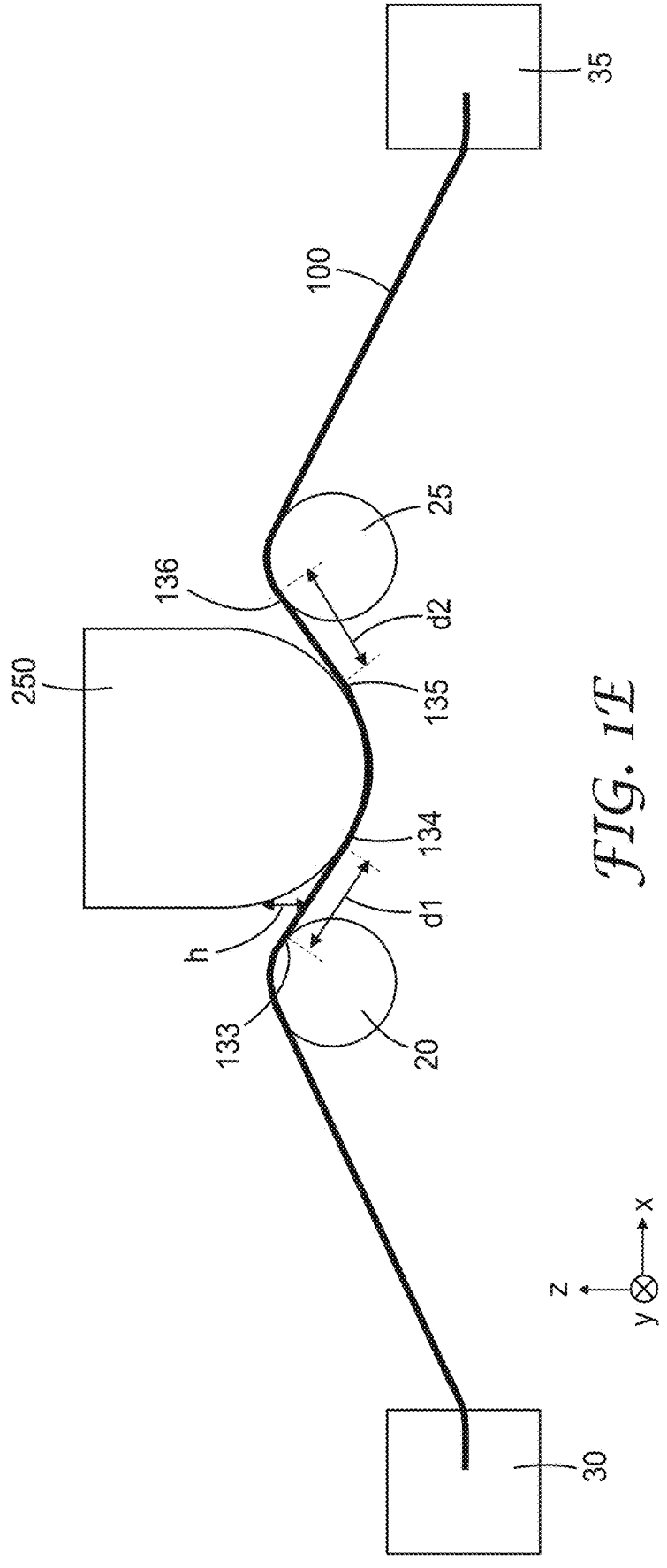

In some embodiments, the optical film 100 is shaped by contacting the optical film 100 with the curved mold surface 255 while stretching the optical film 100 along the first direction 50. This can be done by moving the mold 250 towards the optical film 100 along a third direction 75 (parallel to z-direction) orthogonal to the first and second directions 50 and 67 until the curved mold surface 255 contacts the optical film and continuing to move the mold 250 until the optical film 100 conforms to at least a portion of the curved mold surface 255. This can be described as changing a separation distance h between a point 257 on a boundary of the curved mold surface 255 and the optical film 100 along the third direction 75. The boundary of the curved mold surface 255 can be taken to be a physical boundary where the curvature changes abruptly if such a boundary is present or the boundary may be taken to be a boundary of the maximum area of the curved mold surface which makes contact with the optical film 100 during the shaping of the optical film 100. FIG. 1D is a schematic cross-sectional view of a step in the shaping method where the mold 250 has initially contacted the optical film 100 and FIG. 1E is a schematic cross-sectional view of a time in the shaping method after a continuous portion of the optical film 100 has contacted the curved mold surface 255. In the illustrated embodiment, the securing means 30 and 35 are positioned lower (smaller z-coordinate) than the first and second rollers 20 and 25. In other embodiments, when the mold 250 initially contacts the optical film 100, the securing means 30 and 35 are positioned so that the span of film between the securing means 30 and the mold 250, the span of film between the securing means 35 and the mold 250, and the span of film between the first and second rollers 20 and 25 are parallel to one another.

In some embodiments, a temperature of the optical film is lower at a first point of the optical film contacting the curved mold surface (e.g., point 134 or point 135) than at a second point of the optical film not contacting the curved mold surface (e.g., a point halfway between point 135 and point 136, or a point halfway between point 133 and point 134).

The shaping of the optical film 100 preferably comprises keeping a threshold distance d1 between closest first and second points 133 and 134 less than about the first width W1, where the first point 133 on the optical film 100 contacts the first roller 20, and the second point 134 on the optical film 100 contacts the curved mold surface 255. In other words, d1 is the smallest distance between any point on the optical film 100 contacting the first roller 20 and any point on the optical film 100 contacting the curved mold surface 255, and the method of shaping the optical film 100 includes keeping d1 less than about W1. In some embodiments, the shaping of the optical film 100 further comprises keeping a threshold distance d2 between closest third and fourth points 135 and 136 less than about the second width W2, where the third point 135 on the optical film 100 contacts the curved mold surface 255, and the fourth point 136 on the optical film 100 contacts the second roller 25. In other words, d2 is the smallest distance between any point on the optical film 100 contacting the curved mold surface 255 and any point on the optical film 100 contacting the second roller 25, and the method of shaping the optical film 100 includes keeping d2 less than about W2. Keeping d1 and/or d2 in a desired range typically comprises moving the first and/or second rollers 20 and/or 25 along the first direction 50. In preferred embodiments, the first and second rollers 20 and 25 are moved along the first direction 50 so that the distance d between the first and second rollers 20 and 25 changes during the shaping of the optical film 100 to keep both d1 and d2 in the desired ranges. In some embodiments, one or more or all of the first, second, third, and fourth points 133, 134, 135, and 136 moves along the first direction 50 as the optical film 100 is shaped.

Without the first and second rollers 20 and 25, the optical film 100 (or 100b) would typically buckle along the second direction 67 in the region 73 (or 73b). It has been found that including the first and second rollers 20 and 25 and keeping d1 and/or d2 in a desired range can reduce or eliminate buckling of the optical film in the second direction. Friction between the optical film 100 (or 100b) and the first and second rollers 20 and 25 can result in positive tension in the optical film 100 (or 100b) along the second direction and this tension can prevent buckling. In some embodiments, the first and second rollers 20 and 25 have a smooth surface. In some embodiments, the first and second rollers 20 and 25 are spreader rollers. Spreader rollers include grooves, for example, which can result in increased tension in the optical film 100 (or 100b) along the second direction 67. Spreader rollers are known in the art and are described in U.S. Pat. No. 6,843,762 (Munche et al.), for example.

In some embodiments, the threshold distance d1 is kept at no more than W1, or no more than 0.9 W1, or no more than 0.8 W1, or no more than 0.7 W1, or no more than 0.6 W1, or no more than 0.5 W1, or no more than 0.4 W1, or no more than 0.3 W1. In some embodiments, the threshold distance d1 is kept at at least 0.001 W1, or at least 0.01 W1, or at least twice a thickness t of the optical film 100 (or 100b), or at least 5 times the thickness, or at least 10 times the thickness. In some embodiments, the threshold distance d2 is kept at no more than W2, or no more than 0.9 W2, or no more than 0.8 W2, or no more than 0.7 W2, or no more than 0.6 W2, or no more than 0.5 W2, or no more than 0.4 W2, or no more than 0.3 W2. In some embodiments, the threshold distance d1 is kept at at least 0.001 W2, or at least 0.01 W2, or at least twice a thickness of the optical film 100 (or 100b), or at least 5 times the thickness, or at least 10 times the thickness.

In some embodiments, the threshold distances d1 and d2 are independently controlled. In some embodiments, the first and second rollers 20 and 25 are disposed substantially symmetrically about the mold 250 so that d1 is equal to or about equal to d2. In other embodiments, the first and second rollers 20 and 25 are disposed asymmetrically about the mold 250 so that d1 and d2 are different. In some cases, this may be done to facilitate shaping the optical film 100 into an asymmetric shape (e.g., a teardrop shape).

In some embodiments, the shaping of the optical film 100 (or 100b) comprises changing a separation distance d between the first and second rollers 20 and 25 along the first direction 50 to reduce buckling of the optical film 100 (or 100b) in the region 73 (or 73b) between the first and second rollers 20 and 25 and along the second direction 67 between and away from longitudinal edges 71 and 72 (or 71b and 72b) of the optical film 100 (or 100b). In some cases, buckling along the longitudinal edges 71 and 72 can be acceptable since the buckling may be subsequently removed and/or portions of the optical film along the longitudinal edges 71 and 72 may be removed prior to using the shaped optical film in an optical system, for example.

The first and second securing means 30 and 35 may configured to move along the first direction 50. In some embodiments, the positions of the first and second ends 101 and 102 are changed to control the tension in the optical film 100 (or 100b) along the first direction 50. The positions of the first and second ends 101 and 102 can be changed by moving the first and second securing means 30 and 35 along the first direction 50. Alternatively, the first and second securing means 30 and 35 may be rollers where the ends of the films are secured on or in the rollers and the tension in the first direction 50 can be changes by rotating the rollers. In this case, the positions of the first and second ends 101 and 102 may be change due to the rotation of the rollers. In some embodiments, the tension in the optical film 100 (or 100*b*) along the first direction 50 is substantially constant as the film is stretched. The tension may be described as substantially constant or substantially unchanged if it varies by no more than 10% over at least 90% of the time that the optical film is being shaped. In some embodiments, the tension in the optical film 100 along the first direction 50 gradually increases during the stretching of the optical film 100. In some embodiments, the tension is controlled to produce a desired thickness variation in the optical film. For example, the desired thickness may be substantially constant along the first direction 50. As another example, the desired thickness distribution may be generally decreasing from a center of the optical film to each of opposing edges along the first direction 50. The reflection band edges of the optical film are typically proportional to the thickness. A desired band edge distribution may determine the desired thickness distribution, for example.

In some embodiments, the optical film 100 (or 100*b*) is heated. In some embodiments, the heating may be carried out prior to and optionally during stretching of the optical film 100. The heating can utilize one or more of infrared (IR) heating, convection heating and radiative heating. FIG. 1A schematically shows a heater 91 disposed to heat the optical film 100. The heater 91 is disposed on a side of the optical film 100 opposite the curved mold surface 255. In some embodiments, the heater 91 is an infrared heater. In some embodiments, an infrared reflective surface is disposed proximate the optical film opposite the infrared heater. For example, in some embodiments, the curved mold surface 255 is an infrared reflective surface which is positioned proximate the optical film 100 during the heating of the optical film 100. In other embodiments, a separate infrared reflector is disposed between the curved mold surface 255 and the optical film 100 during the heating of the optical film 100. The separate infrared reflector is then removed prior to the shaping of the optical film 100.

In some embodiments, the optical film 100 (or 100*b*) is heated to a temperature in a range of 120° C. to 200° C., or in a range of 160° C. to 200° C. In some embodiments, the optical film 100 is heated to a temperature greater than a glass transition temperature of the optical film 100. In some embodiments, the mold 250 is heated prior to and/or during the shaping of the optical film 100. For example, the mold 250 may be heated to a temperature greater than 30° C. Prior to shaping, the temperature of the mold 250 may be lower than the temperature of the optical film 100. In some embodiments, the temperature of the optical film 100 during the shaping step is lowest at a point of the optical film contacting an apex of the curved mold surface 255 and higher in portions of the optical film 100 not contacting the curved mold surface 255. In some embodiments, during the shaping step, a temperature of the optical film 100 changes from a midpoint of the optical film 100 between the first and second rollers toward each of the first and second rollers. In some embodiments, during the shaping step, the temperature of the optical film 100 changes from a midpoint between the longitudinal edges 71 and 72 and between the first and second rollers 20 and 25 toward each longitudinal edge. The midpoint of the optical film 100 may be the point which contacts the apex of the curved mold surface 255. In some embodiments, the first and second rollers 20 and 25 are also heated (e.g., to a temperature greater than 30° C.). Third and fourth rollers described elsewhere herein may also be heated.

The glass transition temperature of the optical film may refer the glass transition temperature of any layer of the optical film. For example, the glass transition temperature of the optical film may be the highest glass transition temperature of any of the layers of the optical film, may be the lowest glass transition temperature of any of the layers of the optical film, may be the glass transition temperature of the birefringent interference layers of the optical film when the optical film includes alternating nonbirefringent and birefringent layers, or may be the glass transition temperature of the higher refractive index interference layers of the optical film 300 when the optical film 300 includes alternating higher and lower index interference layers. The glass transition temperature can be determined by differential scanning calorimetry.

In some embodiments, prior to shaping the optical film, the optical film is heated to a temperature that is below a melting temperature of the optical film. The melting temperature may refer to the melting temperature of any of the layers of the optical film. In some embodiments, the melting temperature is the melting temperature of the higher refractive index layer or of the birefringent layers. In some embodiments, prior to shaping the optical film, the optical film is heated to a temperature greater than a largest glass transition temperature of the optical film and lower than a lowest melting temperature of the optical film.

In some embodiments, the optical film 100 (or 100*b*) is a reflective polarizer having a block axis substantially along the first direction. The block axis may be described as substantially along the first direction if an angle between the first direction and the block axis is less than 30 degrees. In some embodiments, the angle between the first direction and the block axis is less than 20 degrees, or less than 10 degrees, or less than 5 degrees.

In some embodiments, the optical film 100 is a reflective polarizer and the process includes stretching the reflective polarizer along the first direction 50 prior to shaping the optical film using the mold 250. This has been found to decrease the block state leakage of the reflective polarizer and increase the contrast ratio of the reflective polarizer. In some cases, buckling is introduced in the optical film by this stretching but this buckling is subsequently remover during forming by positioning the first and second rollers 20 and 25 sufficiently close to the mold 250.

Figure 2:
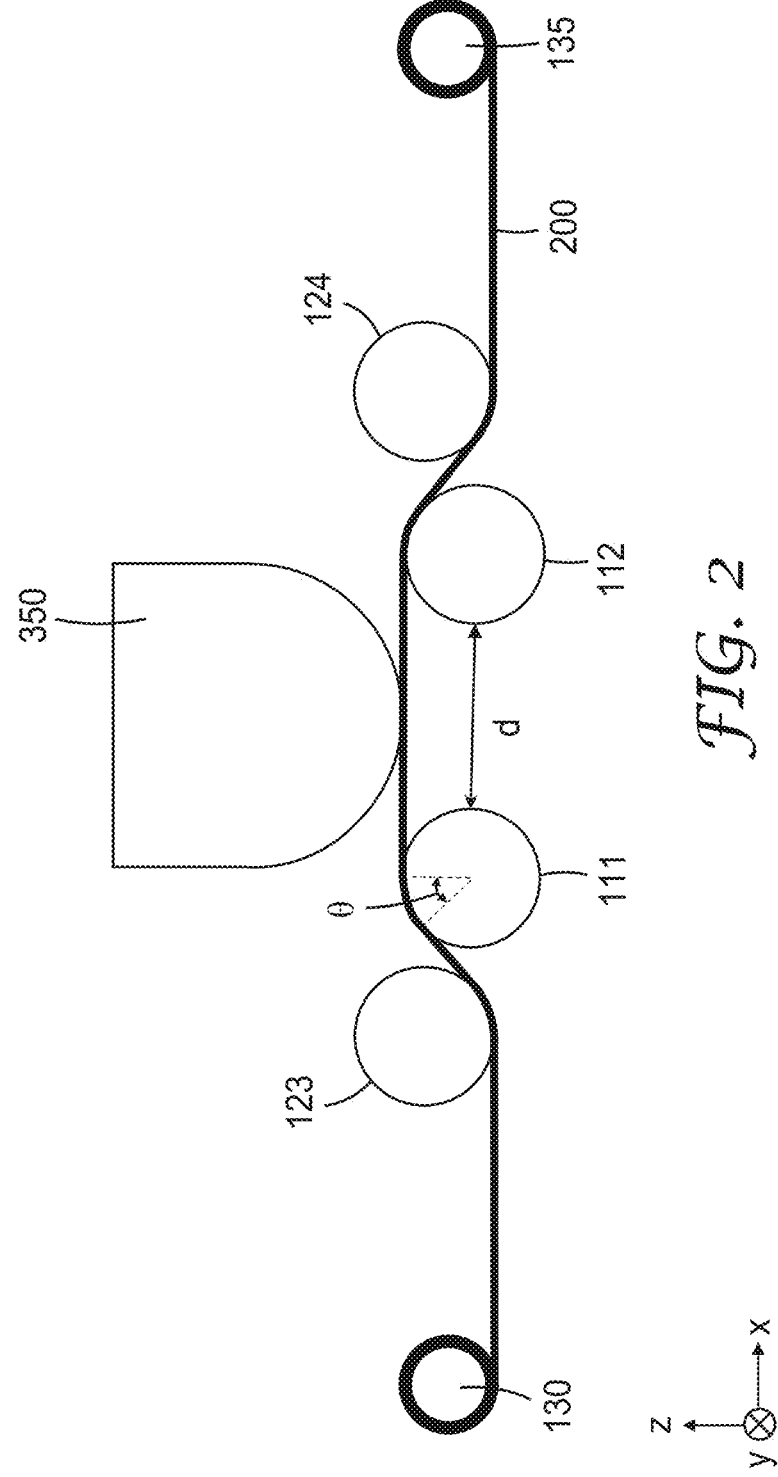
FIGS. 2-3 are schematic side views of steps in methods of shaping optical films.
Figure 3:
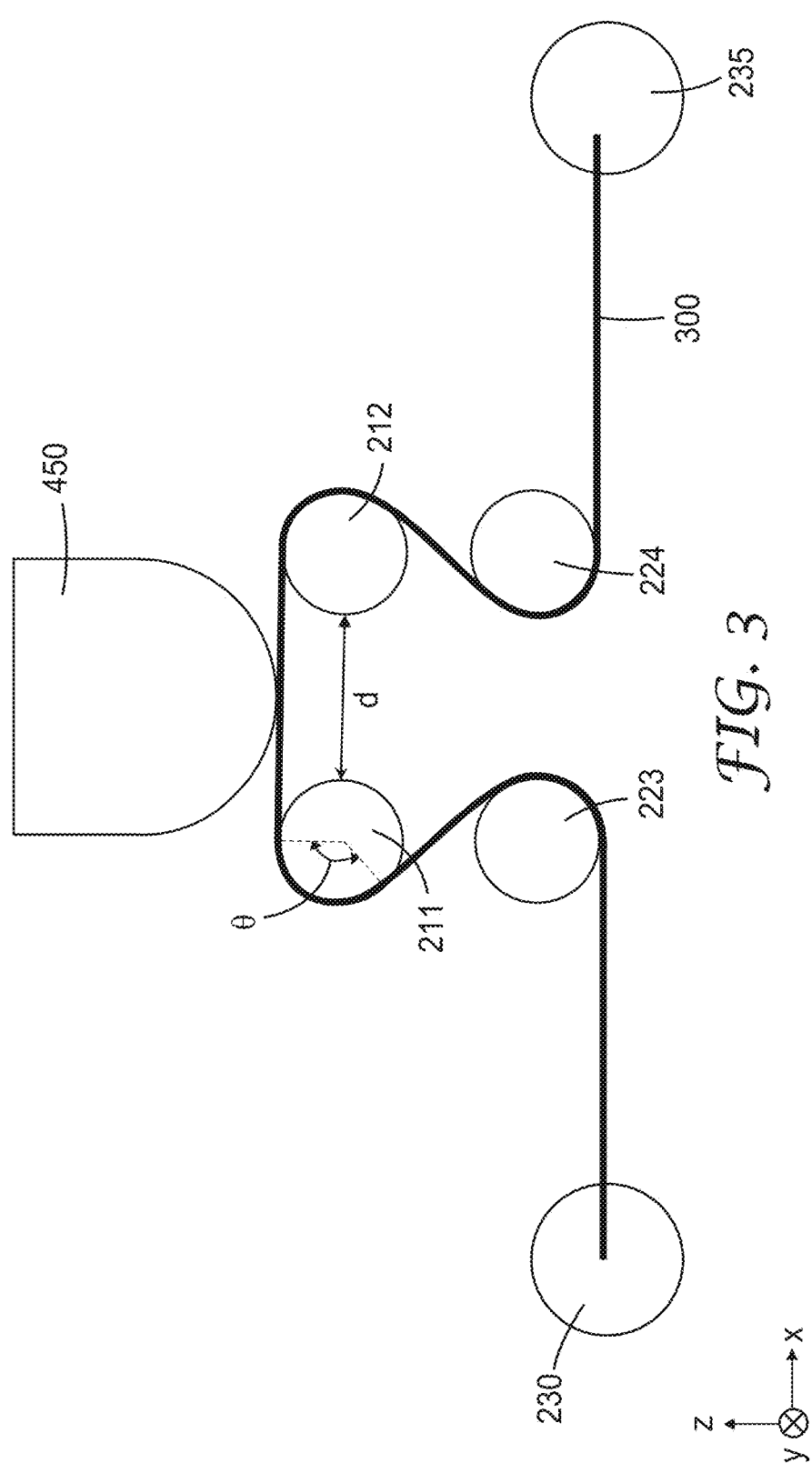

In some embodiments, the method further comprises disposing the optical film adjacent third and fourth rollers. In some embodiments, shaping of the optical film includes moving the third and fourth rollers along the first direction. In some embodiments, the third roller is disposed to increase a contact angle of the optical film with the first roller. In some embodiments, the fourth roller is disposed to increase a contact angle of the optical film with the second roller. In some embodiments, a separation between first and third rollers varies by no more than 10% during the shaping step, and a separation between second and fourth rollers varies by no more than 10% during the shaping step. For example, in some embodiments, the first and third rollers are disposed on a common linear stage and so move together during the shaping of the optical film. Similarly, in some embodiments, the second and fourth rollers are disposed on a common linear stage and so move together during the shaping of the optical film. In other embodiments, each of the first, second, third and fourth rollers may be disposed on an independent stage so that the separation distances can be independently controlled. In some embodiments, the third roller is closer to the first roller than to the second roller, and the fourth roller is closer to the second roller than to the first roller. FIGS. 2-3 illustrate two embodiments where third and fourth rollers are included.

FIG. 2 is a schematic cross-sectional view illustrating a time in the shaping process where a mold 350 has initially contacted an optical film 200. Optical film 200 is disposed adjacent first and second rollers 111 and 112 and adjacent third 123 and fourth rollers 124 where the third roller 123 is proximate to the first roller 111 opposite the second roller 112 and the fourth roller 124 is proximate the second roller 112 opposite the first roller 111. The time in the shaping process illustrated in FIG. 2 is in many ways similar to the time in the shaping process of FIGS. 1A-1E illustrated in FIG. 1D except that third and fourth rollers 123 and 124 are included and the first and second gripping means 130 and 135 are schematically illustrated as rollers. The shaping method proceeds as illustrated and described for the shaping process of FIGS. 1A-1E. The separation d between the first and second rollers 111 and 112 is typically varied to keep the threshold distances d1 and d2 (see FIGS. 1D-1E) in a desired range as described further elsewhere herein. The third roller 123 is disposed to increase a contact angle θ of the optical film 200 with the first roller 111. Similarly, the fourth roller 124 is disposed to increase a contact angle of the optical film 200 with the second roller 112. Increasing the contact angle with the first and second rollers 111 and 112 has been found to reduce any slipping of the optical film 200 along the rollers in the second direction and this has been found to further reduce any buckling of the optical film 200.

In some embodiments, the first and second rollers 111 and 112 are heated prior to and/or during the shaping of the optical film 200. In some embodiments, the third and fourth rollers 123 and 124 are also heated. In some embodiments, the first and second rollers 111 and 112 are each at a higher temperature than each of the third and fourth rollers 123 and 124 during the shaping step.

FIG. 3 is a schematic cross-sectional view illustrating a time in the shaping process where a mold 450 has initially contacted an optical film 400. The optical film 300 is disposed adjacent first and second rollers 211 and 212 and adjacent third and fourth rollers 223 and 224. The third roller 223 is proximate the first roller 211 and the fourth roller 224 is proximate the second roller 212. The ends of the optical film 300 are disposed in the first and second securing means 230 and 235 which may be or include clamps, grips or cylinders, for example. FIG. 3 may be as described for FIG. 2 except for the positions of the third and fourth rollers 223 and 224 and the first and second securing means 230 and 235. The third roller 223 is disposed to increase a contact angle θ of the optical film 300 with the first roller 211. Similarly, the fourth roller 224 is disposed to increase a contact angle of the optical film 300 with the second roller 212. The separation d between the first and second rollers 111 and 112 is typically varied to keep the threshold distances d1 and d2 (see FIGS. 1D-1E) in a desired range as described further elsewhere herein.

Figure 4A:
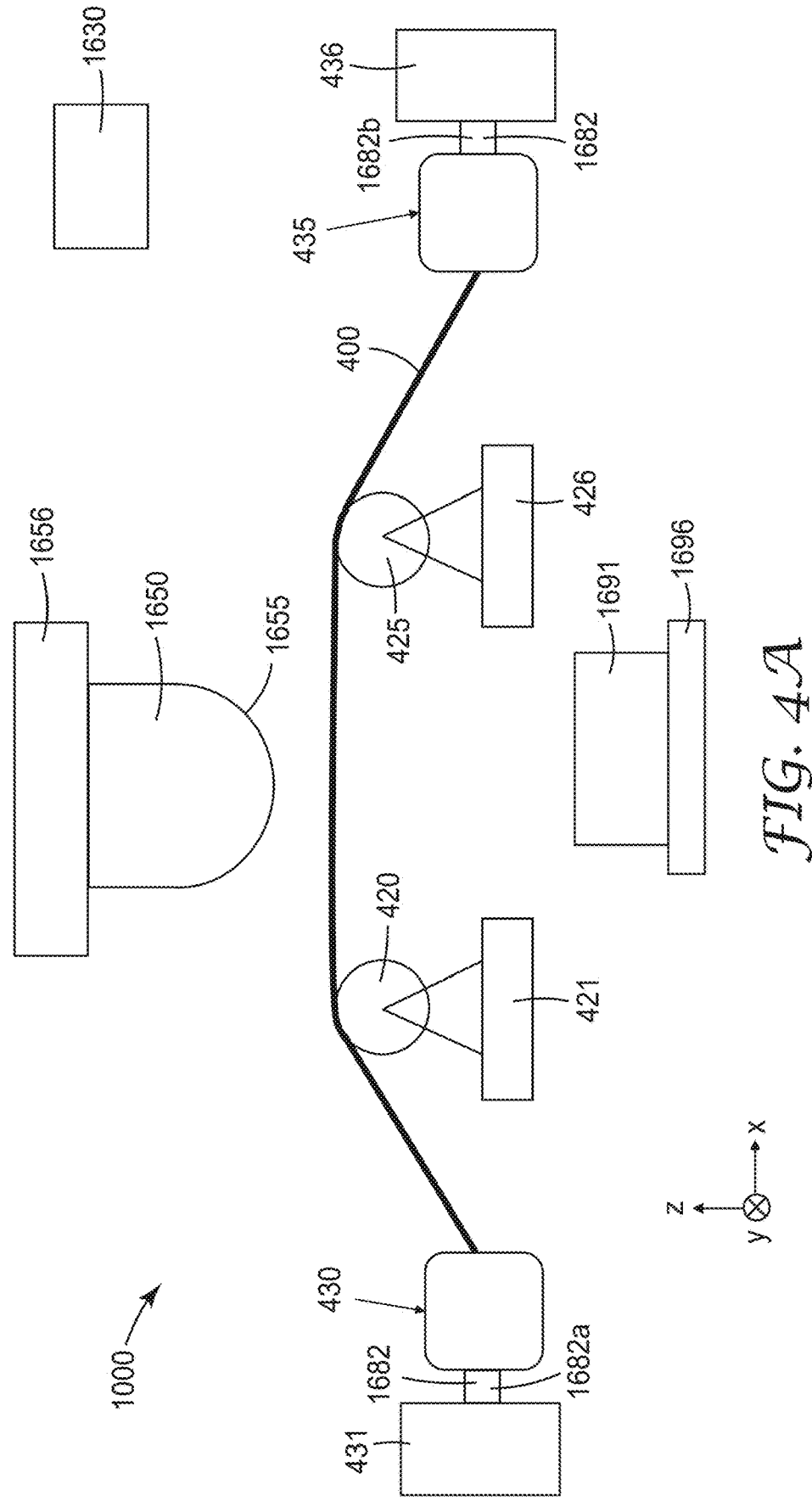
FIG. 4A is a schematic side view of an apparatus for shaping an optical film.

FIG. 4A is a schematic cross-sectional view of apparatus 1000 for processing optical film 400. The apparatus 1000 includes first and second rollers 420 and 425 spaced apart along a first direction (parallel to x-direction) and disposed on respective first and second stages 421 and 426 configured to move the first and second rollers 420 and 425 along the first direction. The first and second rollers 420 and 425 have respective first and second widths (e.g., corresponding to WR1 and WR2 depicted in FIG. 1B) along a second direction (parallel to y-direction) orthogonal to the first direction. The apparatus 1000 further includes first and second securing means 430 and 435 for securing opposing first and second ends of the optical film 400; a mold 1650 having a curved mold surface 1655 and disposed on a mold stage 1656 configured to move the mold along a third direction (parallel to z-direction) orthogonal to the first and second directions; a means 1691 for heating the optical film 400; a tension measuring means 1682 for measuring a tension in the optical film; and a controller 1630. In the illustrated embodiment, the tension measuring means 1682 includes a first tension measuring unit 1682a and a second tension measuring unit 1682b. The first and second securing means 430 and 435 include the first and second tension measuring units 1682a and 1682b, respectively.

The first and second rollers 420 and 425 are disposed between the first and second securing means 430 and 435. In some embodiments, the apparatus is configured such that when the first and second ends of the optical film 400 are secured in the first and second securing means 430 and 435, the optical film 400 contacts the first and second rollers 420 and 425.

Figure 4B:
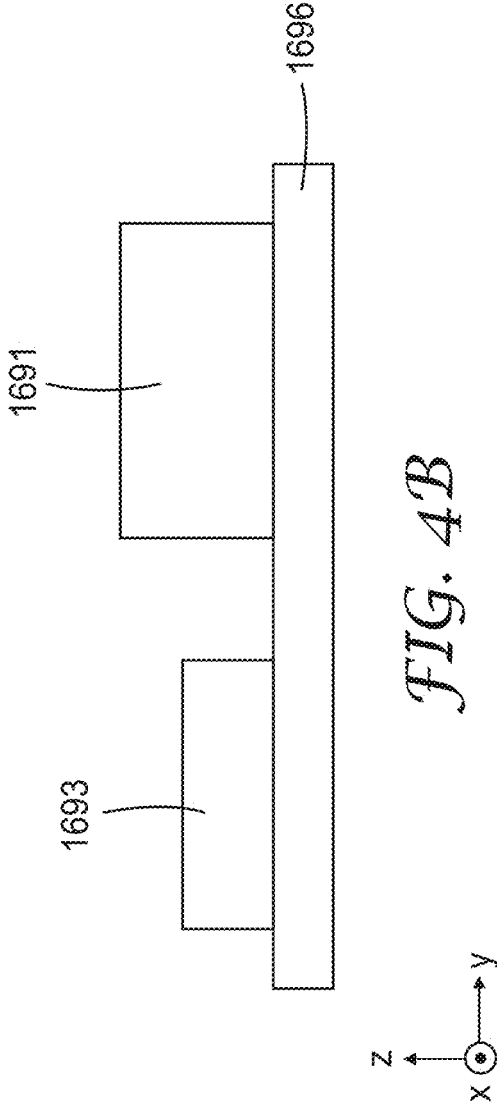
FIG. 4B is a schematic side view of a heating means and a lens mount disposed on a stage.

In some embodiments, the means 1691 for heating the optical film 400 comprises a heater which may be or include one or more of an infrared heater, a convection heater, and a radiative heater. In some embodiments, means for heating the optical film further comprises heating elements disposed in or on the mold 1650. In some embodiments, the means 1691 for heating the optical film 400 is disposed on a stage 1696 configured to move the means 1691 along the second direction (parallel to y-direction). This can be done to move the means 1692 farther from the optical film 400 near the end of the process so that the optical film 400 can cool. In some embodiments, a lens mount 1693 is disposed on the stage 1696 as schematically illustrated in FIG. 4B. This can be done to attach (e.g., bond using an optically clear adhesive) an optical lens to the shaped film while it is still in contact with the mold 1650 as described further elsewhere herein.

The controller 1630 is communicatively coupled to the tension measuring means 1682, the first and second stages 421 and 426, the first and second securing means 430 and 435, and the mold stage 1656. The communicative coupling can be wired or wireless. In some embodiments, the controller is configured to simultaneously move the mold along the third direction and move the first and second roller along the first direction while controlling the tension in the optical film 400.

In the illustrated embodiment, the first and second securing means 430 and 435 comprise respective third and fourth stages 431 and 436. Alternatively, the first and second securing means 430 and 435 may be described as being securing grips, clamps, or rollers, which are disposed on respective separate stages that are communicatively coupled to the controller 1630. In some embodiments, the third and fourth stages 431 and 436 are configured to move along the first direction. In some embodiments, the third and fourth stages 431 and 436 are communicatively coupled to the controller 1630. In other embodiments, at least one of the first and second securing means 430 and 435 comprises a roller for securing the optical film 400 and includes a rotary stage to rotate the roller to control a tension in the film. In this case, the tension measuring means may be or may include a torque meter attached to the roller.

Figure 5A:
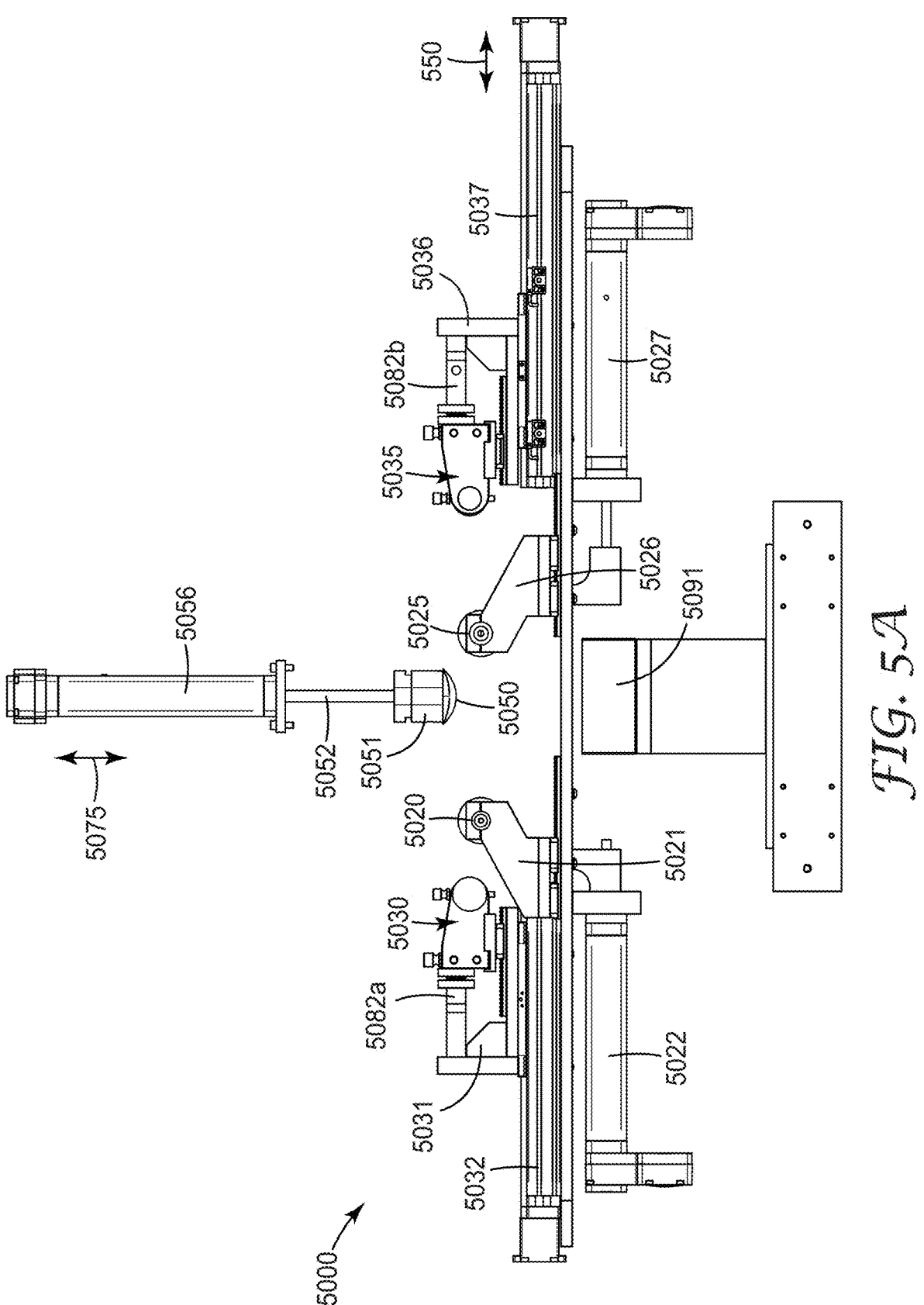
FIG. 5A is a side view of an apparatus for shaping an optical film.
Figure 5B:
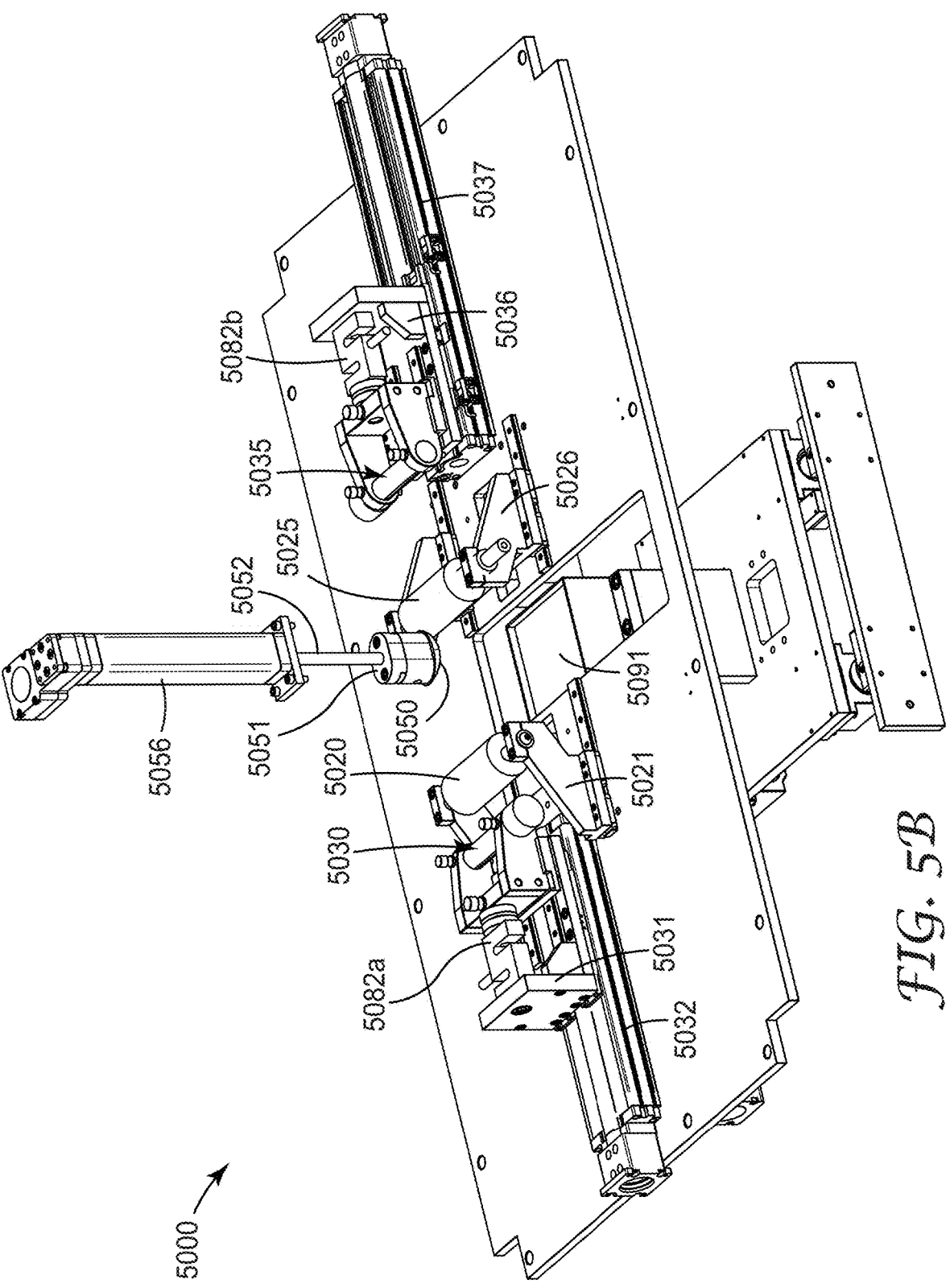
FIG. 5B is a perspective view of the apparatus of FIG. 5A.

FIGS. 5A-5B are side and perspective views of apparatus 5000 which includes first and second rollers 5020 and 5025 disposed on respective first and second stages 5021 and

5026. The first and second stages 5021 and 5026 include respective linear actuators 5022 and 5027 configured to move the first and second rollers 5020 and 5025 along the first direction 550. The apparatus 5000 includes first and second securing means 5030 and 5035, which in the illustrated embodiment, include securing rollers. In other embodiments, securing grips or clamps may be used instead of securing rollers. The apparatus 5000 is configured such that when the first and second ends of an optical film are secured in the first and second securing means 5030 and 5035, the optical film contacts the first and second rollers 5020 and 5025. The apparatus 5000 includes a means 5091 for heating the optical film, which in the illustrated embodiment is an infrared heater. The apparatus 5000 includes a tension measuring means for measuring a tension in the optical film which includes first and second load cells 5082*a* and 5082*b*. In the illustrated embodiment, the load cells 5082*a* and 5082*b* are S-type tension load cells. Other types of load cells may alternatively be used. In some embodiments, the first and second securing means 5030 and 5035 comprise respective third and fourth stages 5031 and 5036 configured to move the first and second ends of the optical film along the first direction 550. In some embodiments, the third and fourth stages 5031 and 5036 are communicatively coupled to a controller. For example, the third and fourth stages 5031 and 5036 may include linear actuators wired to a controller. The apparatus 5000 includes a mold 5050 having a curved mold surface and disposed on a mold mount 5051 which attached to linear actuator 5056 through the actuator rod 5052. The combination of the mold mount 5051 and the linear actuator 5056 including the actuator rod 5052 can be described as a mold stage. This mold stage is configured to move the mold 5050 along a third direction 5075. A frame (not shown for ease of illustration) is typically included to support the linear actuator 5056 and other components.

In some embodiments, a method of shaping an optical film comprises contacting the optical film with the curved mold surface while stretching the optical film, resulting in a curved optical film curved along at least a first direction and in some cases along orthogonal first and second directions, where the stretching the optical film during the shaping step comprises stretching the optical film along the first direction greater than 3 times any stretching along the second direction. This can be accomplished using first and second rollers that can be moved to keep the threshold distances along the span of film between the rollers and the mold in a desired range. This can also be accomplished by applying a controlled first and second tension in the optical film along first and second directions, respectively. In some embodiments, the optical film has first and second ends spaced apart along the first direction, and has third and fourth ends spaced apart along the second direction. The first and second ends may be secured in first and second securing means configured to move the first and second ends along the first direction, and the third and fourth ends may be secured in third and fourth securing means configured to move along the second direction.

Figure 6:
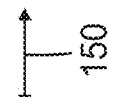
FIG. 6-7 are schematic top views of molds disposed over optical films.

FIG. 6 is a schematic top view of a mold 650 disposed over an optical film 600 which has a generally cross shape and includes a central region 40 disposed between first and second ends and between third and fourth ends. The first, second, third and fourth ends are secured in first, second, third and fourth securing means 630, 635, 633 and 637, respectively, which may be or include clamps, grips, or rollers as described further elsewhere herein. The optical film 600 includes first and second end regions extending 41 and 42 from the central region 40 to the first and second ends, respectively; and includes third and fourth end regions 43 and 44 extending from the central region 40 to the third and fourth ends, respectively. In some embodiments, the first and second end regions 41 and 42 have substantially constant first and second widths along a second direction 167 (parallel to y-direction) which may be about equal. In some embodiments, the third and fourth end regions 43 and 44 have substantially constant third and fourth widths along a first direction 150 (parallel to x-direction) which may be about equal. In some embodiments, the first, second, third and fourth widths are about equal.

In some embodiments, the optical film 600 is disposed adjacent first, second, third and fourth rollers 620, 625, 653 and 654, respectively. In other embodiments, the first, second, third and fourth rollers 620, 625, 653 and 654 are omitted. The first and second rollers 620 and 625 may be configured to move along the first direction 150 and may be moved so that the respective shortest distance between a point on the optical film 600 contacting the respective roller and a point contacting a curved mold surface of the mold 650 is maintained in a preferred range which may be any of the ranges described elsewhere herein for d1 and d2. Similarly, the third and fourth rollers 653 and 654 may be configured to move along the second direction 167 and may be moved so that the respective shortest distance between a point on the optical film 600 contacting the respective roller and a point contacting the curved mold surface of the mold 650 is maintained in a preferred range which may be any of the ranges described elsewhere herein for d1 and d2.

The first and second rollers 620 and 625 may be replaced with pairs of rollers as illustrated in FIGS. 2-3, for example. In this case, the third and fourth rollers 653 and 654 may be referred to as fifth and sixth rollers. The third and fourth rollers 653 and 654 may also be replaced with pairs of rollers as illustrated in FIGS. 2-3, for example.

In some embodiments, stretching the optical film 600 during the shaping step comprises stretching the optical film along the first direction 150 greater than 3 times, or greater than 5 times, or greater than 7 times any stretching along the second direction 167. In some embodiments, the shaping step comprises changing positions of the first and second ends of the optical film 600 to control a first tension in the optical film 600 along the first direction 150. In some embodiments, this is achieved by moving the first and second securing means 630 and 635 along the first direction 150. In other embodiments, at least one of the first and second securing means 630 and 635 comprises a roller for securing the optical film 600 and includes a rotary stage to rotate the roller to control the first tension. In some embodiments, the shaping step comprises changing positions of the third and fourth ends of the optical film 600 to control a second tension in the optical film 600 along the second direction 167. In some embodiments, this is achieved by moving the third and fourth securing means 633 and 637 along the second direction 167. In other embodiments, third and fourth securing means 633 and 637 comprises a roller for securing the optical film 600 and includes a rotary stage to rotate the roller to control the second tension. In some embodiments, the first tension is greater than 2 times, or greater than 3 times, or greater than 5 times the second tension.

In some embodiments, the shaping step comprises changing positions of the third and fourth ends, which are in the third and fourth securing means 633 and 637, of the optical film 600 to reduce or eliminate buckling of the optical film 600 in the second direction 167. In some embodiments, there is substantially no stretching of the optical film 600 along the second direction 167. For example, a tension in the second direction 167 may be applied to keep the optical film 600 from contracting in the second direction 167, but the length of the film as measured along a curve in the second direction may not change, or may change by less than 5%, during the shaping of the optical film 600.

In some embodiments, the optical film is pre-stretched along the first direction 150 more than the second direction 167 prior to shaping (e.g., at least 2, or at least 3, or at least 5 times more). In some embodiments, the steps of securing, pre-stretching, and shaping are carried out sequentially.

In some embodiments, an optical film is cut into a shape having a central region and first through sixth end regions. This is useful for shaping the optical film into a shape having a substantially larger diameter in a first direction than in an orthogonal second direction as illustrated in FIG. 7.

Figure 7:
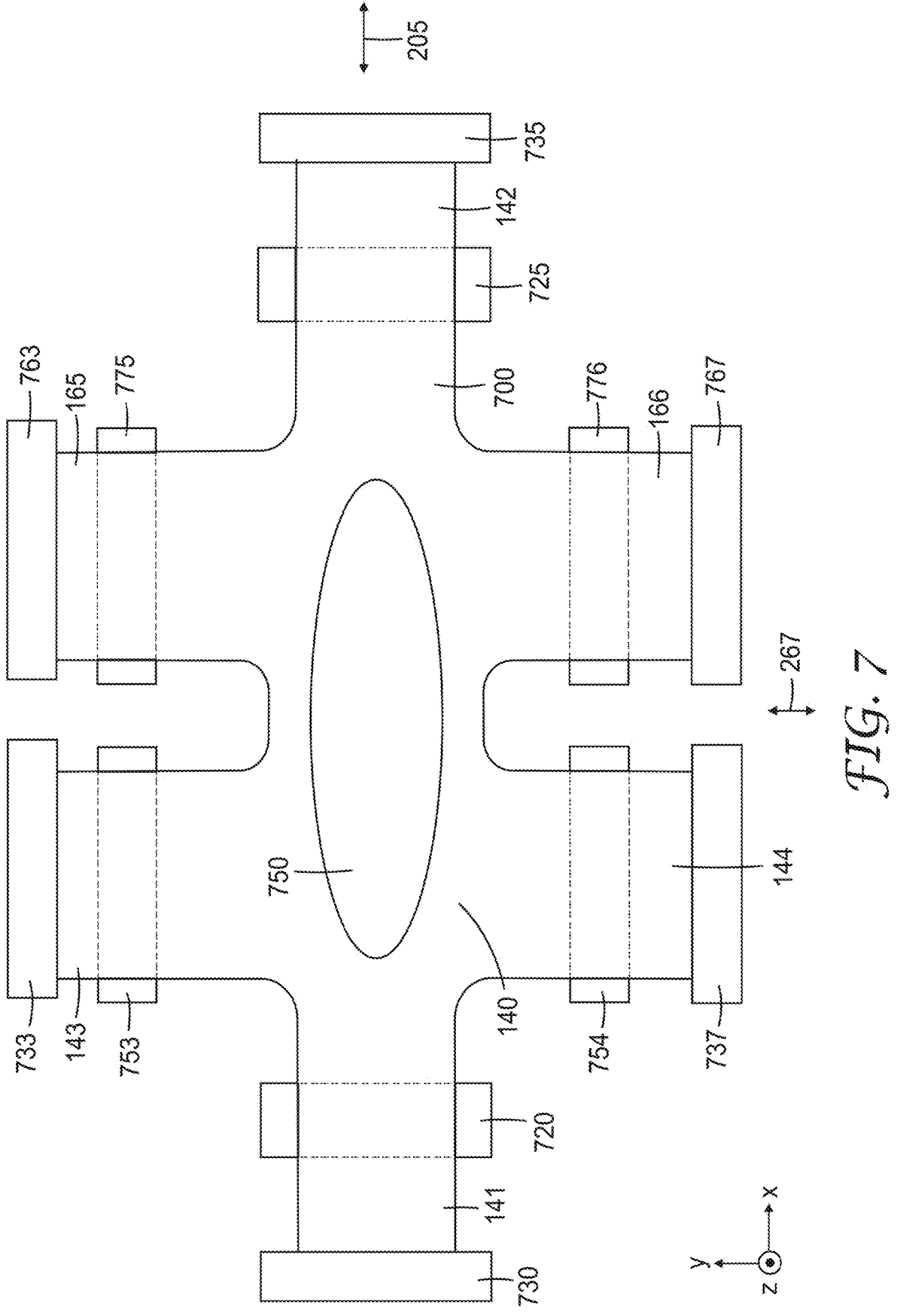

FIG. 7 is a schematic top view of a mold 750 disposed over an optical film 700 including a central region 140 disposed between first and second ends, between third and fourth ends, and between fifth and sixth ends. The first, second, third, fourth, fifth, and sixth ends are secured in first, second, third, fourth, fifth and sixth securing means 730, 735, 733, 737, 763, and 767, respectively, which may be grips or rollers as described further elsewhere herein. The optical film 700 includes first and second end regions extending 141 and 142 from the central region 140 to the first and second ends, respectively; includes third and fourth end regions 143 and 144 extending from the central region 40 to the third and fourth ends, respectively; and includes fifth and sixth end regions 165 and 166 extending from the central region 40 to the third and fourth ends, respectively. In some embodiments, the first and second end regions 141 and 142 have substantially constant first and second widths along a second direction 267 (parallel to y-direction) which may be about equal. In some embodiments, the third and fourth end regions 143 and 144 have substantially constant third and fourth widths along a first direction 205 (parallel to x-direction) which may be about equal. In some embodiments, the fifth and sixth end regions 165 and 166 have substantially constant fifth and sixth widths along the first direction 205 which may be about equal. In some embodiments, the first, second, third, fourth, fifth, and sixth widths are about equal.

In some embodiments, the optical film 700 is disposed adjacent first, second, third, four, fifth, and sixth rollers 720, 725, 753, 754, 775, and 776, respectively. In other embodiments, the first, second, third, fourth, fifth, and sixth rollers 720, 725, 753, 754, 775 and 776 are omitted. The first, second, third, and fourth rollers 720, 725, 753 and 754 may be configured to move (along the first direction 205 for the first and second rollers 720 and 725, and along the second direction 267 for the third and fourth rollers 753 and 754) to maintain the respective shortest distance between a point on the optical film 700 contacting the respective roller and a point contacting the curved mold surface of the mold 750 as described for first, second, third, and fourth rollers 620, 625, 653 and 654. Similarly, the fifth and sixth rollers 775 and 776 may be configured to move along the second direction 267 and may be moved so that the respective shortest distance between a point on the optical film 700 contacting the respective roller and a point contacting the curved mold surface of the mold 750 is maintained in a preferred range which may be any of the ranges described elsewhere herein for d1 and d2.

The optical film 600 or the optical film 700 may be heated prior to (and optionally during) the shaping step as described for optical film 100. The mold and rollers may also be heated prior to and optionally during the shaping step.

The methods of FIGS. 6-7 can also be used to alter a thickness distribution of the optical film 600 or 700 without shaping the optical film into a curved shape. This can be done by suitably selecting the tensions in the first and second directions when the optical film is stretched.

Figure 8A:
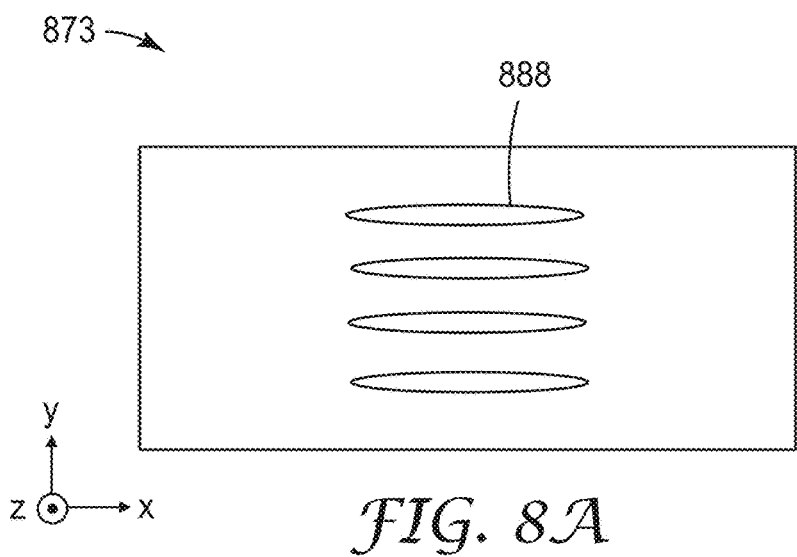
FIG. 8A is a schematic top view of a portion of an optical film exhibiting buckling.
Figure 8B:
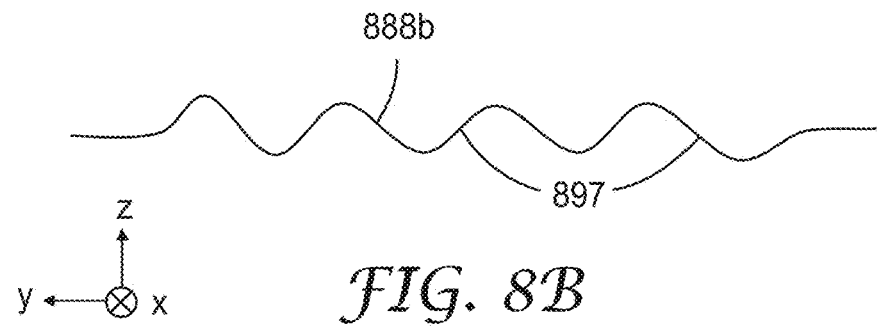
FIG. 8B is a schematic cross-sectional view through buckles in the optical film of FIG. 8A.

FIG. 8A is a schematic top view of a portion 873 of an optical film exhibiting buckling. Buckles 888 are illustrated. A cross-sectional view through buckles 888b in an optical film is schematically illustrated in FIG. 8B. Buckles 888b may correspond to buckles 888. The buckling exhibited in FIGS. 8A-8B is along the y-direction. Buckles are characterized by a curvature changing sign. Buckles 888b have positive and negative curvature regions in the cross-section of FIG. 8B with points where the curvature changes sign. The portion 873 may be any portion of the optical film between first and second rollers spaced apart along the x-direction (e.g., first and second rollers 20 and 25), may be any portion of the optical film between third and fourth rollers spaced apart along the y-direction (e.g., third and fourth rollers 653 and 654), or may be any portion of the optical film that has or will make contact with a curved mold surface during the shaping of the optical film. When a buckled film is formed onto the mold, there can be regions of negative Gaussian curvature where a local saddle shape results from buckling along one direction while being curve along an orthogonal direction. In this case, there are locations where the Gaussian curvature changes sign. In some embodiments, the methods of the present description result in a shaped optical film having a Gaussian curvature that is non-negative throughout the shaped optical film. In some embodiments, the Gaussian curvature is positive throughout the shaped optical film.

Reducing the amplitude of the oscillations shown in FIG. 8B and/or reducing the number of buckles 888b can be described as reducing the buckling in the optical film. In some embodiments, the methods described herein reduce or eliminate buckling of the optical film.

Figure 8C:
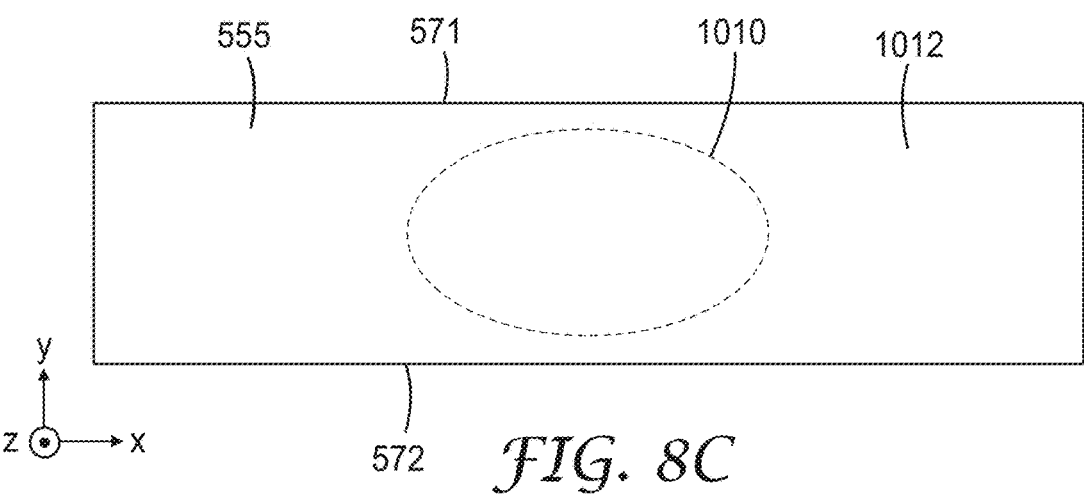
FIG. 8C is a schematic front plan view of an optical film illustrating a predetermined region of the optical film.

FIG. 8C is a schematic front plan view of an optical film 555 illustrating a predetermined region 1010. Optical film 555 may correspond to any of the optical films of the present description (e.g., optical film 100, optical film 100b, optical film 200, optical film 300, optical film 400) before the predetermined region 1010 is removed from remaining portions 1012 the optical film. Optical film 555 can be understood to have been shaped but the curvature is not shown in the schematic front plan view of FIG. 8C. In some embodiments, after shaping the optical film 555, portions 1012 of the optical film 555 outside a predetermined region 1010 of the optical film 555 are removed (e.g., by cutting). The predetermined region 1010 may correspond to a major surface of an optical lens, for example. In some embodiments, the shaped optical film has no points in the predetermined region 1010 where a curvature changes sign. In some embodiments, the shaped optical film has no buckling in the predetermined region 1010. In some embodiments, the methods of the present description include the step of removing portions 1012 so that the resulting shaped optical film corresponds to the predetermined region 1010. In some embodiments, the optical film during and after shaping but before removing portions 1012, the optical film has no buckling except for possibly along longitudinal edges 571 and/or 572 outside the predetermined region 1010. In some embodiments, the optical film has buckling along longitudinal edges 571 and/or 572 during the shaping step which is subsequently removed due to thermally induced shrinkage of the optical film along the longitudinal edges 571 and/or 572.

Figure 9A:
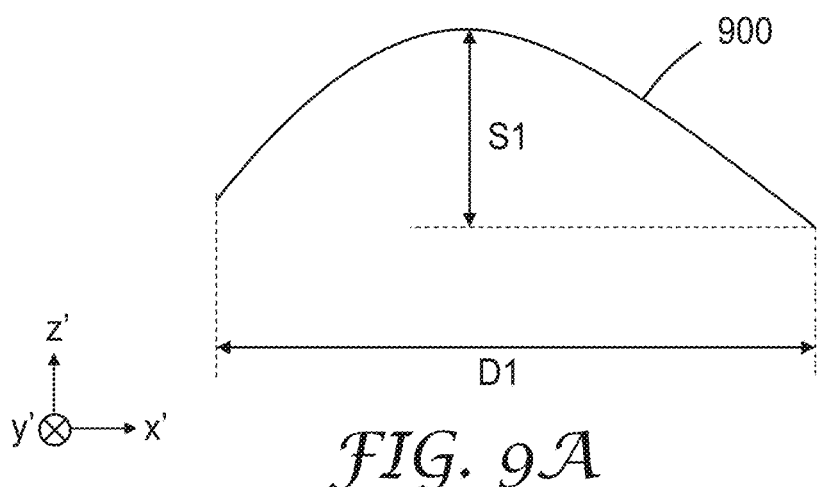
FIGS. 9A-9B are schematic cross-sectional views of an optical film in orthogonal planes.
Figure 9B:
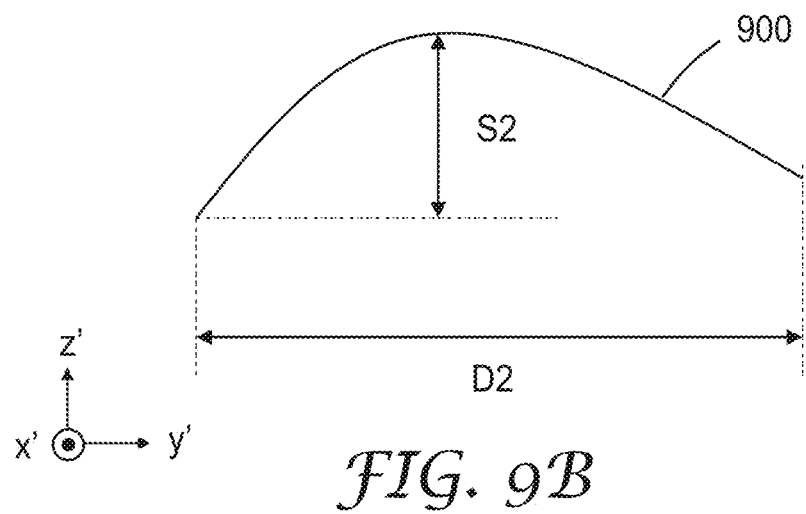

Optical films may be described as having some specified variation along a first direction and some specified variation along an orthogonal second direction. The first and second directions can be any orthogonal directions relative to the optical film where the specified variations hold. In some cases, it may be desired to specify specific first and second directions as described further elsewhere herein. The first and second directions used to describe the optical film may or may not correspond to the first and second directions referred to in describing the methods of shaping the optical film. The maximum sag of the optical film along the first direction can be described as the maximum displacement of the optical film along a third direction orthogonal to the first and second directions in a plane containing the first and third direction. Similarly, the maximum sag of the optical film along the second direction can be described as the maximum displacement of the optical film along the third direction in a plane containing the second and third directions. This is schematically illustrated in FIGS. 9A-9B. The first, second, and third directions are the x', y', and z' directions, respectively. The optical film 900 has a first maximum sag S1 and a corresponding first diameter D1 along the first direction, and has a second maximum sag S2 and a corresponding second diameter D2 along the second direction.

In some embodiments a first ratio, S1/D1, of the first maximum sag S1 to the corresponding first diameter D1 along the first direction is at least 0.05, or at least 0.1, or at least 0.15, or at least 0.2, or at least 0.3, or at least 0.4, or at least 0.5, or at least 0.7. In some embodiments, the first ratio is less than 1, or less than 0.9, or less than 0.8. In some embodiments a second ratio, S2/D2, of the second maximum sag S2 to the corresponding second diameter D2 along the second direction is at least 0.05, or at least 0.1, or at least 0.15, or at least 0.2, or at least 0.3, or at least 0.4. In some embodiments, the second ratio is less than 0.8, or less than 0.7, or less than 0.6, or less than 0.5. In some embodiments, the second ratio is less than the first ratio. In some embodiments, the first ratio is substantially larger (e.g., a factor of 1.5, or a factor of 2 larger) than the second ratio. In some embodiments, the second ratio is about equal to the first ratio.

Figure 10A:
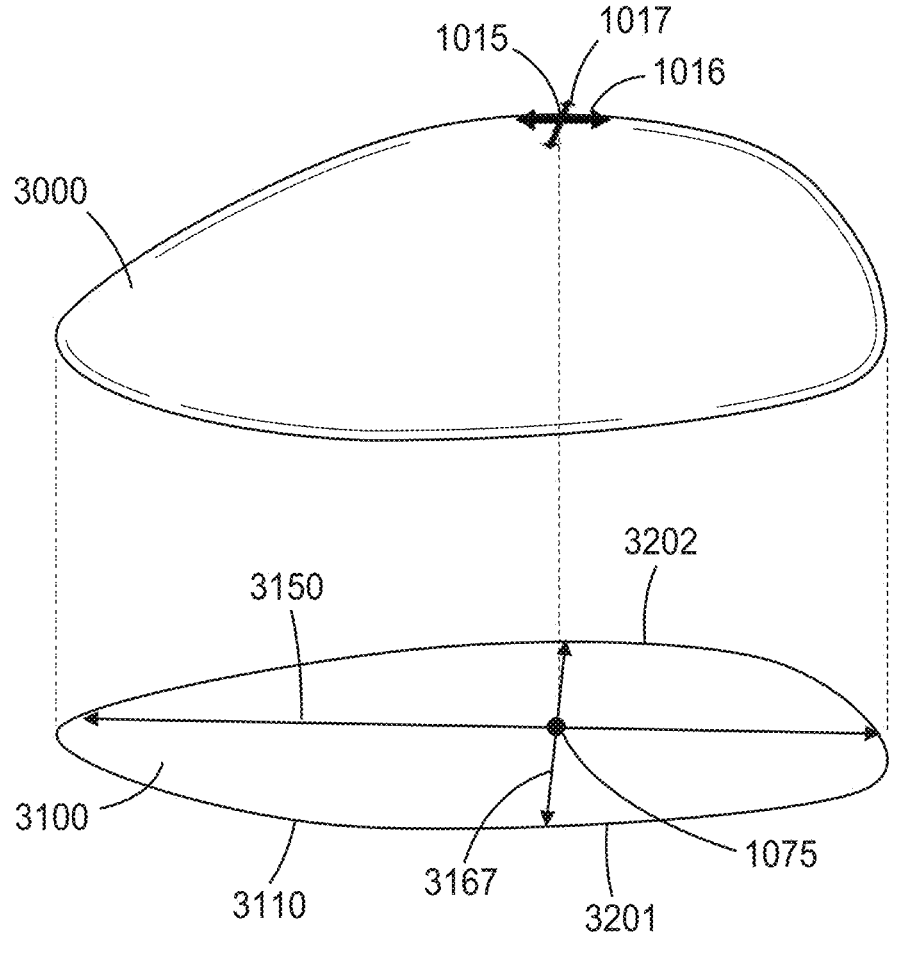
FIG. 10A-10C are schematic perspective views of an optical film.
Figure 10B:
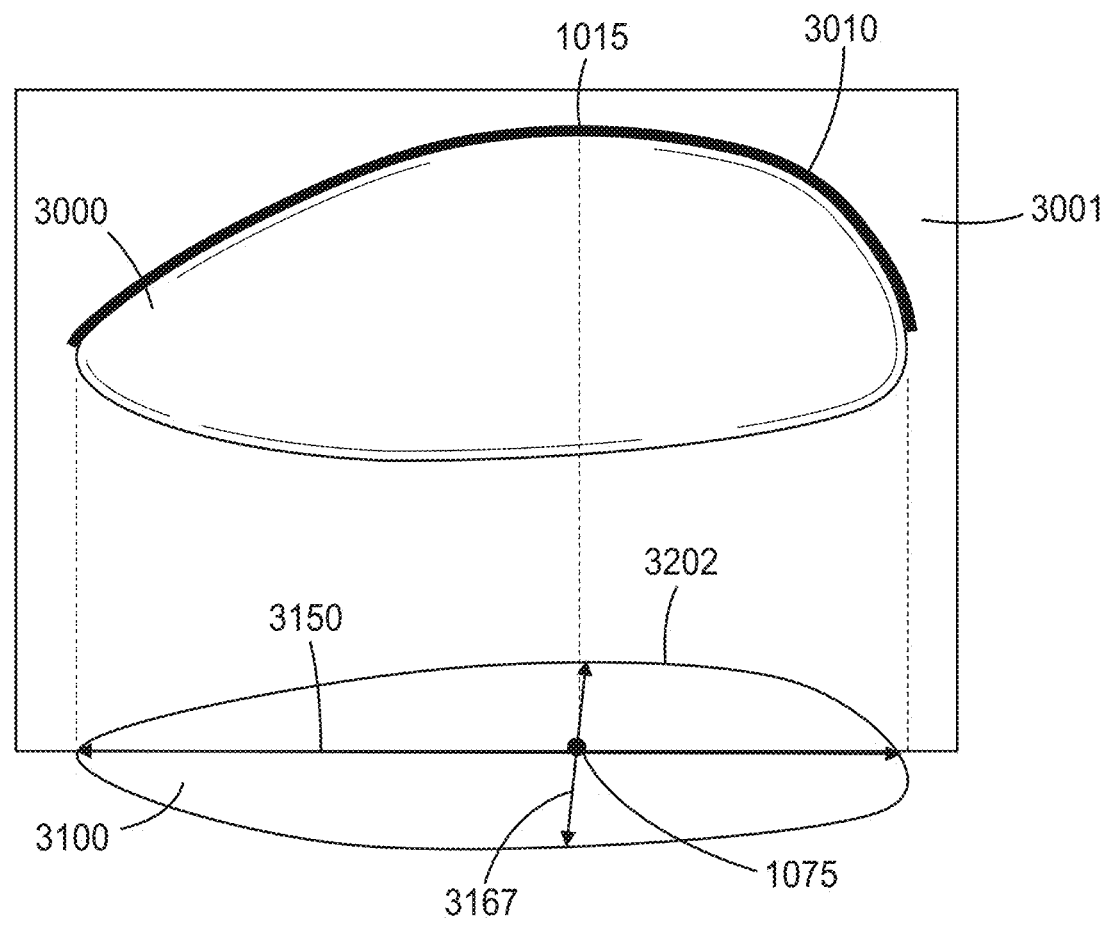
Figure 10C:
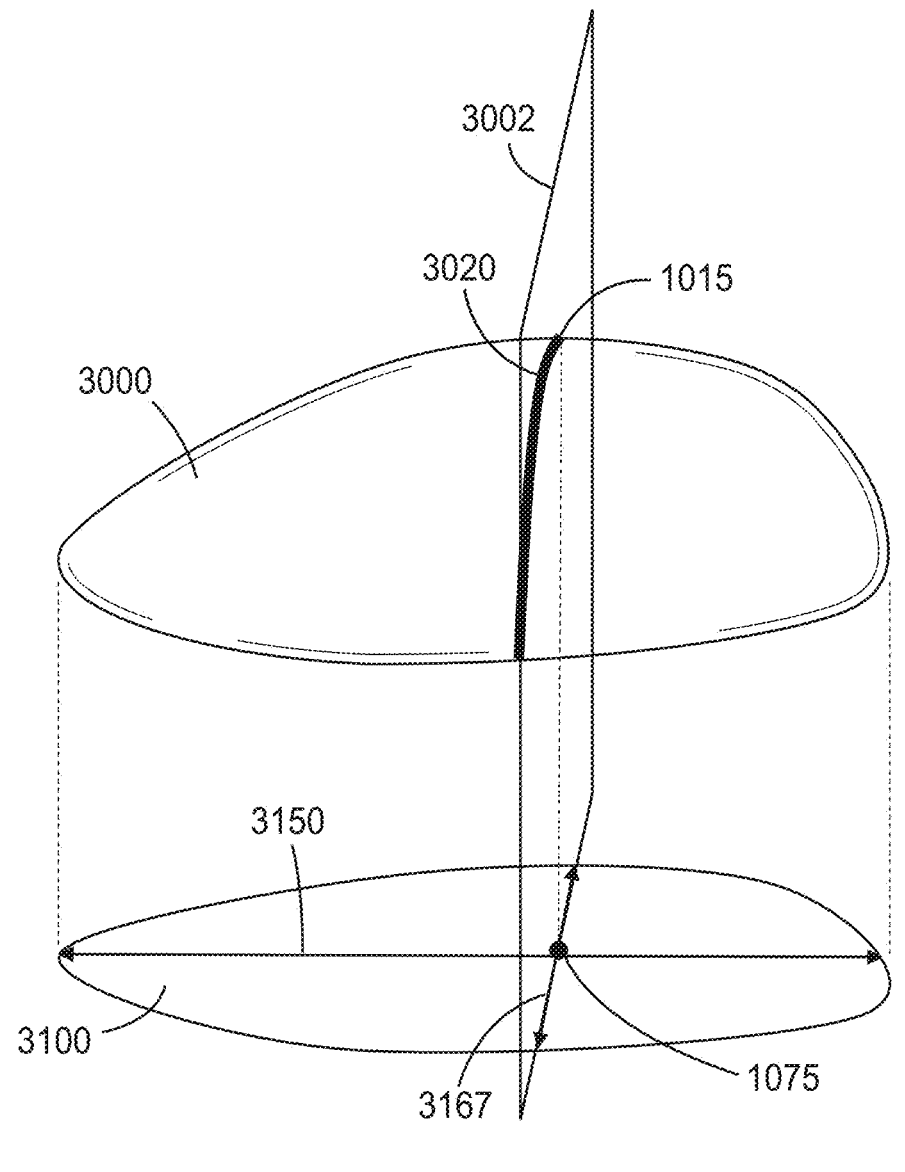

FIG. 10A-10C are schematic perspective views of optical film 3000. A reference plane 3100 is defined such that the optical film 3000 has a maximum projected area 3110 in the reference plane 3100, the optical film 3000 and the reference plane 3100 do not intersect, and at least a majority (e.g., at least 60%, or at least 80%, or all) of the total area of the optical film 3000 is concave toward the reference plane 3100. The optical film 3000 has an apex 1015 which is the farthest point on the optical film 3000 from the reference plane 3100. A projection 1075 of the apex 1015 onto the reference plane 3100 is illustrated. First and second directions 3150 and 3167 in the reference plane 3100 are illustrated. Each of the first and second directions 3150 and 3167 are in the reference plane 3100 and pass through the projection 1075 of the apex 1015 onto the reference plane 3100. First and second directions 1016 and 1017 in a tangent plane at the apex 1015 are also illustrated. First direction 1016 may be parallel to first direction 3150, and second direction 1017 may be parallel to second direction 3167. Typically, properties of the optical film 3000 can be equivalently specified in terms of first and second directions in the reference plane and in terms of first and second directions in the tangent plane.

In general, when the optical film 3000 has some specified variations along orthogonal first and second directions, the first and second directions 3150 and 3167 can be taken to be any orthogonal directions where optical film 3000 has the specified variations. In some cases, it is convenient to specifically define the first and second directions 3150 and 3167 in terms of properties of the optical film 3000. There are at least two useful definitions of the first and second directions 3150 and 3167.

In some embodiments, properties of the optical film 3000 (e.g., first and second sag to diameter ratios described further elsewhere herein) are specified relative to first and second directions 3150 and 3167 where the second direction 3167 is along a shortest distance between opposing sides 3201 and 3202 of the projected area 3110 through the projection 1075 of the apex onto the reference plane 3100 and the first direction 3150 is along an orthogonal direction in the reference plane 3100 through the projection 1075 of the apex 1015.

In some embodiments, the optical film 3000 is a reflective polarizer. In some embodiments, properties of the reflective polarizer (e.g., first and second sag to diameter ratios described further elsewhere herein) are specified relative to first and second directions 1016 and 1017 where the first direction 1016 is along a block axis of the reflective polarizer at the apex 1015 and the second direction 1017 is along the pass axis of the reflective polarizer at the apex 1015.

Planes parallel to the reference plane 3100 that satisfy the conditions that the optical film and the plane do not intersect and that at least a majority of the total area of the optical film is concave toward the plane result in equivalent definitions of first and second directions. If there is more than one non-parallel plane having a same maximum projected area and satisfying these conditions, then the first and second directions may be taken to be orthogonal directions where the specified variations (e.g., sag ratios) hold and which are in a plane parallel to one of the planes having the maximum projected area. If one of these planes results in apex closer to a center of the film along each of the first and second directions as defined relative to that plane than the other planes having the maximum projected area, then that plane may be used to define the first and second directions.

In some embodiments, properties of an optical film are specified for first and second curves or along the first and second curves. The first curve may be given as an intersection of the optical film with a first plane orthogonal to the second direction and to the reference plane. The first plane may contain the first direction and may contain an apex of the optical film. Similarly, the second curve may be an intersection of the optical film with a second plane orthogonal to the first direction and to the reference plane. The second plane may contain the second direction and may contain the apex of the optical film. Here, the first and second directions may correspond to the first and second directions 3150 and 3167 or may correspond to the first and second directions 1016 and 1017.

FIG. 10B shows a first plane 3001 which is orthogonal to the second direction 3167 and to the reference plane 3100. In the illustrated embodiment, the first plane 3001 contains the first direction 3150 and the apex 1015. A first curve 3010 being an intersection of the optical film 3000 with the first plane 3001 is illustrated.

FIG. 10C shows a second plane 3002 which is orthogonal to the first direction 3150 and to the reference plane 3100. In the illustrated embodiment, the second plane 3002 contains the second direction 3167 and the apex 1015. A second curve 3020 being an intersection of the optical film 3000 with the second plane 3002 is illustrated. In some embodiments, the intersection of the first and second planes 3001 and 3002 defines a line 3888 which is normal to the optical film 3000 at an intersection of the first and second curves 3010 and 3020.

In some cases, it is useful to characterize the shape of the optical film in terms of Gaussian curvature and/or total curvature. The Gaussian curvature is the product of the principle curvatures. For example, if the principle curvatures at the apex 1015 of the optical film 3000 occur in the first and second planes 3001 and 3002, the Gaussian curvature at the apex can be expressed as the product of the curvatures at the apex 1015 of the first and second curves 3010 and 3020. If, in addition, the first and second curved 3010 and 3020 have radii of curvature of r1 and r2 at the apex 1015, the Gaussian curvature at the apex can be expressed as $1/(r1*r2)$. In some embodiments, each location over at least 80%, or at least 90%, or at least 95% of the total area of the optical film has a Gaussian curvature of at least $0.0001 \text{ cm}^{-2}$, or at least $0.001 \text{ cm}^{-2}$, or at least $0.005 \text{ cm}^{-2}$. In some embodiments, each location over at least 80%, or at least 90%, or at least 95% of the total area of the optical film has a Gaussian curvature of no more than $100 \text{ cm}^{-2}$, or no more than $1 \text{ cm}^{-2}$, or no more than $0.2 \text{ cm}^{-2}$. The curvature of the optical film can also be characterized in terms of the total curvature which is the surface integral of the Gaussian curvature of the optical film over the total area of the optical film. In some embodiments, the optical film has a total curvature of at least 0.25, or at least 0.5, or at least 1, or at least 2, or at least 3. In some embodiments, the total curvature is no more than 10, or no more than 9, or no more than 8.

Figure 11A:
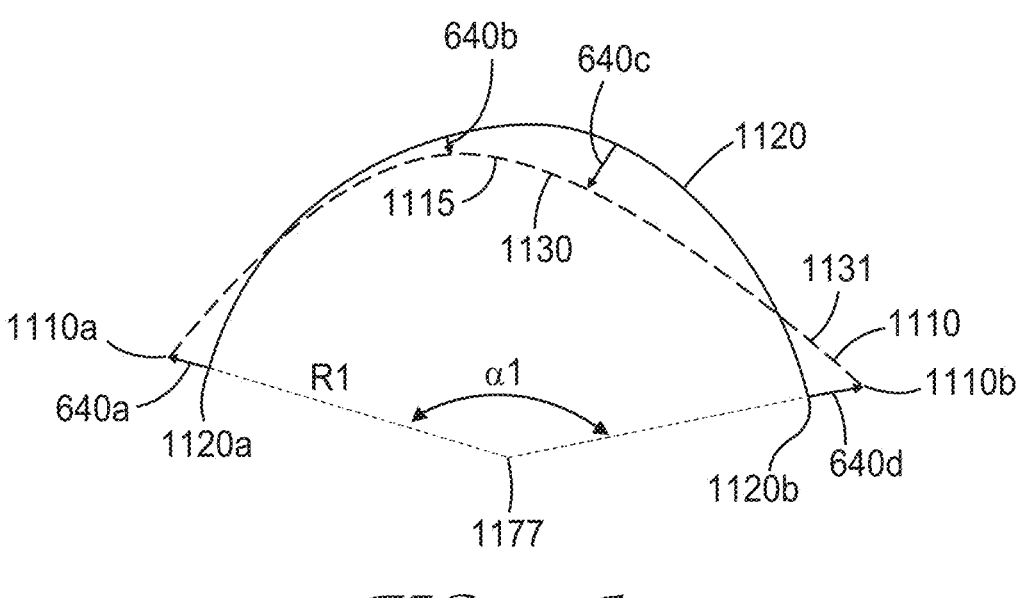
FIG. 11A is a schematic illustration of a first curve and a best-fit first circular arc.

FIG. 11A is a schematic illustration of a first curve 1110 and a best-fit first circular arc 1120. First curve 1110 may correspond to first curve 3010, for example. The best-fit first circular arc 1120 subtends an angle α1 at the center of curvature 1177 of the first circular arc 1120. The angle α1 is determined by the first curve 1110 since both a longer and a shorter circular arc would provide a poorer fit to the first curve 1110. The first circular arc 1120 has a radius R1 which is a distance from any point on the best-fit first circular arc 1120 (e.g., a first endpoint 1120a) to the center of curvature 1177. In some embodiments, the best-fit first circular arc 1120 is the circular arc that minimizes a sum of squared distances along normal vectors (e.g., distances along vectors 640a-640d) from the first circular arc 1120 to points on the first curve 1110. In some embodiments, a first endpoint 1110a of first curve 1110 is along a first normal vector 640a to the first circular arc 1120 at a first endpoint 1120a of the first circular arc 1120, and an opposite second endpoint 1110b of the first curve 1110 is along a second normal 640d to the first circular arc 1120 at an opposite second endpoint 1120b of the first circular arc 1120. In some embodiments, the points on the first curve 1110 used in the best-fit minimization are selected from a predetermined set of points uniformly distributed over the first curve 1110. In some embodiments, the points on the first circular arc 1120 used in the minimization are selected from a predetermined set of points uniformly distributed over the first circular arc 1120. In some embodiments, the predetermined set of points is a set of 10 to 500 points.

Figure 11B:
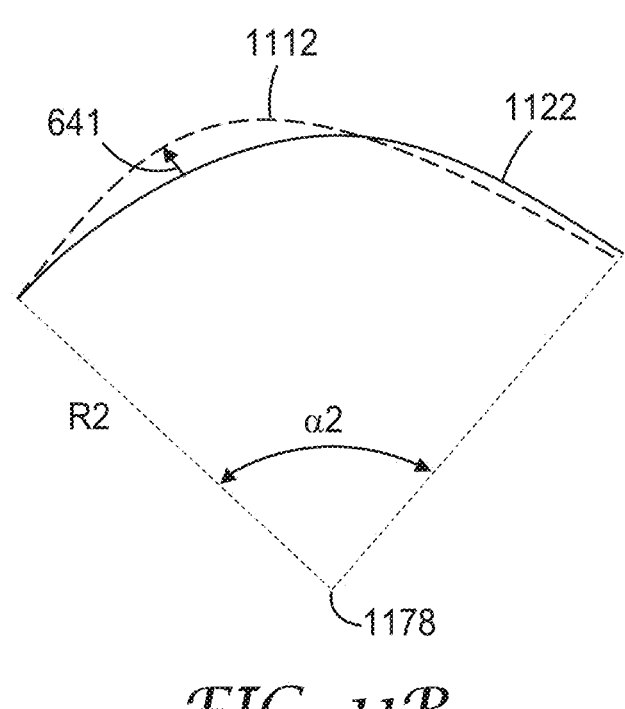
FIG. 11B is a schematic illustration of a second curve and a best-fit second circular arc.

FIG. 11B is a schematic illustration of a second curve 1112 and a best-fit second circular arc 1122. Second curve 1112 may correspond to second curve 3020, for example. The best-fit circular arc subtends an angle α2 at the center of curvature 1178 of the second circular arc 1122. The angle α2 is determined by the second curve 1112 since both a longer and a shorter circular arc would provide a poorer fit to the second curve 1112. The second circular arc 1122 has a radius R2 which is a distance from any point on the best-fit second circular arc 1122 to the center of curvature 1178. The best fit can be determined as described for the first curve 1110. In some embodiments, the best-fit second circular arc 1122 is the circular arc that minimizes a sum of squared distances along normal vectors (e.g., distances along vector 641) from the second circular arc 1122 to points on the second curve 1112. In some embodiments, a first endpoint of the second curve 1112 is along a first normal vector to the second circular arc 1122 at a first endpoint of the second circular arc 1122, and an opposite second endpoint of the second curve 1112 is along a second normal to the second circular arc 1122 at an opposite second endpoint of the second circular arc 1122. In some embodiments, the points on the second curve 1112 used in the best-fit minimization are selected from a predetermined set of points uniformly distributed over the second curve 1112. In some embodiments, the points on the second circular arc 1122 used in the minimization are selected from a predetermined set of points uniformly distributed over the second circular arc 1122. In some embodiments, the predetermined set of points is a set of 10 to 500 points.

A center 1115 of the optical film and first and second location 1130 and 1131 on the first curve 1110 are illustrated in FIG. 11A. The center 1115 may be where the first and second curves 1110 and 1112 cross and may be at an apex of the optical film as described further elsewhere herein. The second location 1131 is separated from the first location 1130 by a distance along the first curve of at least 0.6 R1, or at least 0.7 R1, or at least 0.8 R1, or at least R1, or at least 1.2 R1. A distance from the center 1115 of the optical film to the first location 1130 along the first curve is no more than 0.2 R1, or no more than 0.1 R1. A distance from the second location 1131 to an edge of the optical film (endpoint 1110b) along the first curve 1110 is no more than 0.2 R1, or no more than 0.1 R1. In some embodiments, the optical film has a first thickness at the first location 1130 and a second thickness at the second location 1131, where the first and second thicknesses differ by no more than 5%, or no more than 3%, or no more than 2%. In some embodiments, the optical film has a first long wavelength band edge at the first location 1130 and a second long wavelength band edge at the second location 1131, where the first and second long wavelength band edges differ by no more than 5%, or no more than 3%, or no more than 2%.

Figure 11C:
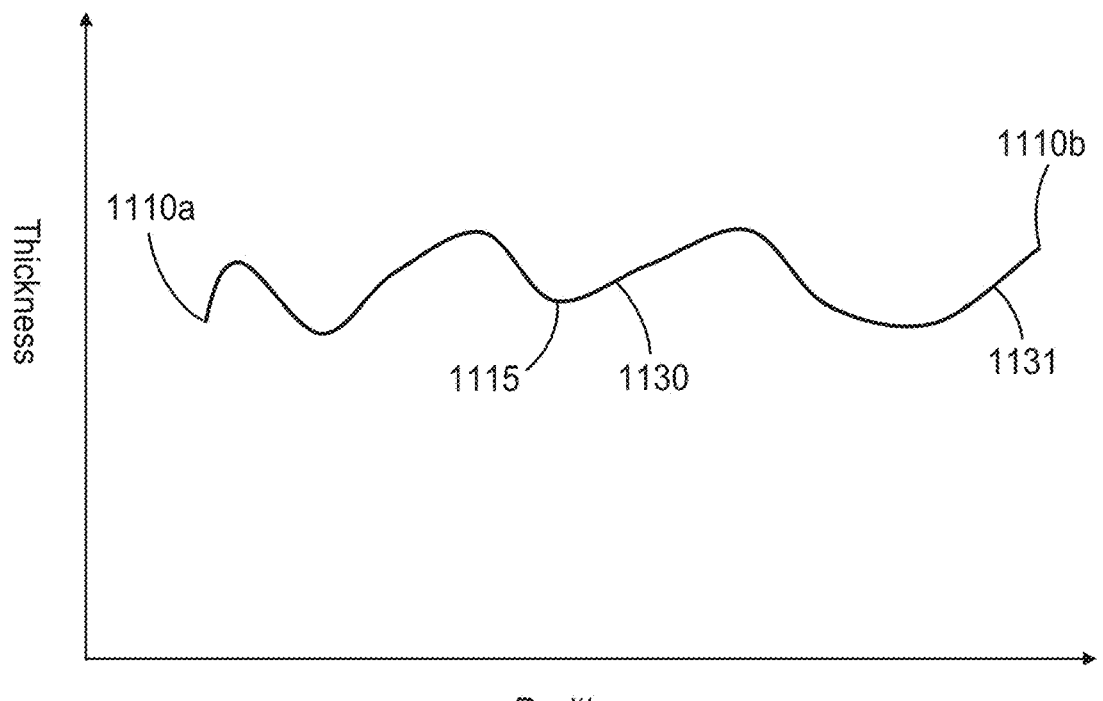
FIGS. 11C-11D are schematic plots of possible thickness profiles along the first curve of FIG. 11A.
Figure 11D:
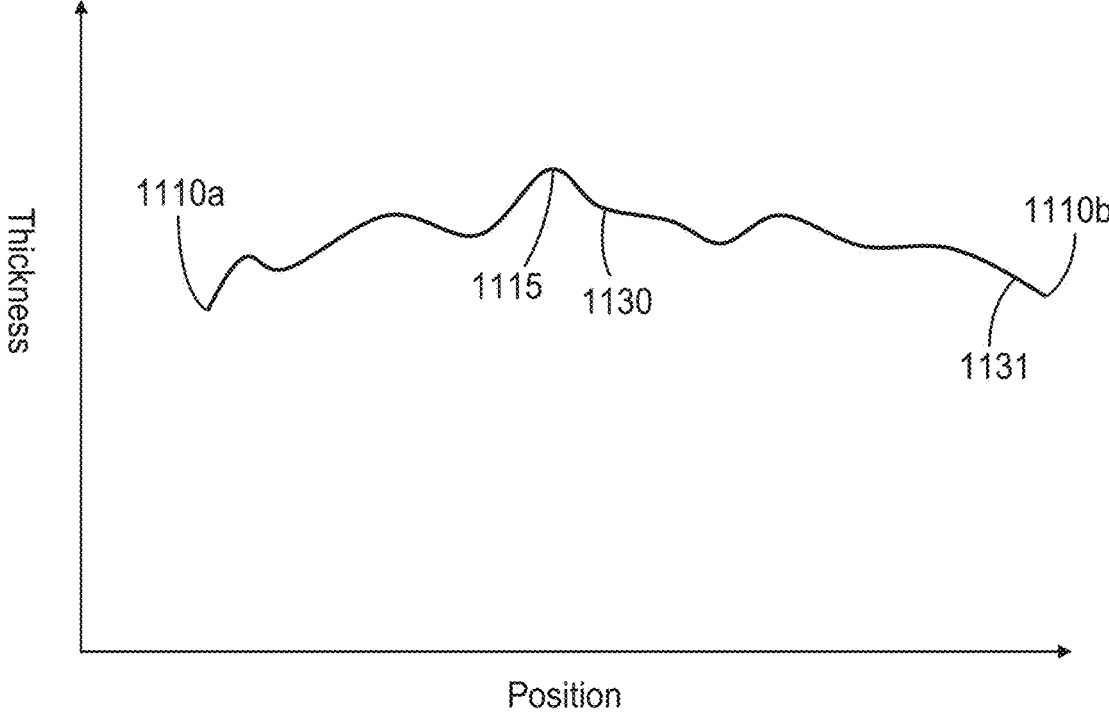
Figure 11E:
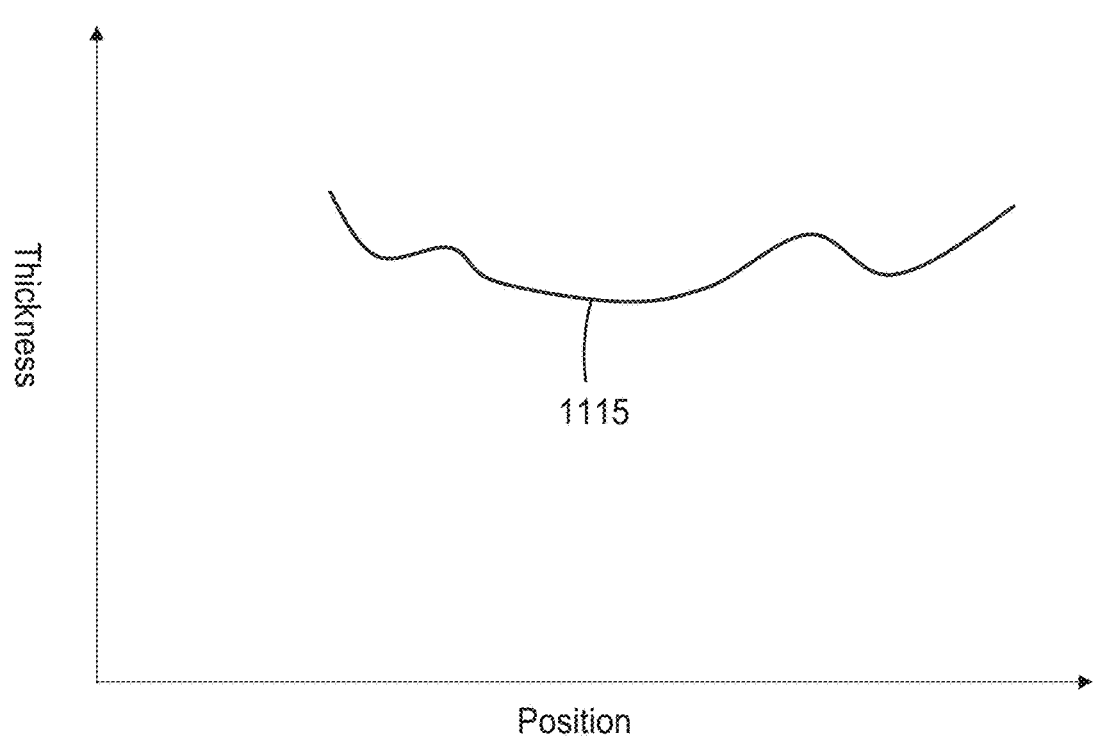
FIG. 11E is a schematic plot of a possible thickness profile along the second curve of FIG. 11B.
Figure 11F:
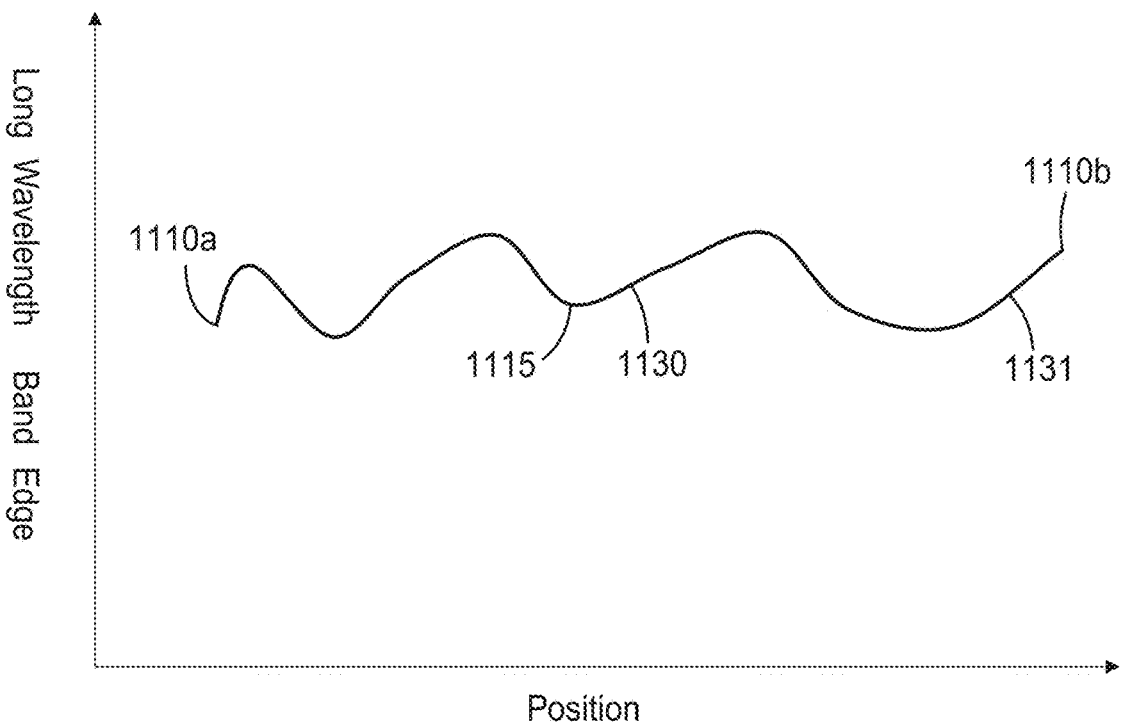
FIGS. 11F-11G are schematic plots of possible long wavelength band edge profiles along the first curve of FIG. 11A.
Figure 11G:
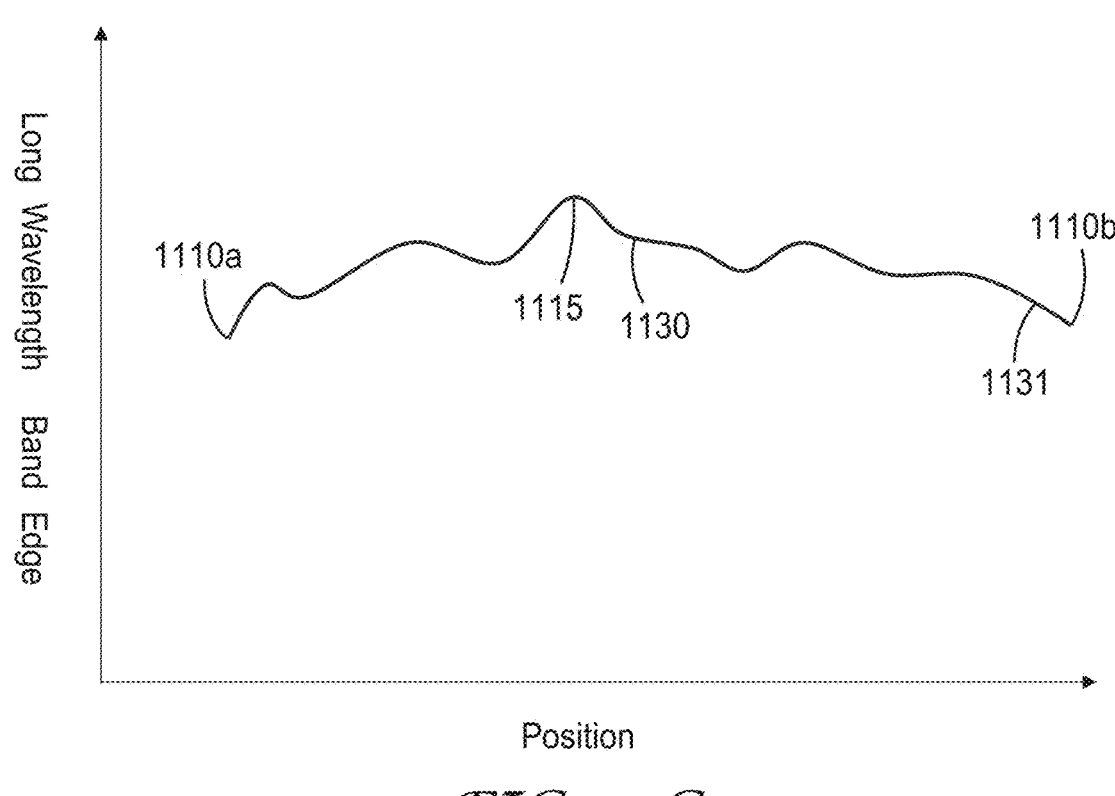
Figure 11H:
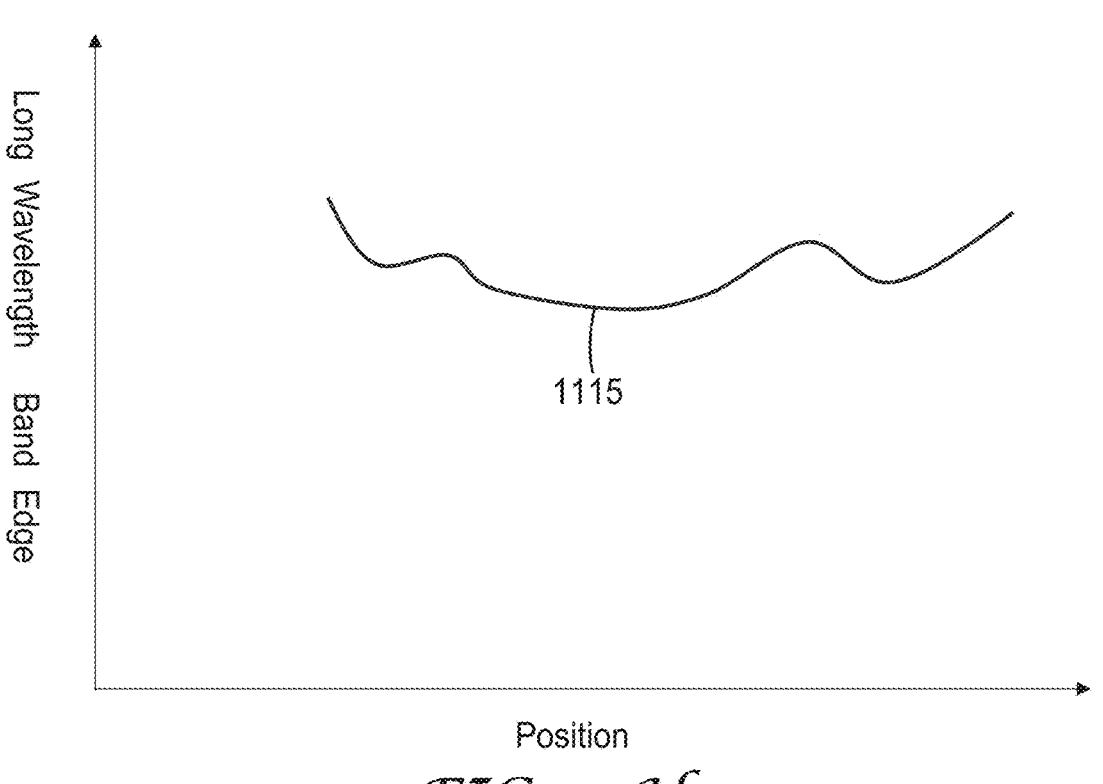
FIG. 11H is a schematic plot of a possible long wavelength band edge profile along the second curve of FIG. 1B.

FIG. 11C is a schematic plot of one possible thickness profile along the first curve 1110. FIG. 11G is a corresponding schematic plot of one possible long wavelength band edge profile along the first curve 1110. The long wavelength band edge may be proportional to or approximately proportional to the thickness and so may have a same or similarly shaped profile. The thickness (and/or long wavelength band edge) may be a local extremum (a local maximum, or a local minimum as shown in the illustrated embodiment) at the center 1115. The thickness (and/or long wavelength band edge) at the first location 1130 may be about equal to the thickness (and/or long wavelength band edge) at the second location 1131. The thickness (and/or long wavelength band edge) may vary non-monotonically from the first location 1130 to the second location 1131. Another possible thickness variation along the first curve 1110 is schematically illustrated in FIG. 11D and a corresponding possible long wavelength band edge variation along the first curve 1110 is schematically illustrated in FIG. 11G. In this case, the thickness (and/or long wavelength band edge) decreases non-monotonically from the center 1115 to the endpoints 1110a and 1110b along the first curve 1110. A possible thickness variation along the second curve 1112 is illustrated in FIG. 11E and a corresponding possible long wavelength variation along the second curve 1112 is illustrated in FIG. 11H. In this case, the thickness (and/or long wavelength band edge) increases non-monotonically from the center 1115 to endpoints along the second curve 1112. The thickness (and/or long wavelength band edge) distribution can be determined by applying the appropriate tension along the first direction in the forming of the optical film. The distribution may be non-monotonic or monotonic (see, e.g., FIGS. 15A-15D) from the center of the optical film. In some cases, it has been found that a smaller overall thickness variation (and/or smaller overall long wavelength band edge variation) can be achieved if the thickness (and/or long wavelength band edge) is allowed to vary non-monotonically in at least one direction. In some embodiments, a maximum thickness variation ((maximum thickness–minimum thickness)/maximum thickness) of the optical film is less than 12%, or less than 10%, or less than 8%, or less than 6%, or less than 5%, or less than 4%. In some embodiments, a maximum long wavelength band edge variation of the optical film is less than 12%, or less than 10%, or less than 8%, or less than 6%, or less than 5%, or less than 4%.

The largest angles α1 and α2 achievable by the methods of the present description are higher than those achievable in conventional thermoforming methods. For example, in some embodiments, α1 is greater than 180 degrees, or greater than 185 degrees, or greater than 190 degrees, or greater than 195 degrees, or greater than 200 degrees. Such large angles may be useful in head-mounted display applications, for example. In other embodiments, α1 is less than or equal to 180 degrees. In some embodiments, α1 is at least 90 degrees, or at least 100 degrees, or at least 110 degrees, or at least 120 degrees, or at least 130 degrees, or at least 140 degrees, or at least 150 degrees, or at least 160 degrees, or at least 170 degrees, or at least 180 degrees. In some embodiments, α2 is at least 30 degrees, or at least 40 degrees, or at least 50 degrees, or at least 60 degrees, or at least 70 degrees, or at least 80 degrees, or at least 90 degrees, or at least 100 degrees, or at least 110 degrees, or at least 120 degrees. In some embodiments, α1 is no more than 350 degrees, or no more than 320 degrees, or no more than 300 degrees, or no more than 280 degrees. In some embodiments, α2 is no more than 220 degrees, or no more than 200 degrees, or no more than 180 degrees, or no more than 160 degrees, or no more than 140 degrees. In some embodiments, α1 is greater than or equal to α2.

Figure 12:
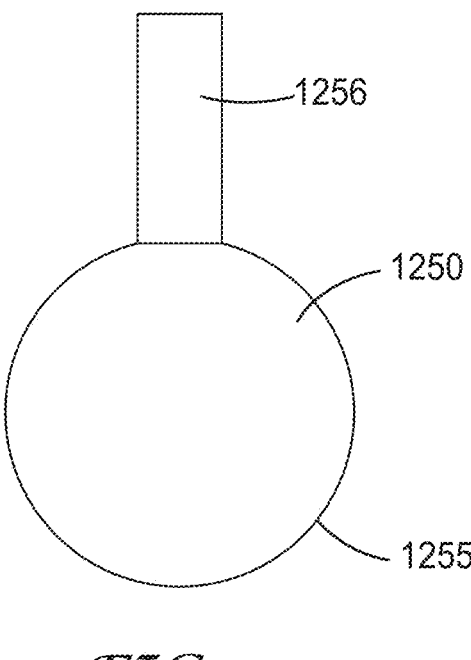
FIG. 12 is a schematic side-view of a mold.

FIG. 12 is a schematic side-view of a mold 1250 that can be used to shape an optical film to a subtended angle (e.g., α1 and optionally α2) greater than 180 degrees. Mold 1250 includes curved mold surface 1255 which, in in the illustrated embodiment, is greater than half of a surface of a sphere. Mold 1250 includes a portion 1256 for mounting to a mold actuator. In some embodiments, an optical film is shaped using mold 1250 and the optical film is sufficiently flexible and stretchable to allow it to be removed from the mold 1250 after shaping.

Figure 13:
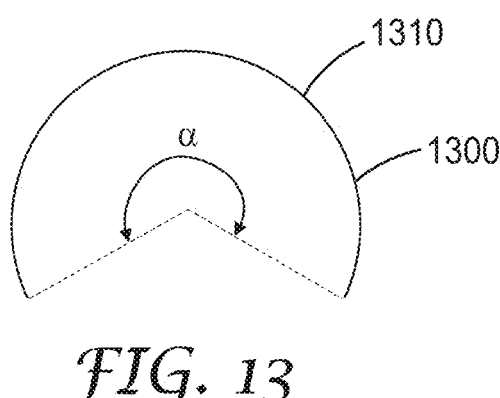
FIG. 13 is a schematic cross-sectional view an optical film.

FIG. 13 is a schematic cross-sectional view an optical film 1300 in a plane containing a first curve 1310. In the illustrated embodiment, the first curve 1310 is a circular arc subtending an angle α greater than 180 degrees. In other embodiments, the first curve 1310 may not be circular but may define a best-fit circular arc subtending an angle α greater than 180 degrees. In some cases, the angle α can approach 360 degrees (e.g., about 350 degrees). The arc angle along a second curve in an orthogonal direction may be less than or equal to the angle α.

Figure 14:
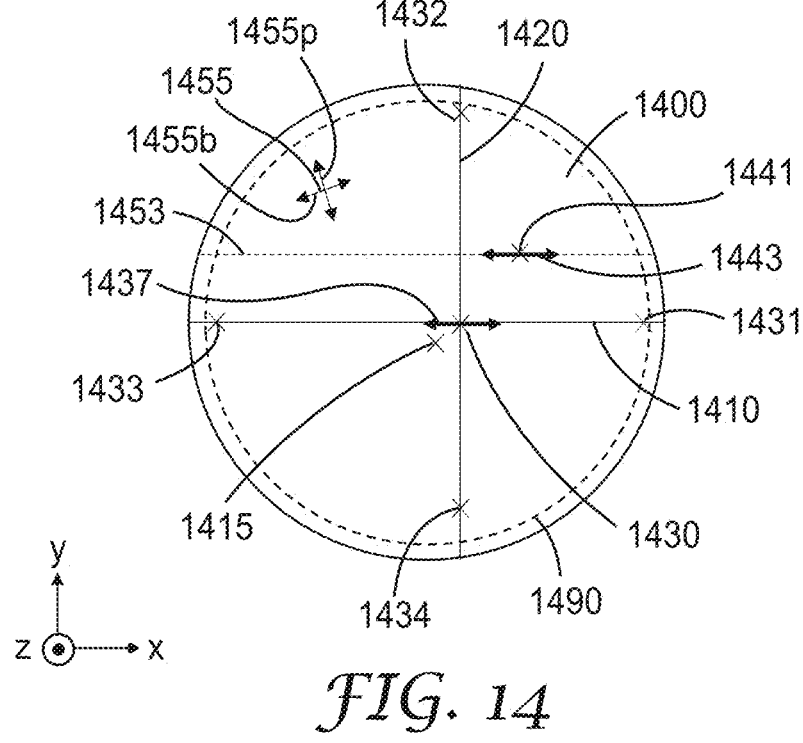
FIG. 14 is a schematic front plan view of an optical film.

FIG. 14 is a schematic front plan view of an optical film 1400. First and second curves 1410 and 1420 are illustrated. The first and second curves 1410 and 1420 intersect at a center location 1430. As used herein, a center location is a location at least twice as far from a closest edge of the optical film than from a center of the optical film, and an edge location is a location at least twice as far from the center of the optical film as from a closest edge of the optical film. The center can be understood to be the apex (farthest point from the reference plane) as described further elsewhere herein. In some embodiments, the first and second curves 1410 and 1420 intersect each other at the apex 1415.

Figure 15A:
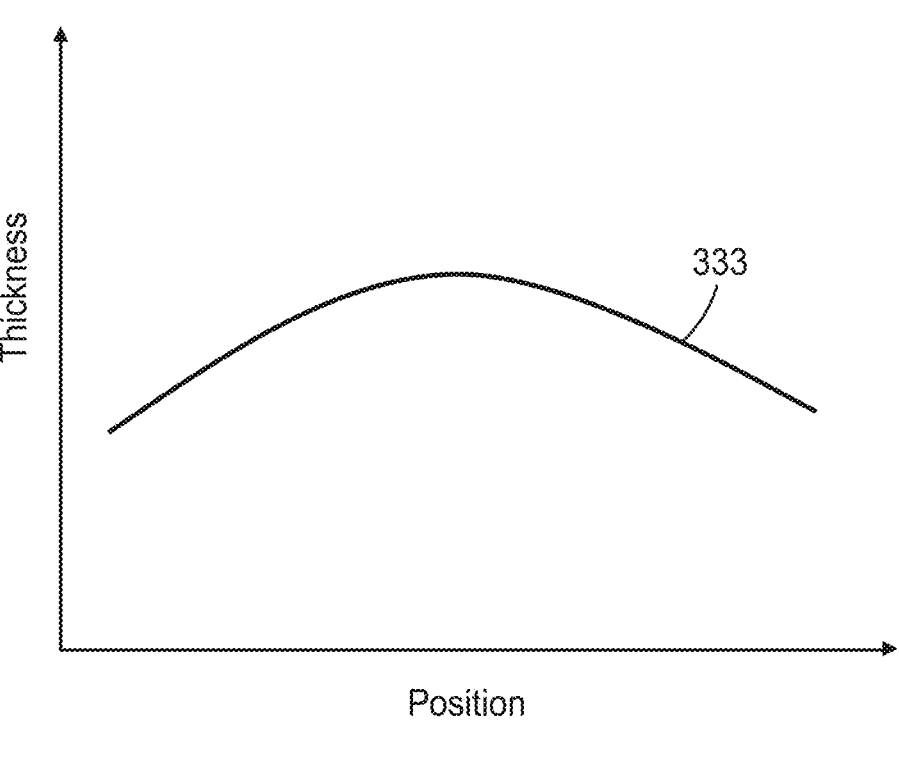
FIGS. 15A-15B are schematic illustrations of first and second thickness distributions.
Figure 15B:
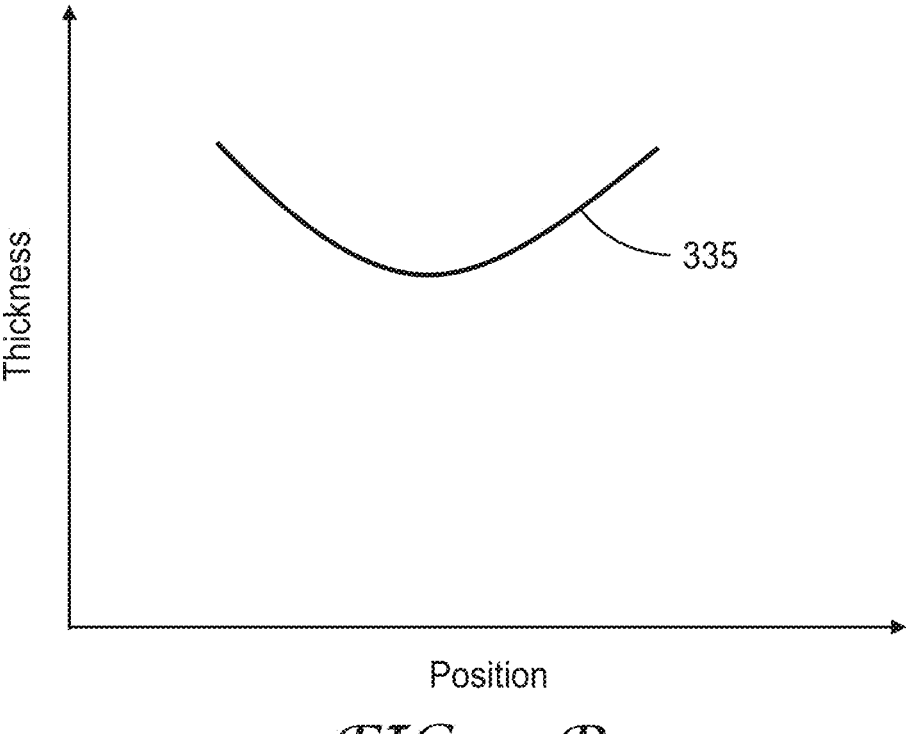

In some embodiments, the first and second curves 1410 and 1420 are defined by the intersection of the optical film 1400 with respective first and second planes orthogonal to each other and orthogonal to a reference plane (e.g., the x-y plane) in which the optical film 1400 has a maximum projected area. In some embodiments, the optical film has a first thickness distribution along the first curve 1410 that is substantially symmetric under reflection about the second plane and a second thickness distribution along the second curve 1420 that is substantially symmetric under reflection about the first plane, where the first and second thickness distributions are different. For example, the first thickness distribution may be as illustrated in FIG. 15A and the second thickness distribution may be as illustrated in FIG. 15B. A thickness distribution along a curve may be described as substantially symmetric under reflection about a plane if the thickness at each point over at least 70% of the length of the curve differs from the corresponding thickness at the reflected point by no more than 20%. In some embodiments, the thickness at each point over at least 80% of the length of the curve differs from the corresponding thickness at the reflected point by no more than 15%. In some embodiments, the thickness at each point over at least 90% of the length of the curve differs from the corresponding thickness at the reflected point by no more than 10%.

Figure 15C:
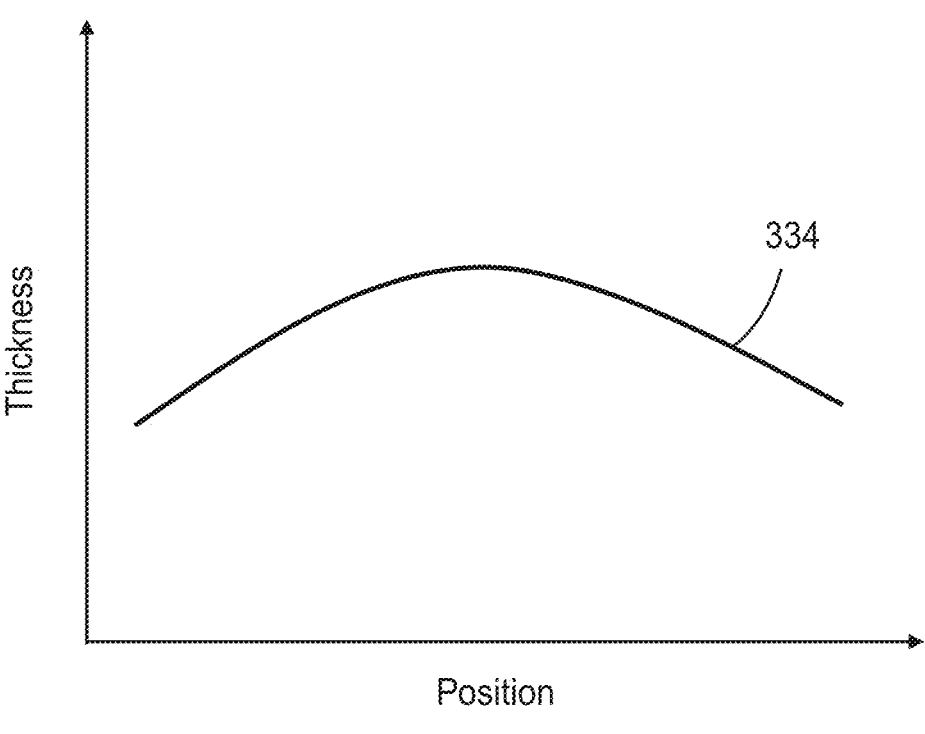
FIGS. 15C-15D are schematic illustrations of first and second long band width edge distributions.
Figure 15D:
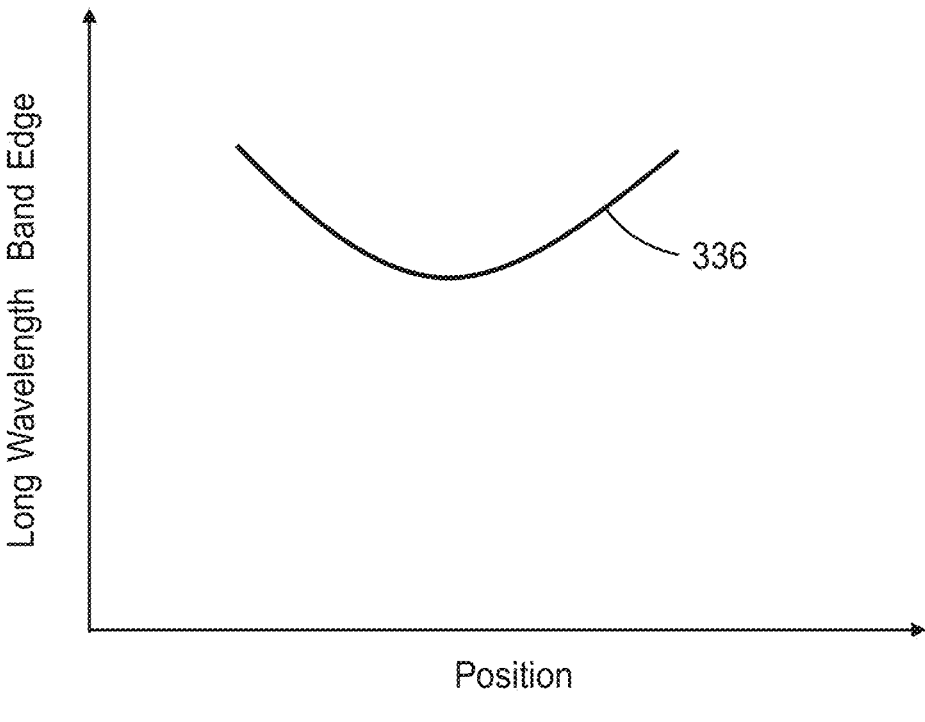

In some embodiments, the optical film has a first long wavelength band edge distribution along the first curve 1410 that is substantially symmetric under reflection about the second plane and a second long wavelength band edge distribution along the second curve 1420 that is substantially symmetric under reflection about the first plane, where the first and second long wavelength band edge distributions are different. For example, the first long wavelength band edge distribution may be as illustrated in FIG. 15C and the second long wavelength band edge distribution may be as illustrated in FIG. 15D. A long wavelength band edge distribution along a curve may be described as substantially symmetric under reflection about a plane if the long wavelength band edge at each point over at least 70% of the length of the curve differs from the corresponding long wavelength band edge at the reflected point by no more than 20%. In some embodiments, the long wavelength band edge at each point over at least 80% of the length of the curve differs from the long wavelength band edge at the reflected point by no more than 15%. In some embodiments, the long wavelength band edge at each point over at least 90% of the length of the curve differs from the corresponding long wavelength band edge at the reflected point by no more than 10%.

In some embodiments, the optical film 1400 has a thickness that decreases from the center location 1430 to a first edge location 1431 of the optical film 1400 along the first curve 1410 and increases from the center location 1430 to a second edge location 1432 along the second curve. In some embodiments, the thickness decreases non-monotonically from the center location 1430 to the first edge location 1431 along the first curve 1410. In some embodiments, the thickness decreases substantially monotonically from the center location 1430 to the first edge location 1430 along the first curve 1410. In some embodiments, the thickness increases non-monotonically from the center location 1430 to the second edge location 1432 along the second curve 1420. In some embodiments, the thickness increases substantially monotonically from the center location 1430 to the second edge location 1432 along the second curve 1420. In some embodiments, the thickness decreases (e.g., non-monotonically or substantially monotonically) from the center location 1430 to the third edge location 1433 along the first curve 1410 opposite the first edge location 1431. In some embodiments, the thickness increases (e.g., non-monotonically or substantially monotonically) from the center location 1430 to the fourth edge location 1434 along the second curve 1420 opposite the second edge location 1432. In some embodiments, the thickness at the center location 1430 is at least 1%, or at least 2%, or at least 3%, or at least 4%, or at least 5% greater than the thickness at the first edge location 1431. In some embodiments, the thickness at the center location 1430 is at least 1%, or at least 2%, or at least 3%, or at least 4%, or at least 5% greater than the thickness at the third edge location 1433. In some embodiments, the thickness at the second edge location 1432 is at least 1%, or 2%, or 3%, or at least 4%, or at least 5% greater than the thickness at the center location 1430. In some embodiments, the thickness at the fourth edge location 1434 is at least 1%, or 2%, or 3%, or at least 4%, or at least 5% greater than the thickness at the center location 1430.

FIGS. 15A-15B are schematic illustrations of first and second thickness distributions 333 and 335 along respective first and second curves. FIGS. 15C-15D are schematic illustrations of first and second long wavelength band edge distributions 334 and 336 along respective first and second curves. The first and second curves may be defined by the intersection of the optical film with first and second planes as described further elsewhere herein. In some embodiments, the first thickness distribution 333 is substantially symmetric under reflection about the second plane and the second thickness distribution 335 is substantially symmetric under reflection about the first plane. The first and second thickness distributions 333 and 335 are different. The first thickness distribution 333 comprises a thickness that decreases from a center location to each of opposing edge locations along the first curve. The second thickness distribution 335 comprises a thickness that increases from the center location to each of opposing edge locations along the second curve. In the illustrated embodiment, the thickness decreases monotonically from a center location to each of opposing edge locations along the first curve and increases monotonically from the center location to each of opposing edge locations along the second curve. In other embodiments, the thickness variation may be non-monotonic along either of the first and second curves.

In some embodiments, the first long wavelength band edge distribution 334 is substantially symmetric under reflection about the second plane and the second long wavelength band edge distribution 336 is substantially symmetric under reflection about the first plane. The first and second long wavelength band edge distributions 334 and 336 are different. The first long wavelength band edge distribution 334 comprises a long wavelength band edge that decreases from a center location to each of opposing edge locations along the first curve. The second long wavelength band edge distribution 336 comprises a long wavelength band edge that increases from the center location to each of opposing edge locations along the second curve. In the illustrated embodiment, the long wavelength band edge decreases monotonically from a center location to each of opposing edge locations along the first curve and increases monotonically from the center location to each of opposing edge locations along the second curve. In other embodiments, the long wavelength band edge variation may be non-monotonic along either of the first and second curves. The first and second long wavelength band edge distributions 334 and 336 may be proportional to the first and second thickness distributions 333 and 335, respectively.

A quantity, such as a thickness or a long wavelength band edge of an optical film, may be said to substantially monotonically decrease over a range from a first end point of the range (e.g., center location of an optical film) to a second end point of the range (e.g., an edge location of the optical film) if the quantity at any larger intermediate point in the range is less than or about equal to the quantity at any smaller intermediate point in the range. Similarly, a quantity may be said to substantially monotonically increase over a range from a first end point of the range to a second end point of the range if the quantity at any larger intermediate point in the range is greater than or about equal to the quantity at any smaller intermediate point in the range. For a quantity that varies with locations over a range (e.g., thickness or a long wavelength band edge over a range of locations from a center location to an edge location), the quantity at a point may be said to be about equal to a value (e.g., the quantity at another point) if the quantity at the point equals the value or if the quantity at the point is in a range of the value plus or minus 5% of the maximum minus the minimum of the quantity over the range.

Figure 22A:
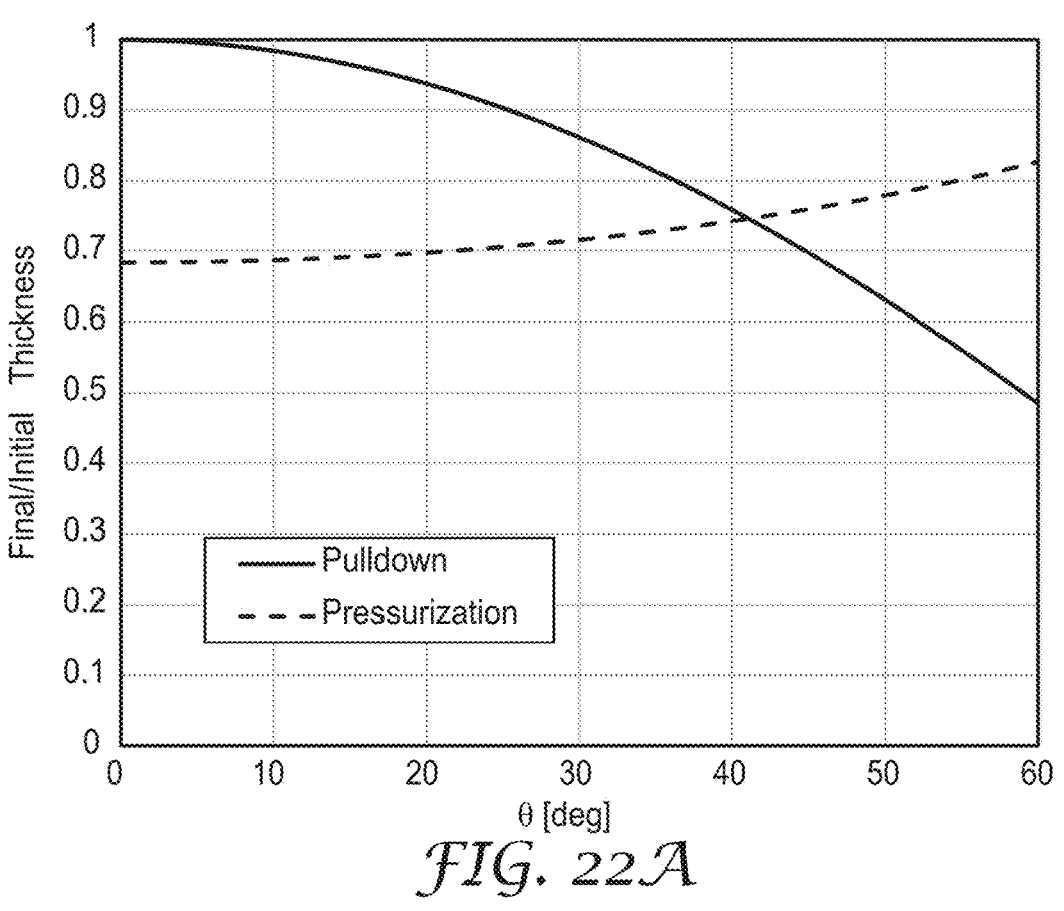
FIG. 22A-22B are plots of thickness distributions of films shaped using pulldown and pressurization processes.
Figure 22B:
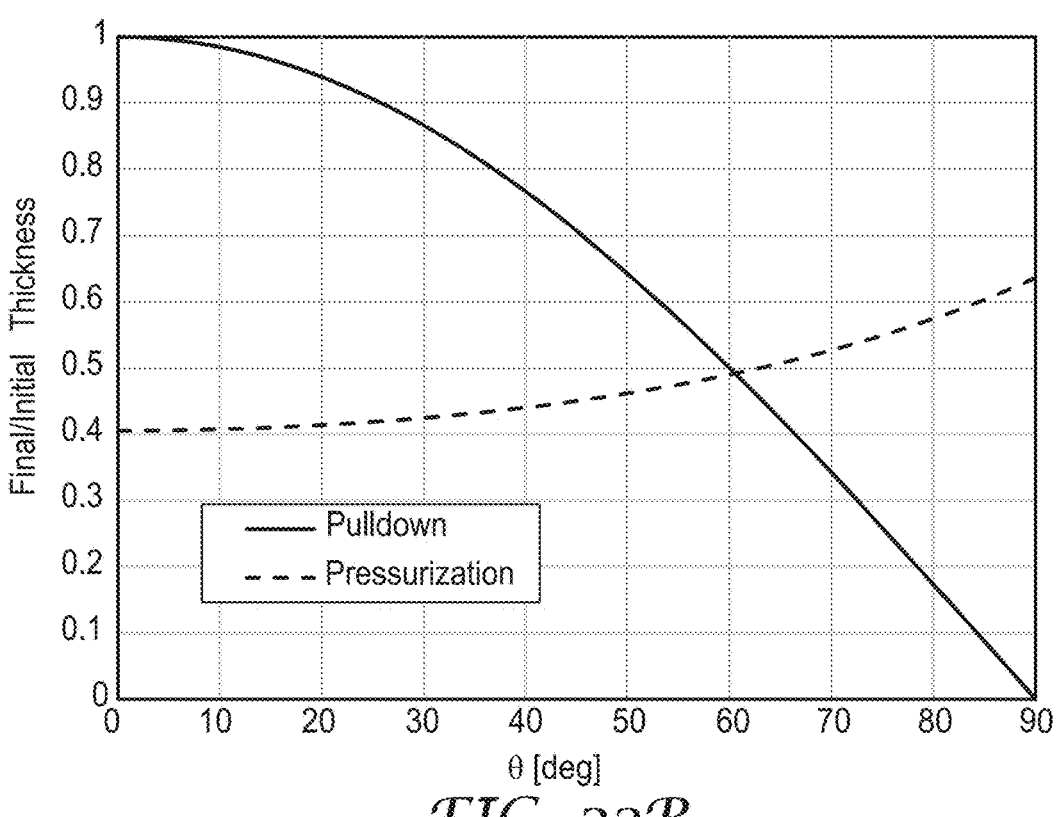

Other methods of thermoforming an optical film into a generally domed shape give a thickness (or long wavelength band edge) that is either large at a center of the film and decreases towards an edge in all directions, or that is small near the center and increases towards the edges in all directions. FIGS. 22A and 22B plot the thickness distribution in an optical film formed into a spherical cap subtending an angle of 120 degrees and 180 degrees, respectively, in a pressurization process and in a pulldown process. The angle θ in these plots are the angular position relative to the center of the film. The edges of the films have a θ of 60 degrees and 90 degrees in FIGS. 22A-22B, respectively. The thickness is rotationally symmetric about an optical axis through an apex of films in these cases. In determining these thickness profiles, the optical film was assumed to be isotropic and incompressible, the circumferential stretching was assumed to be constant in the pulldown process, and the radial stretching was assumed to be constant in the pressurization process. The curves show the approximate thickness profile expected for a pulldown thermoforming process where the film is stretched such that the circumferential stretching, but not the radial stretching, is substantially constant; and for a pressurization process where the film is stretched such that the radial stretching, but not the circumferential stretching, is substantially constant. Stretching here refers to 1 plus strain, so stretching is constant when the strain is constant. The pulldown process can be implemented on a MAAC vacuum thermoforming machine (available from MAAC Machinery Corporation (Carol Stream, IL)) as described in U.S. Prov. Pat. Appl. No. 62/577,474 filed Oct. 26, 2017 and titled "SHAPED OPTICAL FILMS AND METHODS OF SHAPING OPTICAL FILMS" and the pressurization process can be implemented on a Hy-Tech forming machine (available from Hy-Tech Forming Systems (USA), Inc. (Phoenix, AZ)) described in U.S. Prov. Pat. Appl. No. 62/577,474. The thickness drops to zero at the edge of the film with a 180-degree subtended angle for the pulldown process indicating that that attempting to form a film to a subtended angle this large in the pulldown process would result in local yielding of the film. The methods of the present description allow for a substantially smaller overall thickness variation (and/or substantially smaller overall long wavelength band edge variation) to be obtained when the film is shaped to a large subtended angle and/or allows the thickness to vary differently in different directions and/or to be controlled to have a desired thickness distribution which may or may not be substantially monotonic.

The optical films of the present description may be mirror films or reflective polarizers, for example. In some embodiments, each location over at least 80%, or over 85%, or over at least 90%, or over at least 95% of a total area of the shaped optical film has a reflectance greater than about 80% for normally incident light having a same predetermined wavelength and a same first polarization state. A polarization state can be characterized by the direction of the electric field vector which for normally incident light defines an axis tangent to the optical film. If the axis tangent to the optical film along the electric field of normally incident light at two different locations on the optical film are in parallel planes that each intersect the optical film along a curve (so that neither plane is tangent to the optical film at the respective first and second locations), the polarization states can be considered to be the same. If the axis that is tangent to the optical film and that is perpendicular to the electric field of normally incident light at two different locations on the optical film are in parallel planes that each intersect the optical film along a curve, the polarization states can also be considered to be the same. For example, referring again to FIG. 14, the first polarization state may be the state at the center location 1430 where the electric field of normally incident light is along an axis 1437 in the first plane (e.g., a plane parallel to the x-z plane which may correspond to first plane 3001) defining the first curve 1410 at the center location 1430. The polarization state for light normally incident at a different location is the same first polarization state if the axis tangent to the optical film and along the electric field of the normally incident light at the different location is in a plane parallel to the first plane. For example, a normally incident light at location 1441 may have an electric field along axis 1443 when incident at location 1441 and this axis is in plane 1453 which is parallel to the first plane. A same second polarization state for normally incident light can be defined at each location as the polarization state orthogonal to the first polarization state. In some embodiments, the optical film is a mirror film and has a reflectivity that is about the same for the first and second polarization states. In some embodiments, the optical film is a reflective polarizer has a substantially higher reflectivity for the first polarization state than for the second polarization state.

In some embodiments, the optical film 1400 is a reflective polarizer. In some embodiments, each location on the reflective polarizer has a maximum reflectance and a corresponding minimum transmittance for normally incident light polarized along a block axis, and a maximum transmittance for normally incident light polarized along an orthogonal pass axis. For example, axes 1455b and 1455p at location 1455 may be block and pass axes, respectively. The normally incident light may have a predetermined wavelength (e.g., about 550 nm) or may have wavelengths in a predetermined wavelength range (e.g., 450 nm to 650 nm, or 400 nm to 700 nm).

Figure 16:
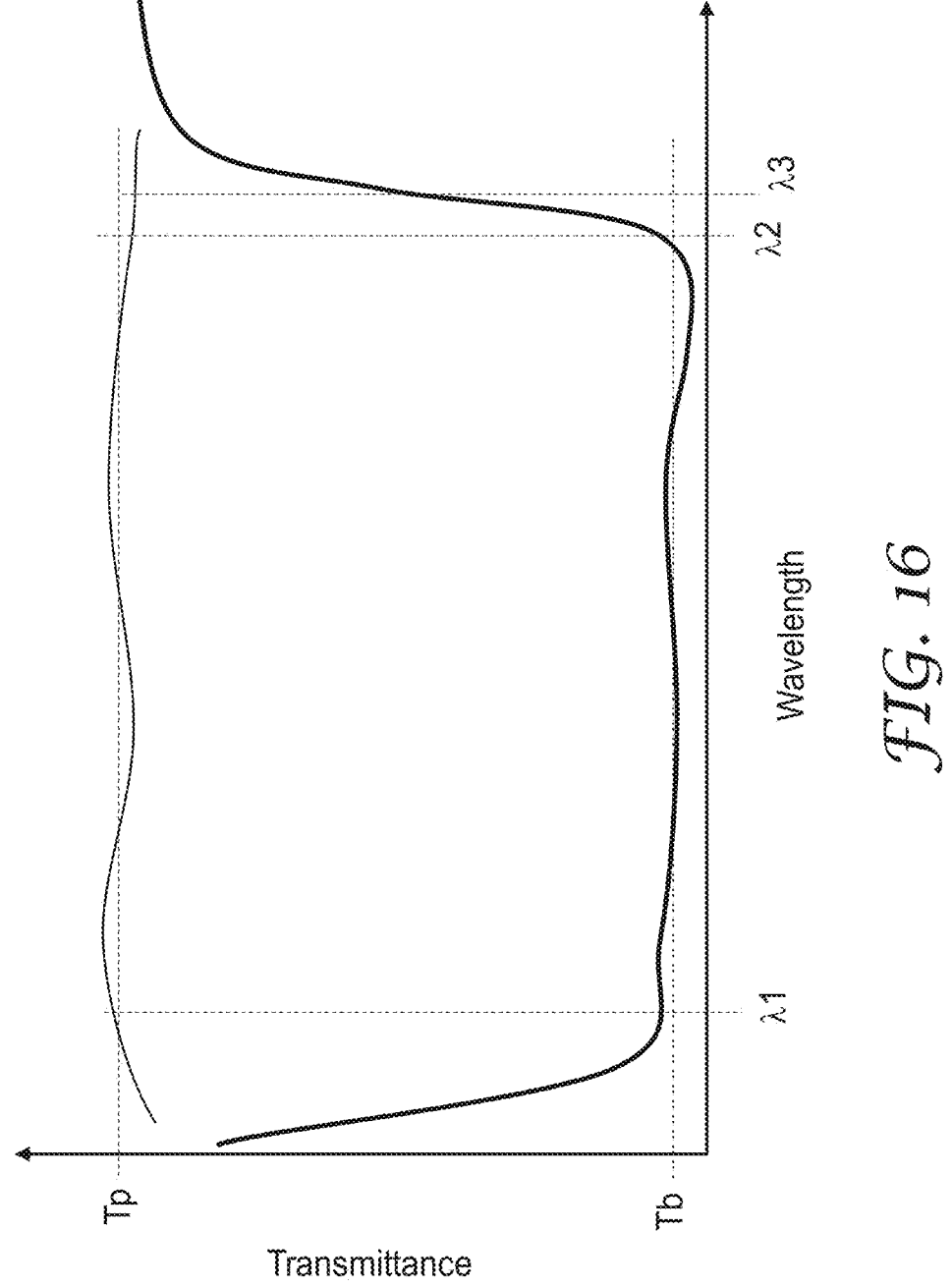
FIG. 16 is a schematic plot of the transmittance of a reflective polarizer for pass and block states.

FIG. 16 is a schematic plot of the transmittance of a reflective polarizer for the pass and block states of the reflective polarizer for light normally incident on the reflective polarizer. The average of the transmittance over wavelengths is a maximum for normally incident light having a pass polarization state (polarized along a pass axis) and the average of the transmittance over wavelengths is a minimum for normally incident light having a block polarization state (polarized along a block axis). The average of the transmittance over wavelengths in the predetermined wavelength range from $\lambda1$ to $\lambda2$ is Tp in the pass state and Tb in the block state. In some embodiments, $\lambda1$ is about 450 nm and $\lambda2$ is about 650 nm. In some embodiments, $\lambda1$ is about 400 nm and $\lambda2$ is about 700 nm. In some embodiments Tp is at greater than about 80%, or greater than about 85%, or greater than 88%. In some embodiments, Tb is no more than about 10%, or no more than about 5%, or no more than about 2%, or no more than about 1%, or no more than about 0.5%, or no more than 0.2%, or no more than 0.15%, or no more than 0.1%, or no more than 0.05%, or no more than 0.04%, or no more than 0.03%. In some embodiments, Tp and/or Tb is in any of these ranges at each location on a shaped optical film over at least 80%, or at least 85%, or at least 90%, or at least 95% of a total area of the shaped optical film.

A contrast ratio at a location on the reflective polarizer may be defined as Tp/Tb. In some embodiments, each location in a region of the reflective polarizer having an area of at least 80% of a total area of the reflective polarizer has a contrast ratio being the maximum average transmittance (Tp) divided by the minimum average transmittance (Tb) of at least 500. In some embodiments, the region has an area of least 85%, or at least 90%, or at least 95% of the total area. The region may be all of the reflective polarizer except for small portions near an edge, for example. A region 1490 of optical film 1400 is illustrated in FIG. 14. Region 1490 is all of the optical film 1400 except for a small portion along the edge. In some embodiments, the region is the portion of the reflective polarizer that is utilized in an optical system including the reflective polarizer. In some embodiments, the region is the entire reflective polarizer. In some embodiments, the contrast ratio Tp/Tb at each location in the region is at least 1000, or at least 1100, or at least 1200, or at least 1300, or at least 1500, or at least 1600, or at least 1700, or at least 1800, or at least 1900, or at least 2000. In some embodiments, the reflective polarizer has a maximum contrast ratio of at least 2000 (i.e., at least one location on the reflective polarizer has a contrast ratio of at least 2000), or at least 2500.

Another contrast ratio at a location on the reflective polarizer may be defined as the maximum transmittance at a predetermined wavelength divided by the minimum transmittance at the predetermined wavelength. The predetermined wavelength may be a wavelength in the predetermined wavelength range from $\lambda1$ to $\lambda2$. For example, the predetermined wavelength may be $(\lambda1+\lambda2)/2$. In some embodiments, the predetermined wavelength is about 550 nm. The contrast ratio defined at a predetermined wavelength may satisfy any of the conditions above for the contrast ratio defined in terms of Tp and Tb which are averages over a predetermined wavelength range. For example, in some embodiments, each location over at least 80% of a total area of the reflective polarizer has a contrast ratio being the maximum transmittance for normally incident light at the predetermined wavelength divided by the minimum transmittance for normally incident light at the predetermined wavelength of at least 500.

In some embodiments, the reflective polarizer includes a plurality of polymeric interference layers. The contrast ratio of a reflective polarizer can be increased by including more interference layers in a given range. This can be done by including more layers in a single packet of alternating polymeric layers in a given thickness range or by including more than one packet of alternating polymeric layers with overlapping thickness ranges as described further elsewhere herein. Such techniques can be used to provide a low Tb (e.g., less than 0.2%). The methods of the present description allow substantially more stretching of the reflective polarizer along the block axis than along the orthogonal pass axis and this has been found to increase the contrast ratio of the shaped reflective polarizer relative to the initial unshaped reflective polarizer. In some embodiments, the initial unshaped film has a first contrast ratio and the shaped reflective polarizer has a second contrast ratio. In some embodiments, for each location over at least 60%, or over at least 70%, or over at least 80%, or over at least 90%, or over 100% of a total area over the reflective polarizer, the second contrast ratio is greater than the first contrast ratio, or greater than 1.2 times the first contrast ratio, or greater than 1.5 times the first contrast ratio, or greater than 2 times the first contrast ratio.

Figure 17:
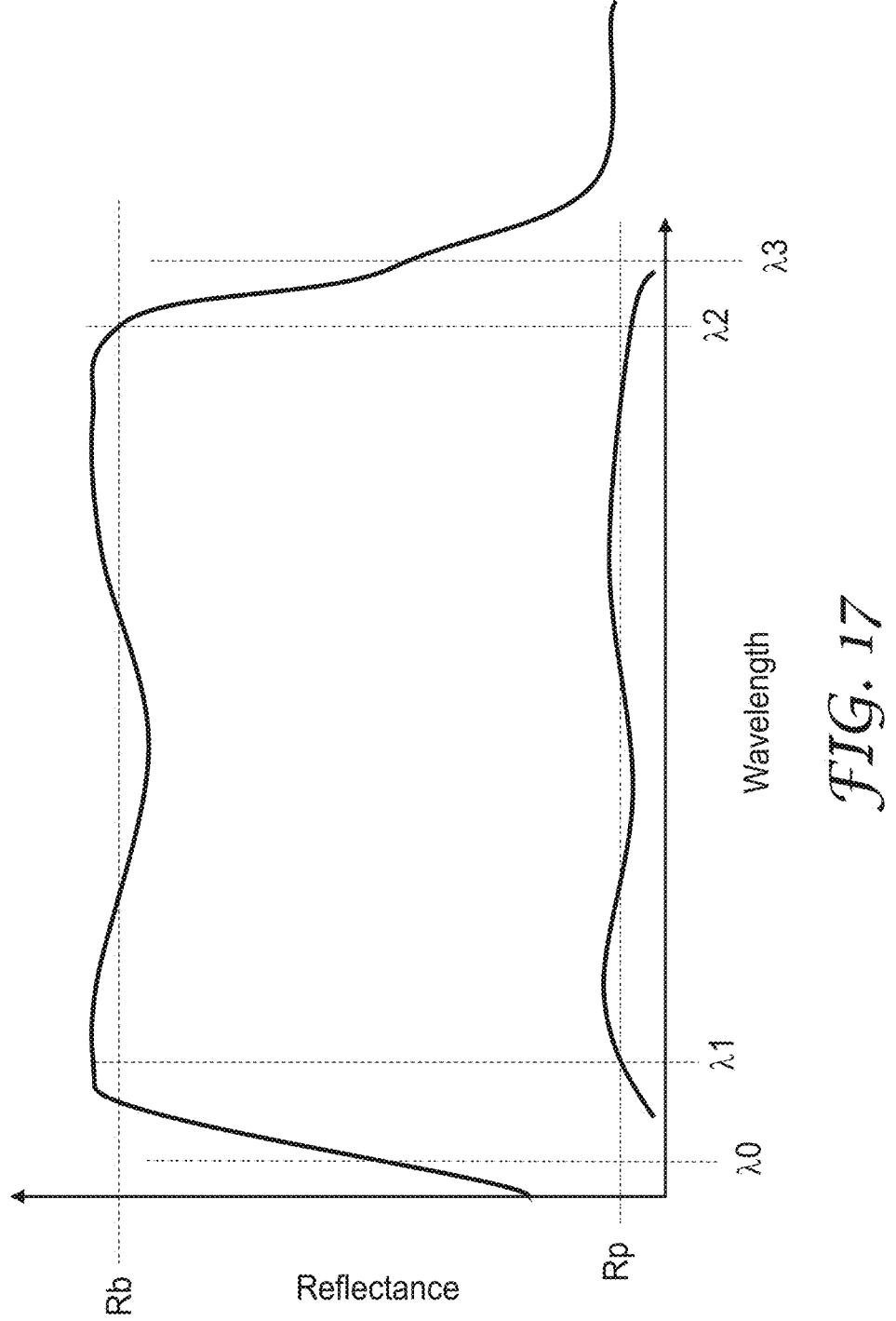
FIG. 17 is a schematic plot of the reflectance of a reflective polarizer for pass and block states.

FIG. 17 is a schematic plot of the reflectance of a reflective polarizer for the pass and block states of the reflective polarizer for light normally incident on the reflective polarizer. The average of the reflectance over wavelengths is a maximum for normally incident light having the block polarization state, and the average of the reflectance over wavelengths is a minimum for normally incident light having the pass polarization state. The average of the reflectance over wavelengths in the predetermined wavelength range from $\lambda 1$ to $\lambda 2$ is Rp in the pass state and Rb in the block is state. In some embodiments Rb is greater than about 75%, or greater than about 80%, or greater than about 85%, or greater than about 90%. In some embodiments, Rp is no more than about 20%, or no more than about 15%, or no more than about 10%, or no more than about 5%. In some embodiments, Rp and/or Rb is in any of these ranges at each location on a shaped optical film over at least 80%, or at least 85%, or at least 90%, or at least 95% of a total area of the shaped optical film.

A long wavelength band edge $\lambda 3$ is illustrated in FIGS. 16-17 and a short wavelength band edge $\lambda 0$ is indicated in FIG. 17. Reflection bands typically have both long and short wavelength band edges where the reflectance rapidly drops. In the illustrated embodiment, the short wavelength band edge $\lambda 0$ is less than $\lambda 1$ and the long wavelength band edge $\lambda 3$ is greater than $\lambda 2$. The band edges may be determined for normally incident light with the reflective polarizer convex towards the incident light. In some embodiments, an optical film has a long wavelength band edge $\lambda 3$ (and/or a short wavelength band edge $\lambda 0$) that varies with location in a pattern that is proportional to the patterns described elsewhere herein for the thickness variation. In any optical film of the present description where a thickness variation is specified, the optical film may have a long wavelength band edge having a variation proportional to the thickness variation. In some embodiments, an optical film has a long wavelength band edge as a function of position that is proportional the thickness variation depicted in any of FIG. 11C-11E or 15A-15B.

The precise wavelength of a band edge can be defined using several different criteria. The spatial variation patterns exhibited by the band edge typically do not depend on the precise criteria used. The wavelength of the band edge may be can be taken to be the wavelength where the reflectance for normally incident light having the block polarization state drops to ½ Rb or the wavelength where the transmittance for normally incident light having the block polarization state increases to 10%, for example. Except where indicated differently, the band edge can be understood to refer to the wavelength where the transmittance for normally incident light having the block polarization state increases to 10%.

The reflectance and transmittance can be determined for light normally incident on either side of the optical film. Typically, similar results are obtained for either measurement. The optical film may be shaped for use in a particular application where light is incident on one side of the optical film. In this case, the specified reflectance and transmittance is for light incident on this side. In cases where the shaped optical film could be used in either orientation, the specified reflectance and transmittance can be understood to be for light incident on the side of the shaped optical film such that the shaped optical film is convex toward the incident light.

Figure 18A:
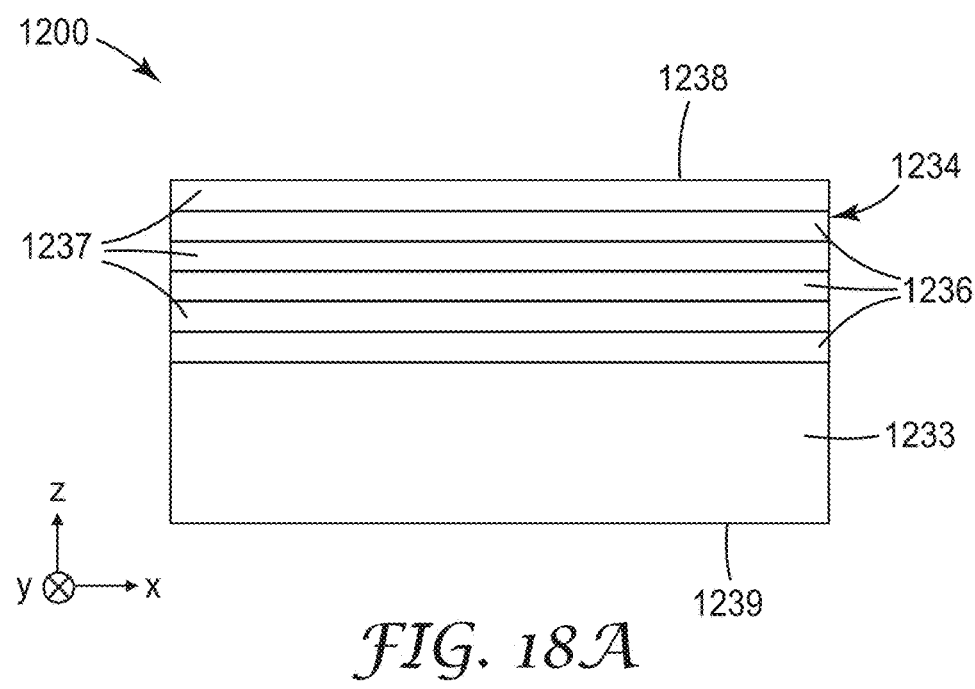
FIGS. 18A-18B are schematic cross-sectional views of optical films.

FIG. 18A is a schematic cross-sectional view of an optical film 1200 including a plurality of interference layers 1234 and a noninterference layer 1233. In some embodiments, the plurality of interference layers includes alternating polymeric layers 1236 and 1237. In the illustrated embodiment, a single noninterference layer 1233 is included. Interference layers may be described as reflecting or transmitting light primarily by optical interference when the reflectance and transmittance of the interference layers can be reasonably described by optical interference or reasonably accurately modeled as resulting from optical interference. Such interference layers are described in U.S. Pat. No. 5,882,774 (Jonza et al.), and U.S. Pat. No. 6,609,795 (Weber et al.), for example. Adjacent pairs of interference layers having differing refractive indices reflect light by optical interference when the pair has a combined optical thickness (refractive index times physical thickness) of ½ the wavelength of the light. Interference layers typically have a physical thickness of less than about 200 nanometers. Noninterference layers have an optical thickness too large to contribute to the reflection of visible light via interference. Typically, noninterference layers have a physical thickness of at least 1 micrometer. In some embodiments, more than one noninterference layer is included. In some embodiments, at least one noninterference layer (noninterference layer 1233 in the illustrated embodiment) is integrally formed with the plurality of interference layers 1234 and does not reflect or transmit light primarily by optical interference.

In some embodiments, at least one of the interference layers is substantially uniaxially oriented prior to forming the film into a curved shape. For example, each of the layers 1237 may be substantially uniaxially oriented. A reflective polarizer or a layer in a reflective polarizer is substantially uniaxially oriented if it is substantially oriented in one in-plane direction and substantially not oriented in the orthogonal in-plane direction and substantially not oriented in the thickness direction. Substantially uniaxially oriented reflective polarizers are available from 3M Company under the trade designation Advanced Polarizing Film or APF. Other types of multilayer optical film reflective polarizers (e.g., Dual Brightness Enhancement Film or DBEF available from 3M Company) may also be used. DBEF films are oriented substantially more in one in-plane direction than in the orthogonal in-plane direction and also exhibit orientation in the thickness direction. DBEF films are not substantially uniaxially oriented as "substantially uniaxially oriented" is used herein.

In some embodiments, the reflective polarizer prior to forming into a curved shape is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.), which is hereby incorporated herein to the extent that it does not contradict the present description and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Except where specified differently, refractive index refers to the refractive index at a wavelength of 550 nm. After forming into a curved shape, a reflective polarizer may have at least one layer that is substantially uniaxially oriented at at least one location. In some embodiments, the at least one layer at the at least one location has a first refractive index in a first direction along the thickness of the layer, a second refractive index in a second direction orthogonal to the first direction, and a third refractive index in a third direction orthogonal to the first and second directions, an absolute value of a difference in the first and third refractive indices being less than about 0.02, or less than about 0.01, and an absolute value of a difference in the second and third refractive indices being greater than about 0.05, or greater than about 0.10. In some embodiments, after being formed into a curved shape, a reflective polarizer has at least one layer that is substantially uniaxially oriented at a plurality of locations.

Figure 18B:
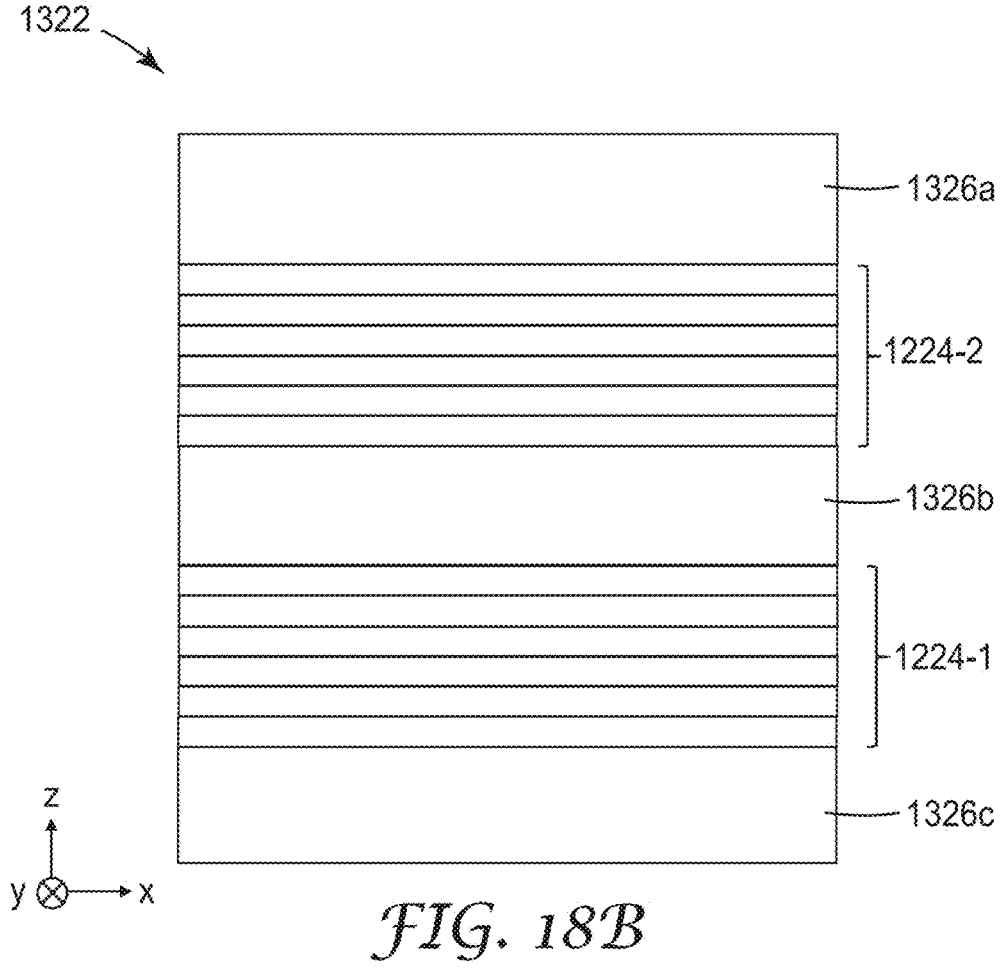
Figure 19:
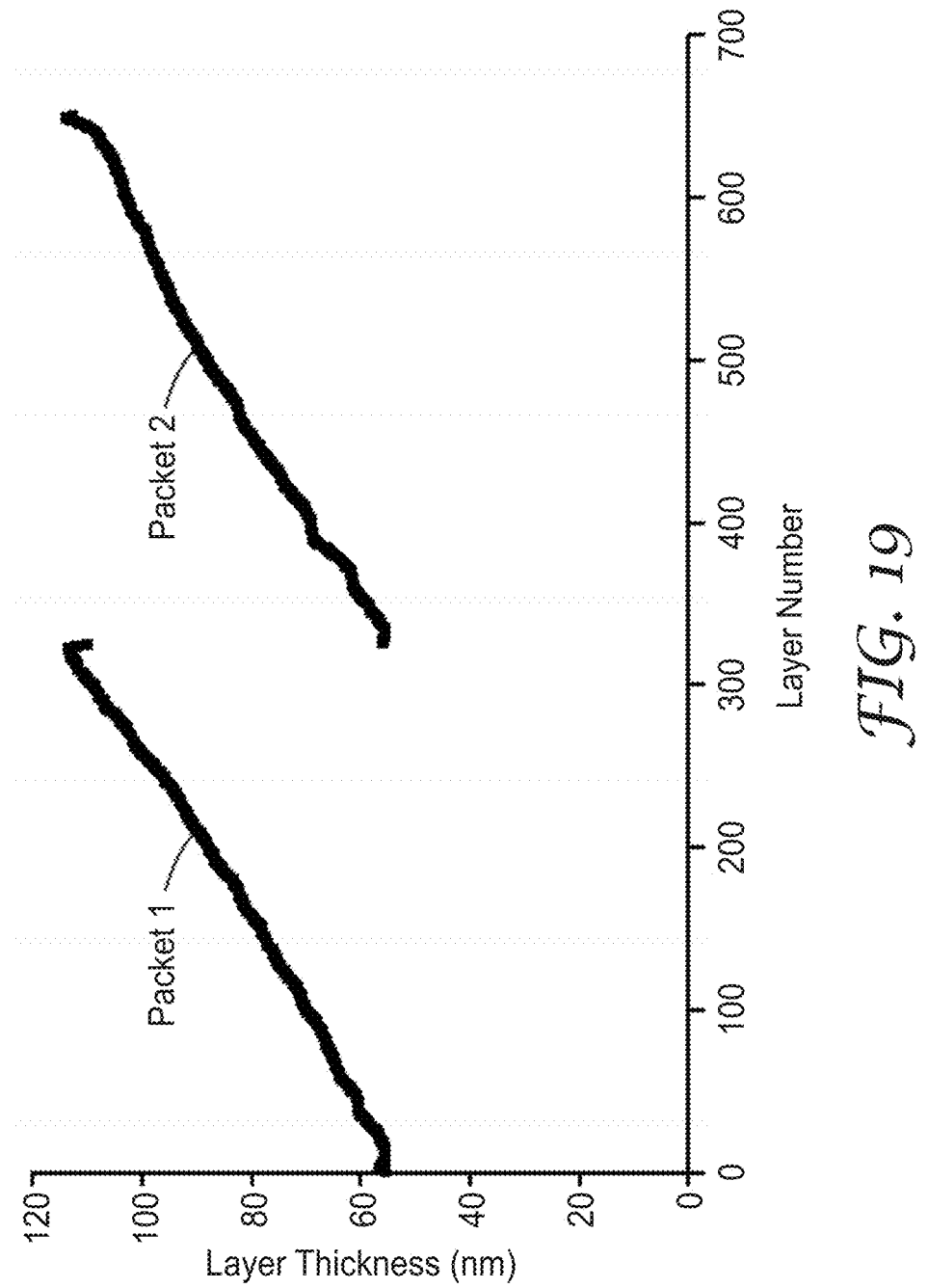
FIG. 19 is a plot of a layer thickness versus layer number for an optical film.

In some embodiments, the optical film includes two or more packets of alternating polymeric interference layers to provide a high contrast. Such optical films are described further in U.S. Prov. Pat. Appl. No. 62/467,712 (Haag et al.), filed Mar. 6, 2017 and hereby incorporated herein by reference to the extent that it does not contradict the present description. In some embodiments, the optical film is a reflective polarizer and includes a plurality of packets where each packet has a layer thickness versus layer number that is a substantially continuous curve. FIG. 18B is a schematic cross-sectional view of an optical film 1322 which includes first and second packets 1224-1 and 1224-2 of interference layers separated by noninterference layer 1326b. The optical film 1322 further includes outer noninterference layers 1326a and 1326c. The first and second packets 1224-1 and 1224-2 may utilize overlapping thickness ranges to provide a reflective polarizer, for example, with a high contrast ratio (ratio of pass state transmittance to block state transmittance) or a mirror with a low leakage. FIG. 19 illustrates a layer thickness versus layer number for an optical film (e.g., reflective polarizer) including two packets (Packet 1 and Packet 2). In some embodiments, the thickness profiles substantially overlap (e.g., greater than 50 percent of a thickness range of Packet 1 overlaps greater than 50 percent of a thickness range of Packet 2). In other embodiments, there is little or no overlap in the thickness ranges.

In some embodiments, the optical film is a mirror film such as a visible light mirror or a near-infrared mirror. Suitable mirror films include Enhanced Specular Reflector (ESR) film available from 3M Company (St. Paul, MN).

The optical film 1200 and/or the optical film 1322 may be integrally formed. As used herein, a first element "integrally formed" with a second element means that the first and second elements are manufactured together rather than manufactured separately and then subsequently joined. Integrally formed includes manufacturing a first element followed by manufacturing the second element on the first element. A optical film including a plurality of layers is integrally formed if the layers are manufactured together (e.g., combined as melt streams and then cast onto a chill roll to form a cast film having each of the layers, and then orienting the cast film) rather than manufactured separately and then subsequently joined. In some embodiments, the noninterference layers 1326a and 1326c are integrally formed with the first and second packets 1224-1 and 1224-2 of interference layers and the noninterference layer 1326b.

An additional layer not integral with the integrally formed multilayer optical film means that the additional layer is not integrally formed with the multilayer optical film. For example, the additional layer may be formed separately and then subsequently adhered (e.g., laminated using an optically clear adhesive) to the multilayer optical film. In some embodiments, the additional layer is a liner which is releasably attached to the optical film. In some embodiments, two liners are included. For example, in some embodiments, the noninterference layers 1326a and 1326c may be release liners releasably bonded and conforming to the first and second packets 1224-1 and 1224-2. In this case, the optical film 1322 may be referred to as an optical stack and the layers between the noninterference layers 1326a and 1326c may be referred to as an optical film. In some embodiments, the release liner(s) are removed prior to the shaping of the optical film. In some embodiments, the releaser liner(s) are shaped with the optical film so that the resulting shaped optical stack includes liner(s) releasably bonded and conforming to the optical film.

A liner that is bonded to an optical film but that can be cleanly removed from the optical film without substantially damaging the optical film may be described as releasably bonded to the optical film and may be described as a release liner. In some embodiments, a liner that is releasably bonded to an optical film can be removed from the optical film with no visible damage to the optical film. A releasably bonded liner may include a substrate with an adhesive layer that bonds strongly to the substrate but weakly to the optical film. For example, a liner may include a thin layer of low tack adhesive applied to a substrate with a surface treated to increase its bond to the adhesive. Other suitable liners include those that electrostatically bond to the optical film as described in U.S. Pat. No. 6,991,695 (Tait et al.), for example. One example of a suitable liner is OCPET NSA33T available from Sun A Kaken Co, Ltd.

Materials suitable for the higher refractive index interference layer in optical film 1200 or 1322, include, for example, polyethylene naphthalate (PEN), copolymers containing PEN and polyesters (e.g., polyethylene terephthalate (PET) or dibenzoic acid), glycol modified polyethylene terephthalate. Materials suitable for the lower refractive index interference layers in optical film 1200 or 1322, include, for example, copolyesters based on PEN, copolyesters based on PET, polycarbonate (PC), or blends of these three classes of materials. To achieve high reflectivities with a desired number of layers, adjacent microlayers can exhibit a difference in refractive indices for light polarized along the block axis of at least 0.2, for example.

In some embodiments, optical film 1200 or 1322 is a mirror film that substantially reflects normally incident light in a predetermined wavelength range for each of two orthogonal polarization stated. In some embodiments, optical film 1200 or 1322 is a reflective polarizer which substantially reflects normally incident light in a predetermined wavelength range polarized along a block axis and which substantially reflects normally incident light in a predetermined wavelength range polarized along an orthogonal pass axis.

Figure 20A:
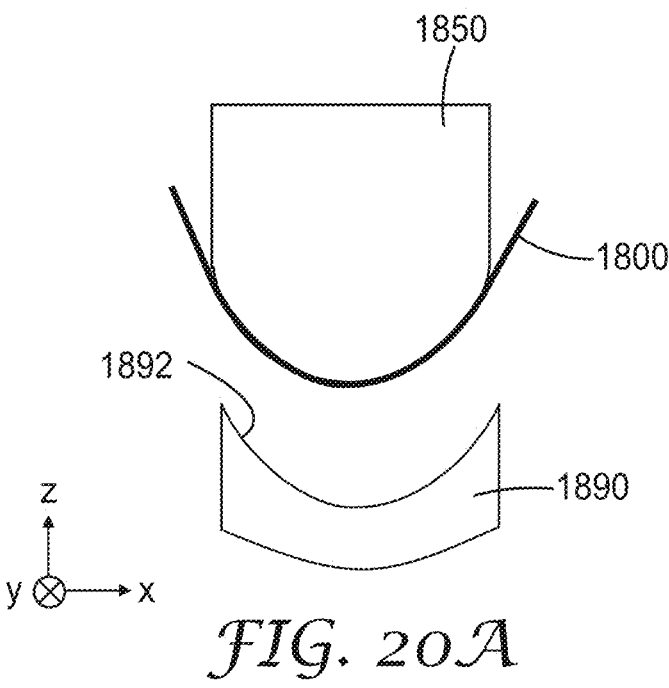
FIG. 20A is a schematic cross-sectional view of a portion of an optical film disposed on a curved mold surface proximate an optical lens.
Figure 20B:
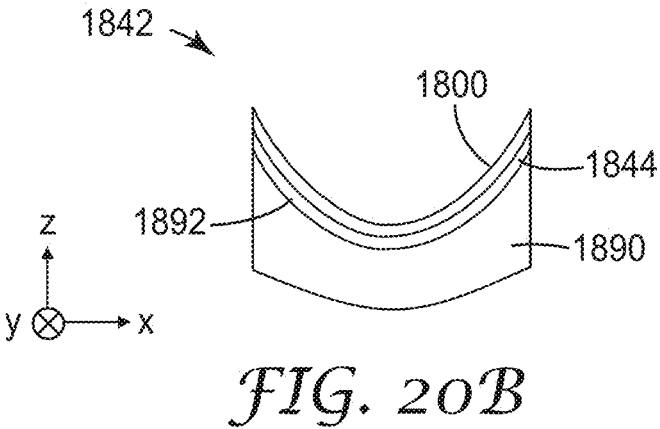
FIG. 20B is a schematic cross-sectional view of a lens assembly.

In some embodiments, the shaped optical film resulting from the process is bonded to an optical lens. This can be done as step in the method of shaping the optical film. FIG. 20A is a schematic cross-sectional view of a portion of an optical film 1800 that has been stretched and shaped to at least partially conform to a curved mold surface of a mold 1850. An optical lens 1890 is disposed adjacent to the optical film 1800 opposite the mold 1850. In some embodiments, the optical lens 1890 is disposed on a lens mount (e.g., lens mount 1693). In some embodiments, an adhesive is applied to the curved major surface 1892 of the optical lens 1890. In some embodiments, the lens mount and the mold 1850 can move towards one another until the adhesive on the optical lens 1890 contacts the optical film 1800 and bonds the optical film 1800 to the optical lens 1890. The adhesive can be applied uniformly to the curved major surface 1892 of the optical lens 1890 or the adhesive can be applied as a drop near the center of the curved major surface 1892 which then flows into an adhesive layer wetting out the curved major surface 1892 when the optical lens 1890 and the mold closely approach one another. The mold 1850 and any excess portion of the optical film 1800 is subsequently removed to form lens assembly 1842. FIG. 20B is a schematic cross-sectional view of lens assembly 1842 which includes optical lens 1890, an adhesive layer 1844 and optical film 1800 bonded to the optical lens 1890 through the adhesive layer 1844. The optical film 1800 conforms to the curved major surface 1892 of the optical lens 1890.

Figure 21A:
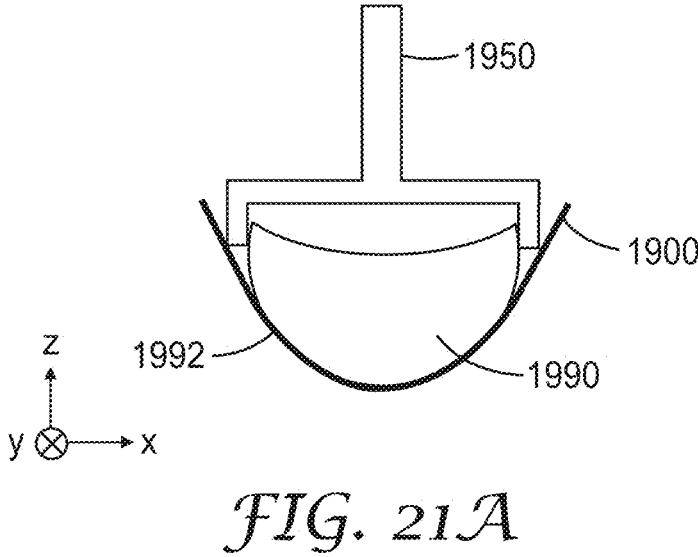
FIG. 21A is a schematic illustration of a lens mount holding an optical lens with an optical film disposed on the optical lens.
Figure 21B:
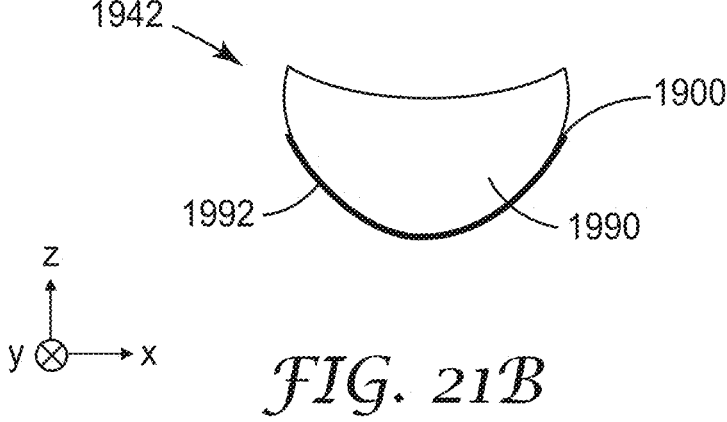
FIG. 21B is a schematic cross-sectional view of a lens assembly.

In some embodiments, an optical lens comprises the curved mold surface. FIG. 21A is a schematic illustration of lens mount 1950 configured to hold optical lens 1990 which can be used as a mold in forming optical film 1900. For example, in some embodiments the mold (e.g., mold 250) used in a method of shaping an optical film described elsewhere herein is replaced with lens mount 1950 and optical lens 1990. FIG. 21A illustrates a portion of an optical film 1900 that has been stretched and shaped to at least partially conform to a curved major surface 1992 of the optical lens 1990. An adhesive can be applied to the curved major surface 1992 prior to shaping the optical film 1900 to bond the optical film 1900 to the curved major surface. FIG. 21B is a schematic cross-sectional view of lens assembly 1942 which includes and optical lens 1990 and an optical film 1900 bonded and conforming to the curved major surface 1992 of the optical lens 1990. Lens assembly 1942 can be obtained by removing the lens mount 1950 and any excess portions of the optical film 1900.

Terms such as "substantially" and "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

The following is a list of exemplary embodiments of the present description.

Embodiment 1 is a method of shaping an optical film, the method comprising the steps of:

disposing the optical film adjacent first and second rollers such that a first portion of the optical film contacts the first roller and a second portion of the optical film contacts the second roller, the first and second rollers spaced apart along a first direction, the first portion of the optical film having a first width along a second direction orthogonal to the first direction;

securing opposing first and second ends of the optical film, the first and second ends spaced apart along the first direction, the first and second portions disposed between the first and second ends; providing a curved mold surface; and shaping the optical film by contacting the optical film with the curved mold surface while stretching the optical film along the first direction, wherein the shaping step comprises keeping a threshold distance between closest first and second points less than about the first width, the first point on the optical film contacting the first roller, the second point on the optical film contacting the curved mold surface.

Embodiment 2 is the method of Embodiment 1, wherein the first point moves along the first direction as the optical film is shaped.

Embodiment 3 is the method of Embodiment 1, wherein the second point moves along the first direction as the optical film is shaped.

Embodiment 4 is the method of Embodiment 1, wherein keeping the threshold distance between the closest first and second points less than about the first width comprises moving the first roller along the first direction.

Embodiment 5 is the method of Embodiment 1, wherein shaping the optical film comprises changing a separation distance between a point on a boundary of the curved mold surface and the optical film along a third direction orthogonal to the first and second directions.

Embodiment 6 is the method of Embodiment 1, wherein keeping the threshold distance between the closest first and second points less than about the first width comprises changing a separation distance between the first and second rollers along the first direction.

Embodiment 7 is the method of Embodiment 6, wherein changing the separation distance between the first and second rollers along the first direction reduces buckling of the optical film along the second direction.

Embodiment 8 is the method of Embodiment 1, wherein the shaping step comprises changing positions of the first and second ends of the optical film to control a tension in the optical film along the first direction.

Embodiment 9 is the method of Embodiment 8, wherein the tension in the optical film along the first direction is substantially constant as the film is stretched.

Embodiment 10 is the method of Embodiment 8, wherein the tension in the optical film along the first direction gradually increases during the stretching of the optical film.

Embodiment 11 is the method of Embodiment 8, wherein the tension is controlled to produce a desired thickness variation in the optical film.

Embodiment 12 is the method of Embodiment 8, wherein the tension is controlled to produce a thickness of the optical film that is substantially constant along the first direction.

Embodiment 13 is the method of Embodiment 1, wherein the shaping step comprises keeping the threshold distance between the first and second points in a range of 0.001 to 1 times the first width.

Embodiment 14 is the method of Embodiment 1, wherein the second portion of the optical film has a second width along the second direction, and wherein the shaping step further comprises keeping a threshold distance between closest third and fourth points less than about the second width, the fourth point on the optical film contacting the second roller, the third point on the optical film contacting the curved mold surface.

Embodiment 15 is the method of Embodiment 14, wherein the shaping step comprises changing a separation distance between the first and second rollers such that the threshold distance between the closest first and second points remains in a range of 0.001 to 1 times the first width and the threshold distance between the closest third and fourth points remains in a range of 0.001 to 1 times the second width.

Embodiment 16 is the method of Embodiment 1, further comprising disposing the optical film adjacent third and fourth rollers, the third roller adjacent the first roller, the fourth roller adjacent the second roller.

Embodiment 17 is the method of Embodiment 16, wherein the shaping step further comprises changing the separation distance between the third and fourth rollers along the first direction.

Embodiment 18 is the method of Embodiment 17, wherein a separation between first and third rollers varies by no more than 10% during the shaping step, and a separation between second and fourth rollers varies by no more than 10% during the shaping step.

Embodiment 19 is the method of Embodiment 16, wherein the first and second rollers are each at a higher temperature than each of the third and fourth rollers during the shaping step.

Embodiment 20 is the method of Embodiment 16, wherein the third roller is disposed to increase a contact angle of the optical film with the first roller.

Embodiment 21 is the method of Embodiment 16, wherein the fourth roller is disposed to increase a contact angle of the optical film with the second roller.

Embodiment 22 is the method of Embodiment 1, wherein the method results in a shaped optical film having a first ratio of a first maximum sag to a corresponding first diameter along the first direction, and a second ratio of a second maximum sag to a corresponding second diameter along the second direction, the first ratio being at least 0.05.

Embodiment 23 is the method of Embodiment 1, wherein the optical film comprises a plurality of alternating polymeric interference layers reflecting and transmitting light primarily by optical interference.

Embodiment 24 is the method of Embodiment 1, wherein the optical film is a mirror film.

Embodiment 25 is the method of Embodiment 1, wherein the optical film is a reflective polarizer, each location on the reflective polarizer having a maximum reflectance greater than about 80% for normally incident light having a predetermined wavelength and polarized along a block axis, and a maximum transmittance greater than about 80% for nor-mally incident light having the predetermined wavelength and polarized along an orthogonal pass axis.

Embodiment 26 is the method of Embodiment 25, wherein prior to shaping the optical film, the block axis is substantially along the first direction.

Embodiment 27 is the method of Embodiment 1, further comprising heating the optical film.

Embodiment 28 is the method of Embodiment 27, further comprising heating the optical film prior to stretching the optical film.

Embodiment 29 is the method of Embodiment 27 or 28, further comprising heating the optical film during the stretching of the optical film.

Embodiment 30 is the method of Embodiment 27, wherein the optical film is heated to a temperature greater than a glass transition temperature of the optical film.

Embodiment 31 is the method of Embodiment 27, wherein the optical film is heated to a temperature greater than a largest glass transition temperature of the optical film and lower than a lowest melting temperature of the optical film.

Embodiment 32 is the method of Embodiment 1, wherein the optical film has no buckles between the first and second rollers and along the second direction between and away from longitudinal edges of the optical film during the shaping step.

Embodiment 33 is the method of any one of Embodiments 1 to 32, wherein the method results in a shaped optical film having a first maximum sag along the first direction, and a second maximum sag along the second direction, the first maximum sag greater than or equal to the second maximum sag, the second maximum sag greater than zero, each location over at least 80% of a total area of the shaped optical film having a reflectance greater than about 80% for normally incident light having a same predetermined wavelength and a same first polarization state.

Embodiment 34 is the method of any one of Embodiments 1 to 33 resulting in a shaped optical film, wherein the shaped optical film is a reflective polarizer, each location on the reflective polarizer having a maximum reflectance and a corresponding minimum transmittance for normally incident light polarized along a block axis and having the predetermined wavelength, and a maximum transmittance for normally incident light polarized along an orthogonal pass axis and having the predetermined wavelength, the first direction being along the block axis at the apex, the second direction being along the pass axis at the apex.

Embodiment 35 is the method of Embodiment 34, wherein each location over at least 80% of a total area of the reflective polarizer has a contrast ratio being the maximum transmittance divided by the minimum transmittance of at least 500.

Embodiment 36 is a method of shaping an optical film, the method comprising the steps of:

disposing the optical film adjacent first and second rollers such that a first portion of the optical film contacts the first roller and a second portion of the optical film contacts the second roller, the first and second rollers spaced apart along a first direction, the first portion of the optical film having a first width along a second direction orthogonal to the first direction;

securing opposing first and second ends of the optical film, the first and second ends spaced apart along the first direction, the first and second portions disposed between the first and second ends; providing a curved mold surface; and shaping the optical film by contacting the optical film with the curved mold surface while stretching the optical film along the first direction, wherein the shaping step comprises changing a separation distance between the first and second rollers along the first direction to reduce buckling of the optical film between the first and second rollers and along the second direction between and away from longitudinal edges of the optical film.

Embodiment 37 is the method of Embodiment 36 resulting in a shaped optical film having no points where a curvature changes sign.

Embodiment 38 is the method of Embodiment 36, wherein the optical film has no buckles between the first and second rollers during the shaping step.

Embodiment 39 is the method of Embodiment 36, wherein the shaping step comprises keeping a threshold distance between closest first and second points less than about the first width, the first point on the optical film contacting the first roller, the second point on the optical film contacting the curved mold surface.

Embodiment 40 is the method of Embodiment 36, wherein the shaping step comprises changing positions of the first and second ends of the optical film to control a tension in the optical film along the first direction.

Embodiment 41 is the method of Embodiment 36, further characterized by any one of Embodiments 1 to 35.

Embodiment 42 is a method of shaping an optical film, the method comprising the steps of securing opposing first and second ends of the optical film, the first and second ends spaced apart along a first direction;

securing opposing third and fourth ends of the optical film, the third and fourth ends spaced apart along a second direction orthogonal to the first direction;

providing a curved mold surface; and shaping the optical film by contacting the optical film with the curved mold surface while stretching the optical film, resulting in a curved optical film curved along at least the first direction, wherein stretching the optical film during the shaping step comprises stretching the optical film along the first direction greater than 3 times any stretching along the second direction.

Embodiment 43 is the method of Embodiment 42, wherein prior to shaping the optical film, the optical film is generally cross shaped and comprises:

a central region disposed between the first and second ends and between the third and fourth ends; first and second end regions extending from the central region to the first and second ends, respectively; and third and fourth end regions extending from the central region to the third and fourth ends, respectively.

Embodiment 44 is the method of Embodiment 42, further comprising heating the optical film.

Embodiment 45 is the method of any one of Embodiments 1 to 23 or 25 to 44, wherein prior to shaping the optical film, the optical film has a first contrast ratio for normally incident light in a predetermined wavelength range, and after shaping the optical film, the optical film has a second contrast ratio for normally incident light in the predetermined wavelength range, wherein for each location across at least 80% of a total area of the optical film, the second contrast ratio is greater than the first contrast ratio, each of the first and second contrast ratios being a ratio of the maximum transmittance of the optical film for a pass polarization state to the minimum transmittance of the optical film for a block polarization state.

Embodiment 46 is a curved optical film comprising a plurality of polymeric layers shaped along orthogonal first and second directions such that:

a first curve being an intersection of the optical film with a first plane orthogonal to the second direction and to a reference plane has a best-fit first circular arc subtending a first angle at a center of curvature of the first circular arc of greater than 180 degrees, the optical film having a maximum projected area in the reference plane; and a second curve being an intersection of the optical film with a second plane orthogonal to the first direction and to the reference plane has a best-fit second circular arc subtending a second angle at a center of curvature of the second circular arc of at least 30 degrees, wherein each location across at least 90% of a total area of the optical film has a reflectance greater than about 80% and a transmittance less than about 2% for normally incident light having a same predetermined wavelength and a same first polarization state.

Embodiment 47 is the optical film of Embodiment 46, wherein the first angle is at least 185 degrees.

Embodiment 48 is the optical film of Embodiment 46, wherein the first curve passes through a center of the optical film, the optical film has a first thickness at first location along the first curve and a second thickness at a second location along the first curve, the second location separated from the first location by a distance along the first curve of at least 0.7 times a radius of curvature R of the first curve at the center of the optical film, a distance from the center of the optical film to the first location along the first curve being no more than 0.2 R, a distance from the second location to an edge of the optical film along the first curve being no more than 0.2 R, the first and second thicknesses differing by no more than 5%.

Embodiment 49 is a curved optical film comprising a plurality of polymeric layers shaped along orthogonal first and second directions such that:

a first curve being an intersection of the optical film with a first plane orthogonal to the second direction and to a reference plane has a best-fit first circular arc subtending a first angle at a center of curvature of the first circular arc of at least 90 degrees, the optical film having a maximum projected area in the reference plane; and a second curve being an intersection of the optical film with a second plane orthogonal to the first direction and to the reference plane has a best-fit second circular arc subtending a second angle at a center of curvature of the second circular arc of at least 30 degrees, wherein each location across at least 90% of a total area of the optical film has a reflectance greater than about 80% and a transmittance less than about 2% for normally incident light having a same predetermined wavelength and a same first polarization state, and wherein the first curve passes through a center of the optical film, the optical film has a first thickness at a first location along the first curve and a second thickness at a second location along the first curve, the second location separated from the first location by a distance along the first curve of at least 0.7 times a radius R1 of the best-fit first circular arc, a distance from the center of the optical film to the first location along the first curve being no more than 0.2 R1, a distance from the second location to an edge of the optical film along the first curve being no more than 0.2 R1, the first and second thicknesses differing by no more than 5%.

Embodiment 50 is the optical film of any one of Embodiments 46 to 49, wherein the reference plane does not intersect the optical film, at least a majority of the optical film is concave toward the reference plane, an apex of the optical film has a maximum distance from the reference plane, and the first and second curves intersect at the apex.

Embodiment 51 is the optical film of any one of Embodiments 46 to 50, wherein the reference plane does not intersect the optical film, at least majority of the optical film is concave toward the reference plane, an apex of the optical film has a maximum distance from the reference plane, the second direction is along a shortest distance between opposing sides of the maximum projected area through a projection of the apex onto the reference plane and the first direction is along an orthogonal direction in the reference plane through the projection of the apex.

Embodiment 52 is the optical film of any one of Embodiments 46 to 51, wherein the best-fit first circular arc minimizes a sum of squared distances along normal vectors from the first circular arc to points on the first curve, a first endpoint of first curve being along a first normal vector to the first circular arc at a first endpoint of the first circular arc, an opposite second endpoint of the first curve being along a second normal to the first circular arc at an opposite second endpoint of the second circular arc.

Embodiment 53 is the optical film of Embodiment 52, wherein the points on the first curve are selected from a predetermined set of points uniformly distributed over the first curve.

Embodiment 54 is the optical film of Embodiment 52, wherein the points on the first circular arc are selected from a predetermined set of points uniformly distributed over the first circular arc.

Embodiment 55 is the optical film of Embodiment 53 or 54, wherein the predetermined set of points is a set of 10 to 500 points.

Embodiment 56 is a curved optical film comprising a plurality of polymeric layers shaped along orthogonal first and second directions such that:

a first curve being an intersection of the optical film with a first plane orthogonal to the second direction and to a reference plane has a best-fit first circular arc subtending a first angle at a center of curvature of the first circular arc of at least 90 degrees, the optical film having a maximum projected area in the reference plane; and a second curve being an intersection of the optical film with a second plane orthogonal to the first direction and to the reference plane has a best-fit second circular arc subtending a second angle at a center of curvature of the second circular arc of at least 30 degrees, wherein each location across at least 90% of a total area of the optical film has a reflectance greater than about 80% and a transmittance less than about 2% for normally incident light having a same predetermined wavelength and a same first polarization state, and wherein the first curve passes through a center of the optical film, the optical film has a first long wavelength band edge at a first location along the first curve and a second long wavelength band edge at a second location along the first curve, the second location separated from the first location by a distance along the first curve of at least 0.7 times a radius R1 of the best-fit first circular arc, a distance from the center of the optical film to the first location along the first curve being no more than 0.2 R1, a distance from the second location to an edge of the optical film along the first curve being no more than 0.2 R1, the first and second long wavelength band edges differing by no more than 5%.

Embodiment 57 is an optical film comprising a plurality of polymeric layers, each location across at least 90% of a total area of the optical film having a reflectance greater than about 80% and a transmittance less than about 5% for normally incident light having a same predetermined wavelength and a same first polarization state, wherein for orthogonal first and second planes intersecting the optical film along respective first and second curves, the first and second curves intersecting each other at a center location of the optical film, the optical film has a thickness that decreases from the center location to a first edge location of the optical film along the first curve and increases from the center location to a second edge location along the second curve.

Embodiment 58 is the optical film of Embodiment 57, wherein an intersection of the first and second planes define a line normal to the optical film at the center location.

Embodiment 59 is an optical film comprising a plurality of polymeric layers, each location across at least 90% of a total area of the optical film having a reflectance greater than about 80% and a transmittance less than about 5% for normally incident light having a same predetermined wavelength and a same first polarization state, wherein for orthogonal first and second planes intersecting the optical film along respective first and second curves, the first and second curves intersecting each other at a center location of the optical film, the optical film has a long wavelength band edge that decreases from the center location to a first edge location of the optical film along the first curve and increases from the center location to a second edge location along the second curve.

Embodiment 60 is the optical film of Embodiment 59, wherein an intersection of the first and second planes define a line normal to the optical film at the center location.

Embodiment 61 is an optical film comprising a plurality of polymeric layers, each location across at least 90% of a total area of the optical film having a reflectance greater than about 80% and a transmittance less than about 5% for normally incident light having a same predetermined wavelength and a same first polarization state, wherein for orthogonal first and second planes intersecting the optical film along respective first and second curves, the optical film has a first thickness distribution along the first curve that is substantially symmetric under reflection about the second plane and a second thickness distribution along the second curve that is substantially symmetric under reflection about the first plane, the first and second thickness distributions being different.

Embodiment 62 is the optical film of any one of Embodiments 57 to 61, wherein the first curve has a best-fit first circular arc subtending a first angle at a center of curvature of the first circular arc of at least 90 degrees, and the second curve has a best-fit second circular arc subtending a second angle at a center of curvature of the second circular arc of at least 30 degrees.

Embodiment 63 is an optical film comprising a plurality of polymeric layers, each location across at least 90% of a total area of the optical film having a reflectance greater than about 80% and a transmittance less than about 5% for normally incident light having a same predetermined wavelength and a same first polarization state, wherein for orthogonal first and second planes intersecting the optical film along respective first and second curves, the optical film has a first long wavelength band edge distribution along the first curve that is substantially symmetric under reflection about the second plane and a second long wavelength band edge distribution along the second curve that is substantially symmetric under reflection about the first plane, the first and second long wavelength band edge distributions being different.

Embodiment 64 is the optical film of Embodiment 63, wherein the first and second curves intersect at a center location of the optical film and the first long wavelength band edge distribution comprises a long wavelength band edge that decreases from the center location to a first edge location of the optical film along the first curve.

Embodiment 65 is the optical film of Embodiment 64, wherein the second long wavelength band edge distribution comprises a long wavelength band edge that increases from the center location to a second edge location of the optical film along the second curve.

Embodiment 66 is the optical film of Embodiment 63, wherein the first and second curves intersect at a center location of the optical film and the first long wavelength band edge distribution comprises a long wavelength band edge that decreases from the center location to a first edge location of the optical film along the first curve, and the second long wavelength band edge distribution comprises a long wavelength band edge that increases from the center location to a second edge location of the optical film along the second curve.

Embodiment 67 is a curved reflective polarizer comprising a plurality of polymeric layers shaped along at least orthogonal first and second directions so that a first ratio of a first maximum sag to a corresponding first diameter along the first direction is at least 0.1, and a second ratio of a second maximum sag to a corresponding second diameter along the second direction is at least 0.05, wherein for normally incident light in a predetermined wavelength range, each location on the reflective polarizer has a maximum average reflectance greater than about 80% and a corresponding minimum average transmittance less than about 2% for a block polarization state, and a maximum average transmittance greater than about 80% for an orthogonal pass polarization state, wherein each location in a region of the reflective polarizer having an area of at least 80% of a total area of the reflective polarizer has a contrast ratio being the maximum average transmittance divided by the minimum average transmittance of at least 500.

Embodiment 68 is a curved reflective polarizer comprising a plurality of polymeric layers shaped along orthogonal first and second directions such that a total curvature of the reflective polarizer is at least 0.25, the total curvature being a surface integral of a Gaussian curvature of the reflective polarizer over a total area of the reflective polarizer, wherein for normally incident light in a predetermined wavelength range, each location on the reflective polarizer has a maximum average reflectance greater than about 80% and a corresponding minimum average transmittance less than about 2% for a block polarization state, and a maximum average transmittance greater than about 80% for an orthogonal pass polarization state, wherein each location in a region of the reflective polarizer having an area of at least 80% of the total area of the reflective polarizer has a contrast ratio being the maximum average transmittance divided by the minimum average transmittance of at least 500.

Embodiment 69 is the reflective polarizer of Embodiment 68, wherein a first ratio of a first maximum sag to a corresponding first diameter along the first direction is at least 0.1, and a second ratio of a second maximum sag to a corresponding second diameter along the second direction is at least 0.05.

Embodiment 70 is the reflective polarizer of any one of Embodiments 67 to 68, wherein for a predetermined wavelength in the predetermined wavelength range, each location over at least 80% of the total area of the reflective polarizer has a transmittance less than about 0.2% for normally incident light having the block polarization state.

Embodiment 71 is a curved reflective polarizer comprising a plurality of polymeric layers shaped along orthogonal first and second directions such that a total curvature of the reflective polarizer is at least 0.25, the total curvature being a surface integral of a Gaussian curvature of the reflective polarizer over a total area of the reflective polarizer, wherein for normally incident light having a predetermined wavelength, each location over at least 80% of a total area of the reflective polarizer has a maximum reflectance greater than about 80% and a corresponding minimum transmittance less than about 0.2% for a block polarization state, and a maximum transmittance greater than about 80% for an orthogonal pass polarization state.

Embodiment 72 is the reflective polarizer of Embodiment 71, wherein a first ratio of a first maximum sag to a corresponding first diameter along the first direction is at least about 0.1, and a second ratio of a second maximum sag to a corresponding second diameter along the second direction is at least about 0.05.

Embodiment 73 is the reflective polarizer of Embodiment 71 or 72, wherein each location over at least 90% of a total area of the reflective polarizer has a minimum transmittance less than about 0.2% for the block polarization state.

Embodiment 74 is an apparatus for processing optical film, the apparatus comprising:

first and second rollers spaced apart along a first direction and disposed on respective first and second stages configured to move the first and second rollers along the first direction, the first and second rollers having respective first and second widths along a second direction orthogonal to the first direction;

first and second securing means for securing opposing first and second ends of the optical film, the first and second rollers disposed between the first and second securing means, the apparatus being configured such that when the first and second ends of the optical film are secured in the first and second securing means, the optical film contacts the first and second rollers;

a mold having a curved mold surface and disposed on a mold stage configured to move the mold along a third direction orthogonal to the first and second directions;

a means for heating the optical film;

a tension measuring means for measuring a tension in the optical film;

a controller communicatively coupled to the tension measuring means, the first and second stages, the first and second securing means, and the mold stage, the controller being configured to simultaneously move the mold along the third direction and move the first and second roller along the first direction while controlling the tension in the optical film.

Embodiment 75 is the apparatus of Embodiment 74, wherein the controller is adapted to control the tension by adjusting a distance along the first direction between the first and second securing means.

Embodiment 76 is the apparatus of Embodiment 74, wherein the first and second securing means comprise respective third and fourth stages configured to move the first and second ends of the optical film along the first direction, the third and fourth stages being communicatively coupled to the controller.

Embodiment 77 is the apparatus of any one of Embodiments 74 to 76, wherein each of the first and second securing means comprise a securing roller or securing grips.

Embodiment 78 is the apparatus of Embodiment 74, wherein the means for heating the optical film comprises a heater spaced apart from the mold along the third direction.

Embodiment 79 is the apparatus of Embodiment 74, wherein the means for heating the optical film comprises heating elements disposed in or on the mold.

Embodiment 80 is the apparatus of Embodiment 74 further comprising the optical film, wherein a temperature of the optical film is lower at a first point of the optical film contacting the curved mold surface than at a second point of the optical film not contacting the curved mold surface.

EXAMPLES

Reflective Polarizer 1

Two multilayer optical packets were co-extruded with each packet comprised of 325 alternating layers of polyethylene naphthalate (PEN) and a low index isotropic layer, which was made with a blend of polycarbonate and copolyesters (PC:coPET) such that the index is about 1.57 and remains substantially isotropic upon uniaxial orientation, wherein the PC:coPET molar ratio is approximately 42.5 mol % PC and 57.5 mol % coPET and has a Tg of 105 degrees centigrade. This isotropic material was chosen such that after stretching its refractive indices in the two non-stretch directions remains substantially matched with those of the birefringent material in the non-stretching direction while in the stretching direction there is a substantial mismatch in refractive indices between birefringent and non-birefringent layers. The PEN and PC/coPET polymers were fed from separate extruders to a multilayer coextrusion feedblock, in which they were assembled into packets of 325 alternating optical layers ("Packet 1" and "Packet 2" respectively), plus a thicker protective boundary layer of the PC/coPET, on the outside of the stacked optical packets, for a total of 652 layers. The film was substantially uniaxially stretched in a parabolic tenter as described in U.S. Pat. No. 6,916,440 (Jackson et al.). The film was stretched at a temperature of about 150° C. to a draw ratio of about 6. The layer thickness profile for the resulting reflective polarizer is shown in FIG. 19 with Packets 1 and 2 indicated. Several samples were made having a total thickness as measured by a capacitance gauge of approximately 62-64 μm. Protective olefin liners were applied to each side of the reflective polarizer.

Example 1

Figure 23A:
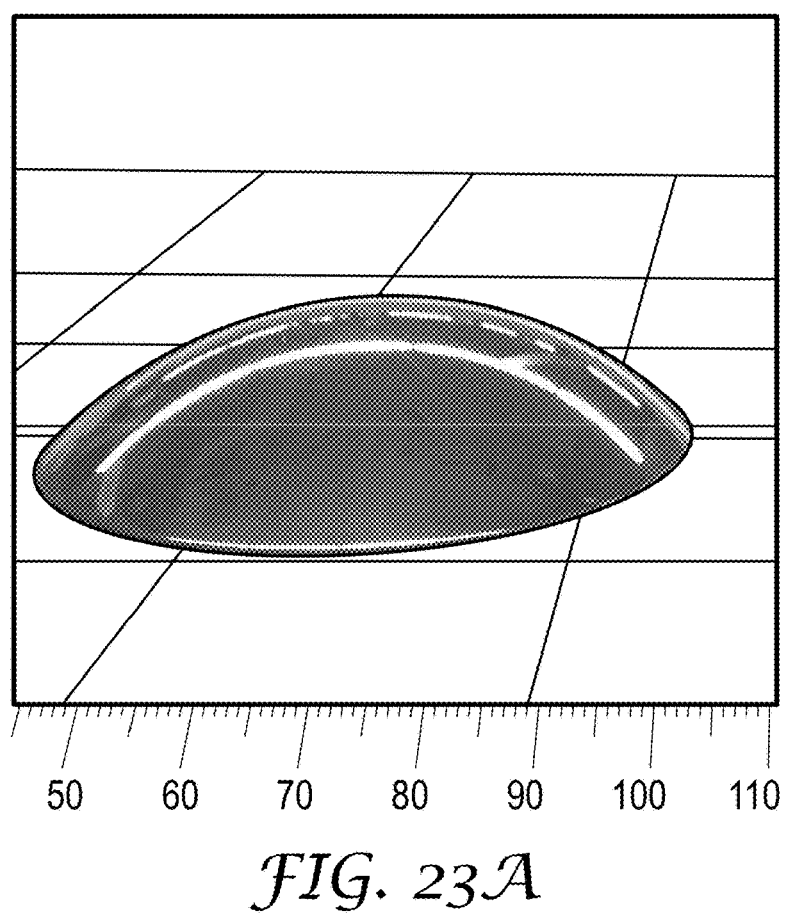
FIG. 23A-23B are images of molds.

Optical films were shaped using an apparatus similar to that illustrated in FIG. 2. A picture of the mold (corresponding to mold 350) is provided in FIG. 23A. The mold was a Base 8 form having a spherical radius of curvature of 65.3 mm, a diameter of 90 mm, a maximum angle subtended at the center of curvature of 87.1 degrees, a contour length (length along geodesic through apex) of 99.3 mm, a sag of 17.9 mm, and a sag to diameter ratio of 0.199, and a total curvature of 1.72.

Samples were shaped using one of two processing conditions. For condition 1, an 80 mm by 1200 mm wide piece of Reflective Polarizer 1 film was cut with the long direction aligned with the block direction of the film. The grips (corresponding to securing means 130 and 135) were set to a distance of 680 mm apart, the inner rollers (corresponding to first and second rollers 111 and 112) were set a distance of 230 mm apart (measured from center to center), and the film was loaded into the apparatus with the film passing over the inside rollers and under the outside rollers. The outer rollers centers were positioned 65 mm outside the inner rollers and traveled with inner rollers. The olefin liners were then peeled from the film and threaded out through the rollers. A tension of about 35N was applied to the film. The film was heated to 170° C. with a 600 W, 125 mm×125 mm Ceramic type IR heater (supplied by WECO International) located ~150 mm below the film. The temperature was monitored using an IR temperature sensor with a 12 mm spot size. When the film reached the set temperature, the tension was increased to about 500N and the rollers were moved to a center-to-center separation distance between the inner rollers of 105 mm. Once the rollers were in place the mold was plunged into the film at a rate if 2 mm/sec until the mold moved 45 mm after initially contacting the film. After 7.1 seconds, the rollers were moved outward to maintain a free-span length between the point of contact on the mold and the point of contact on the respective roller of ~15-20 mm as the mold continued its downward path. During this process, the film tension was monitored with two load cells mounted on the grips and the grips were moved to maintain a constant tension of about 500 N. The IR heat was maintained on the film during this process. Once the mold and rollers reached their final positions, the part was held over the IR heater for another 113 seconds to help relax any stresses in the film. The heater was then moved away and the film (and mold) were allowed to cool for 5 min in ambient air. After cooling, the film tension was removed and the rollers and mold moved apart to allow the shaped film to be removed from the machine.

For Condition 2, a sample of Reflective Polarizer 1 film was loaded into the apparatus as described for Condition 1 and the olefin liners were then peeled from the film and threaded out through the rollers. A tension of about 35N was applied to the film. The film was heated to 170° C. as described for Condition 1. When the film reached the set temperature, the tension was increased to about 250N and the rollers were moved to a center-to-center separation distance between the inner rollers of 105 mm. Once the rollers were in place the mold was plunged into the film at a rate if 2 mm/sec until the mold moved 55 mm after initially contacting the film. After 6.7 seconds, the rollers were moved outward to maintain a free-span length between the point of contact on the mold and the point of contact on the respective roller of ~10-15 mm as the mold continued its downward path. After another 15 seconds, the film tension was increased to about 350 N. After another 20 seconds, the separation between the rollers was increased by an additional 30 mm and the mold was plunged down another 17 mm. This was done to position the film closed to the heater. The film was held over the IR heater for an additional 165 sec. The heater was then moved away and the film (and mold) were allowed to cool for 5 min in ambient air. After cooling, the film tension was removed and the rollers and mold moved apart to allow the shaped film to be removed from the machine.

Figure 24:
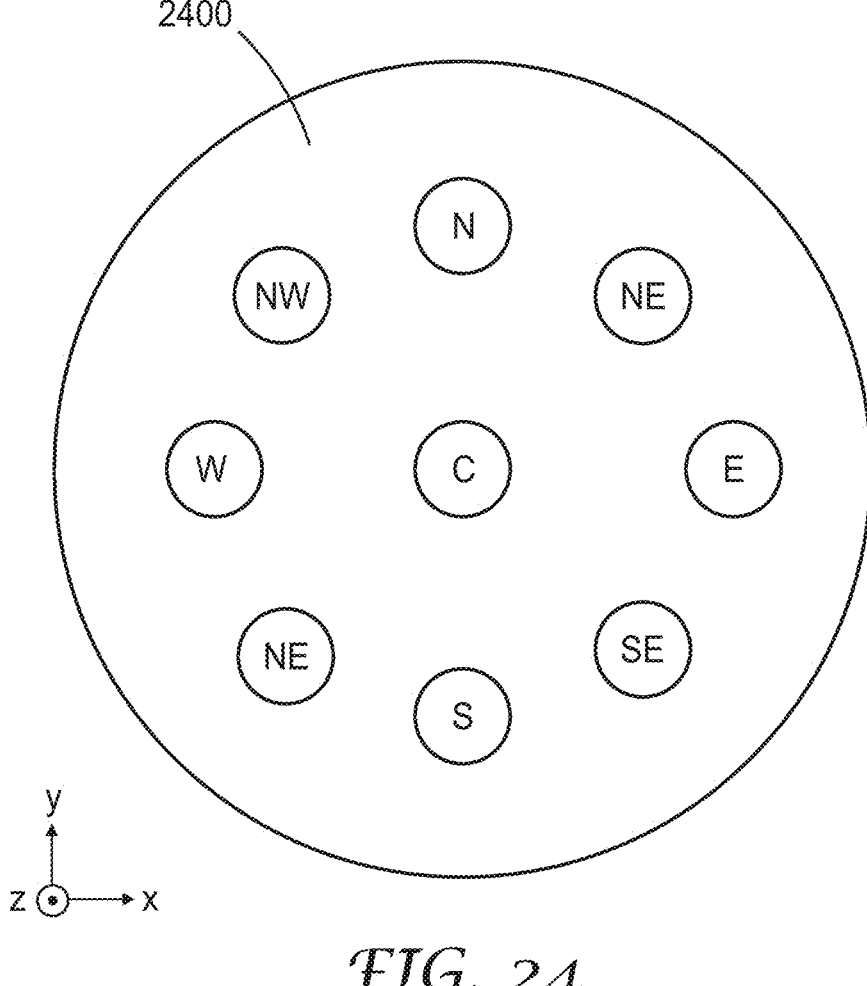
FIG. 24 is a schematic top view of a reflective polarizer.

The reflective polarizer samples were mounted onto a goniometer fixture and the samples were rotated to place the desired region of the sample in the light path with the test region surface normal to the beam. The sample was oriented so that it was convex towards the incident beam. Samples were tested at center (C), north (N), northeast (NE), east (E), southeast (SE), south (S), southwest (SW), west (W), and northwest (NW) locations as schematically illustrated in FIG. 24 which is a top plan view of reflective polarizer 2400.

Figure 25:
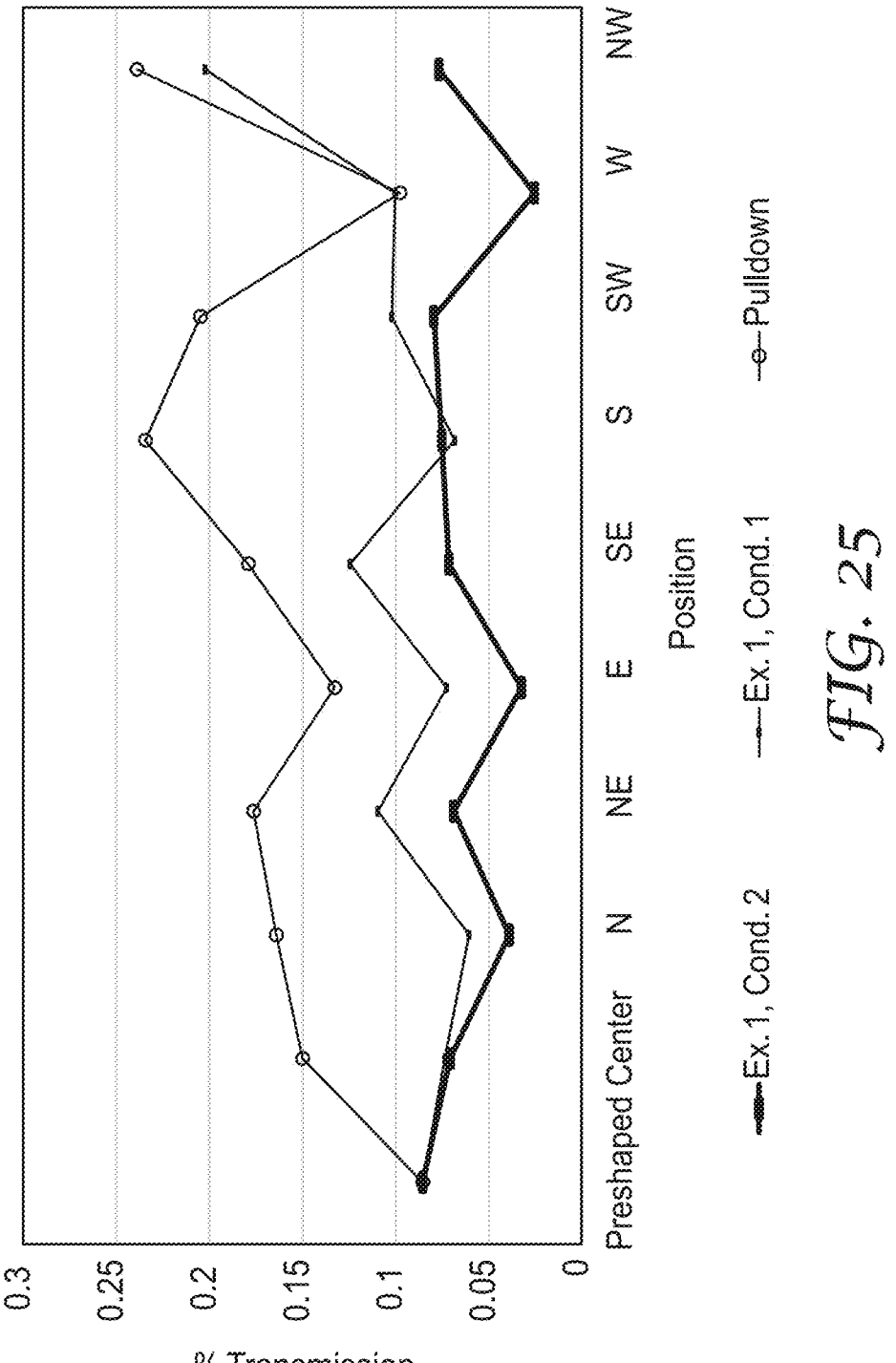
FIG. 25 is a plot of average block state transmissions of reflective polarizers.
Figure 26:
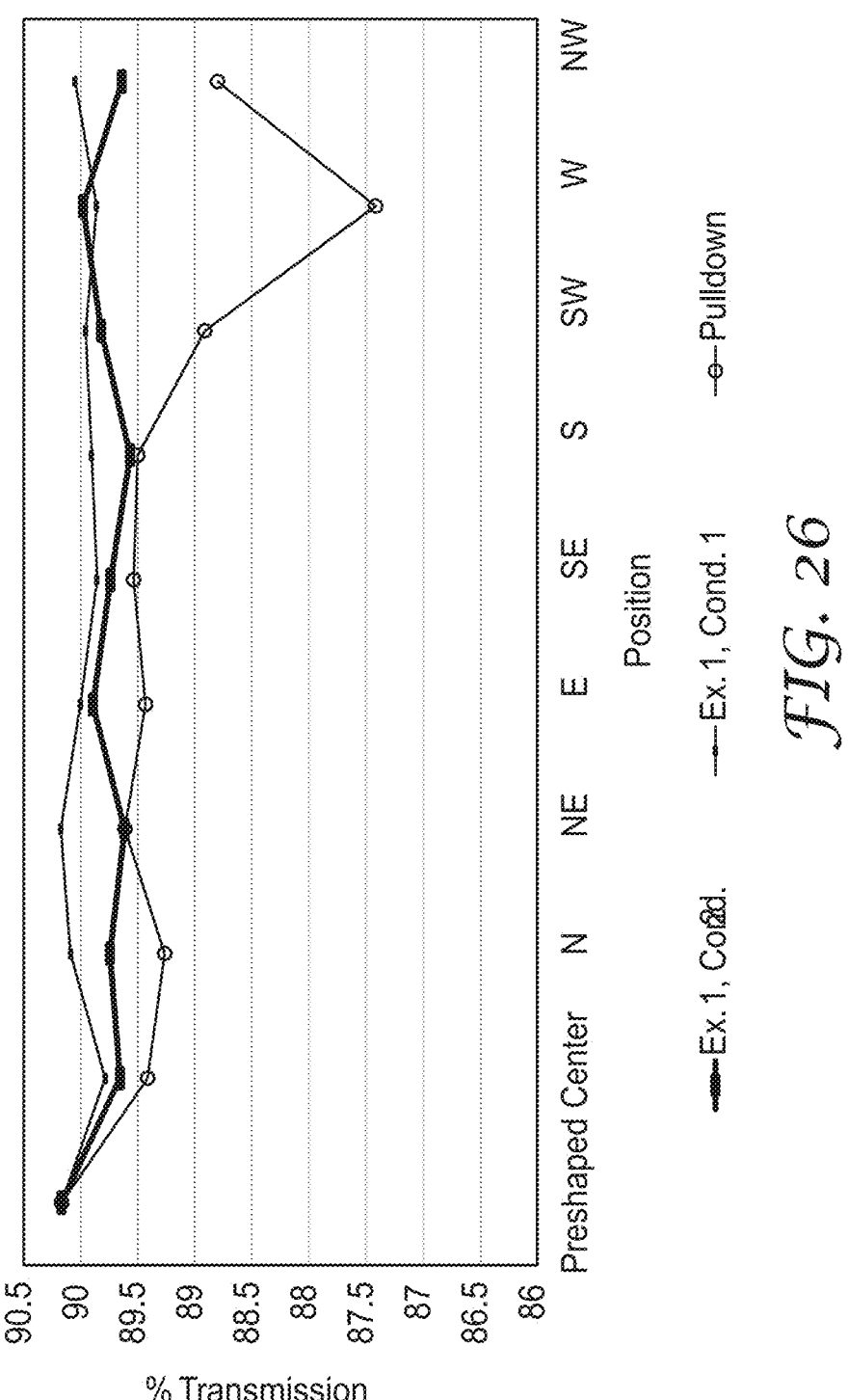
FIG. 26 is a plot of average pass state transmissions of reflective polarizers.
Figure 27:
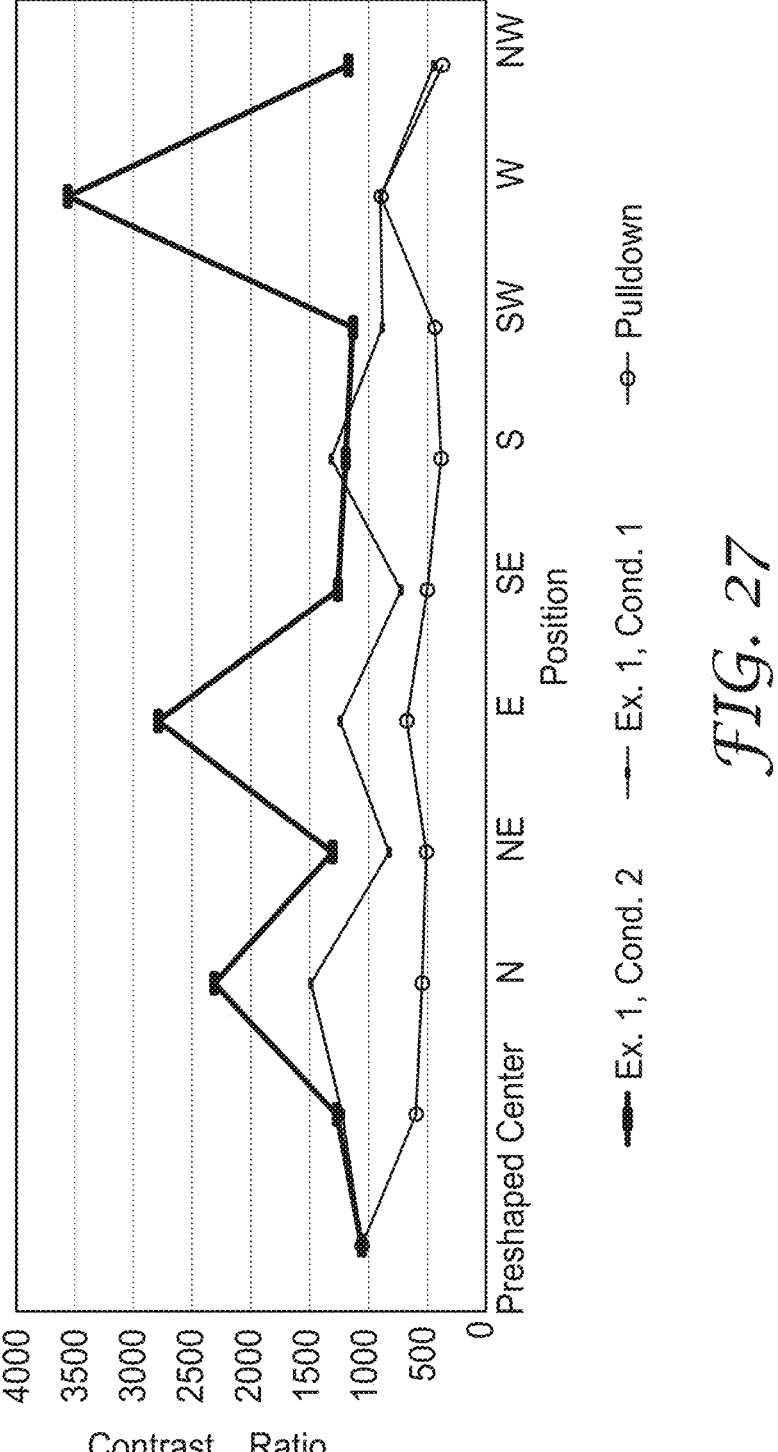
FIG. 27 is a plot of contrast ratios of reflective polarizers.
Figure 28:
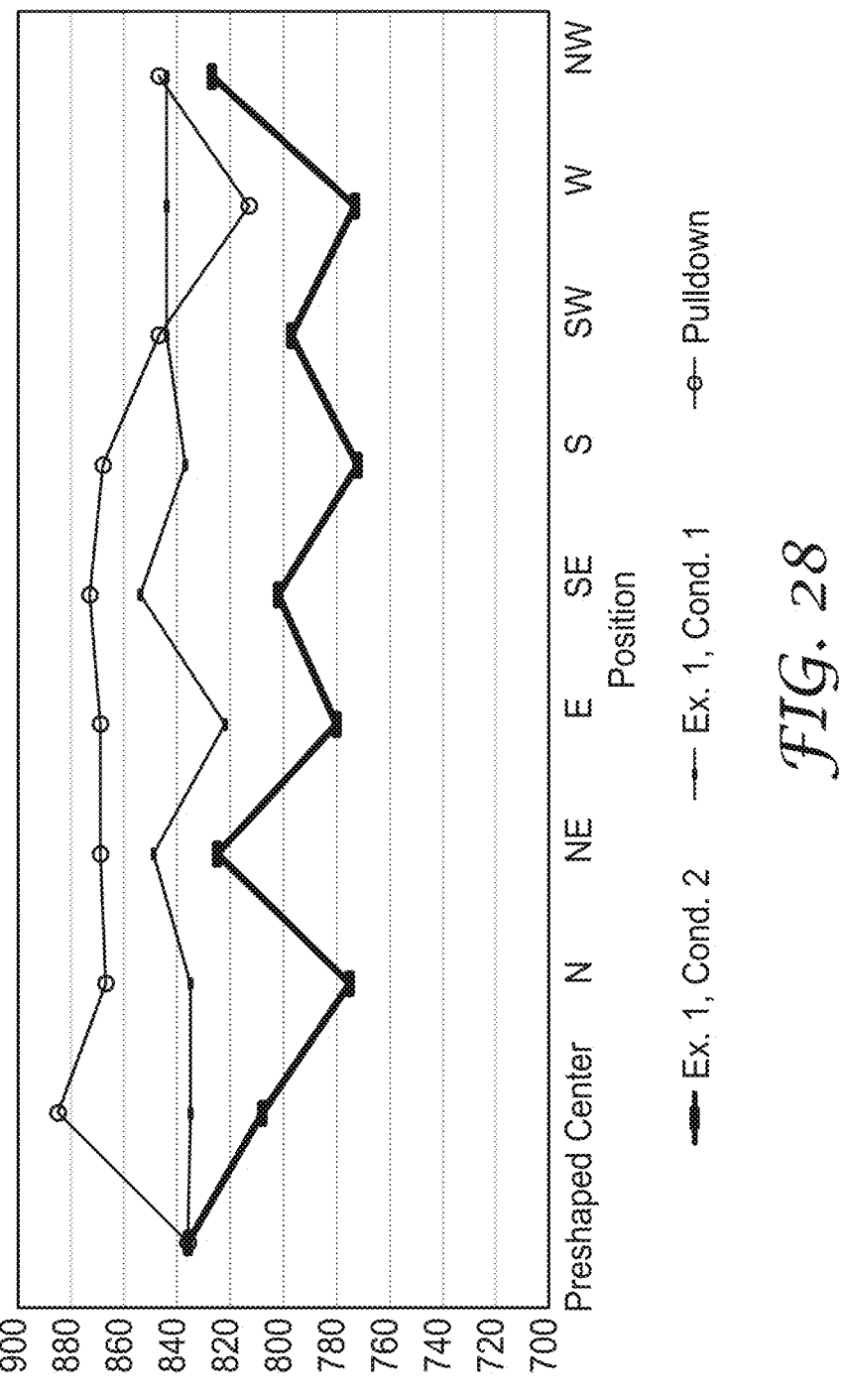
FIG. 28 is a plot of long wavelength band edges of reflective polarizers.

The block direction of the reflective polarizer was along the north-south direction at the center. The pass state transmission and the block state transmission was measured at normal incidence as a function of wavelength using a Lambda 1050 spectrophotometer (available from PerkinElmer, Waltham, MA). The average block state transmission Tb and the average pass state transmission Tp was determined over the wavelength range of 450 nm to 650 nm and the corresponding contrast ratio Tp/Tb was determined. The long wavelength band edge was determined as the wavelength where the block state transmission reached 10%. The average block state transmission, the average pass state transmission, the contrast ratio, and the long wavelength band edge are shown in FIGS. 25-27, respectively, for Reflective Polarizer 1 samples shaped under conditions 1 and 2 and for samples prior to shaping (preshaped). The results for a Reflective Polarizer 1 film shaped in a pulldown process of a MAAC system as described in U.S. Prov. Pat. Appl. No. 62/577,474 are shown for comparison. The block state transmission was significantly lower for the films shaped according to the present description compared to the pulldown process while the pass state transmission was higher and the contrast ratio was substantially higher. For the sample shaped using Condition 2, the contrast ratio was higher than the preshaped sample over most of the reflective polarizer.

Figure 29:
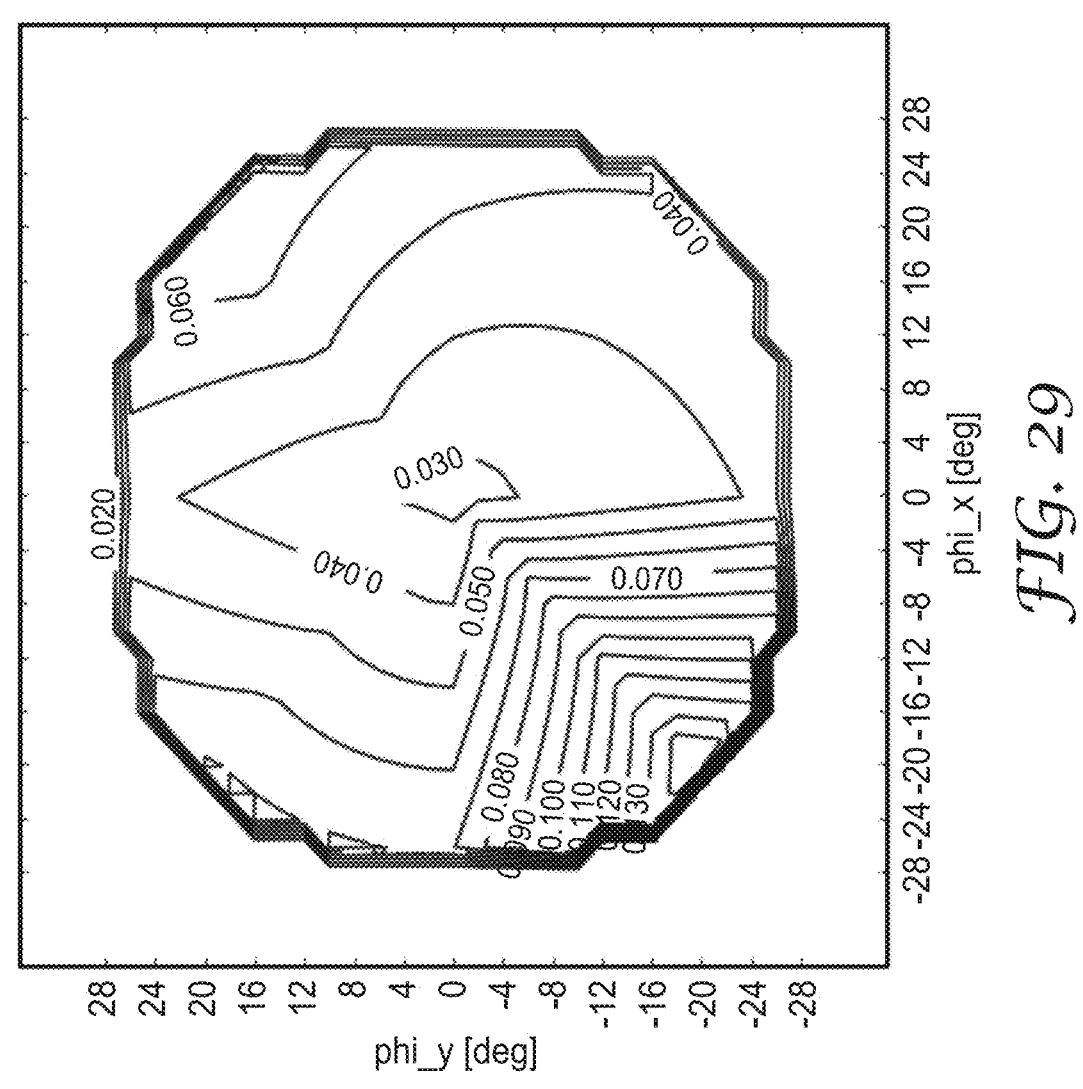
FIG. 29 is a contour plot of the average block state transmission of a reflective polarizer.
Figure 30:
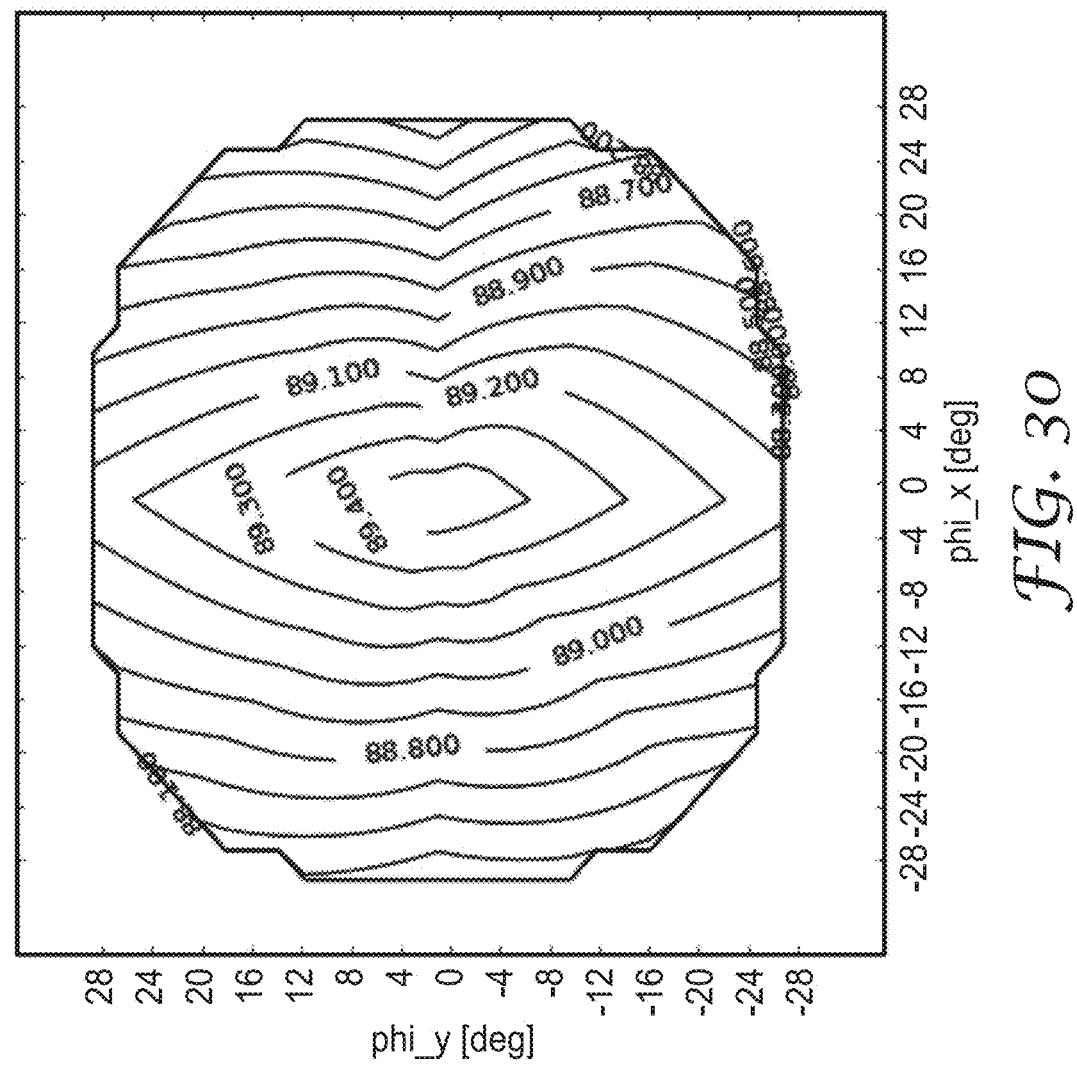
FIG. 30 is a contour plot of the average pass state transmission of a reflective polarizer.
Figure 31:
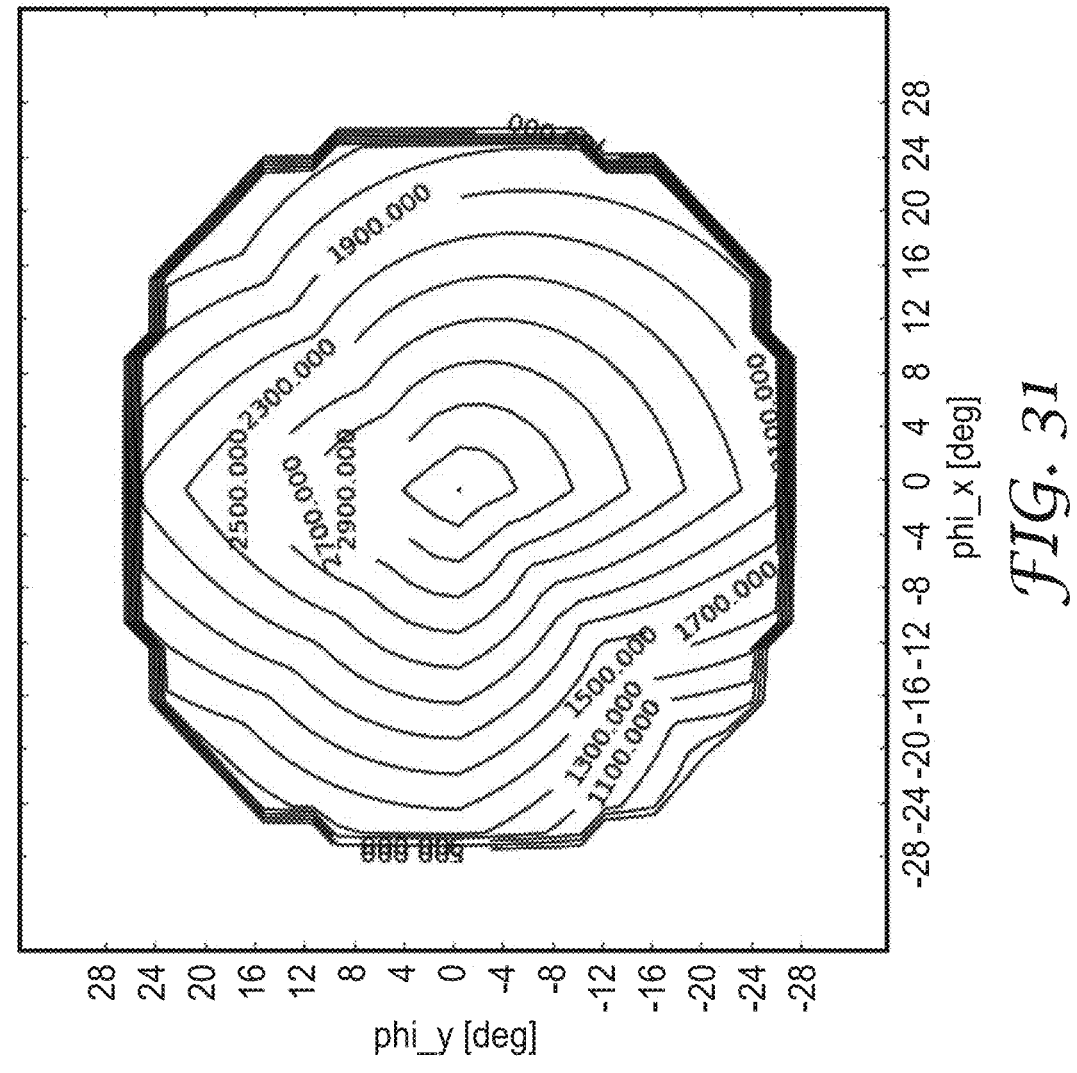
FIG. 31 is a contour plot of the contrast ratio of a reflective polarizer.

The average block and pass state transmission over the same wavelength range and the corresponding contrast ratio was also determined for a sample shaped using Condition 2 at the points described above and the results were linearly interpolated over an area of film to produce contour plots. Measurements were performed with the light normally incident on the reflective polarizer and the reflective polarizer oriented such that it was convex towards the incident light. Positions were described in terms of angles phi_x and phi_y where tan(phi_x)=X/Z, tan(phi_y)=Y/X, where X,Y,Z are orthogonal coordinates with an origin at the center of curvature of the reflective polarizer, Z is along a normal to the reflective polarizer at the apex of the reflective polarizer, Y is along the block axis at the apex, and X is orthogonal to Y. The resulting contour plots of the average block state transmission, the average pass state transmission and the contrast ratio are shown in FIGS. 29-31, respectively.

Example 2

Figure 23B:
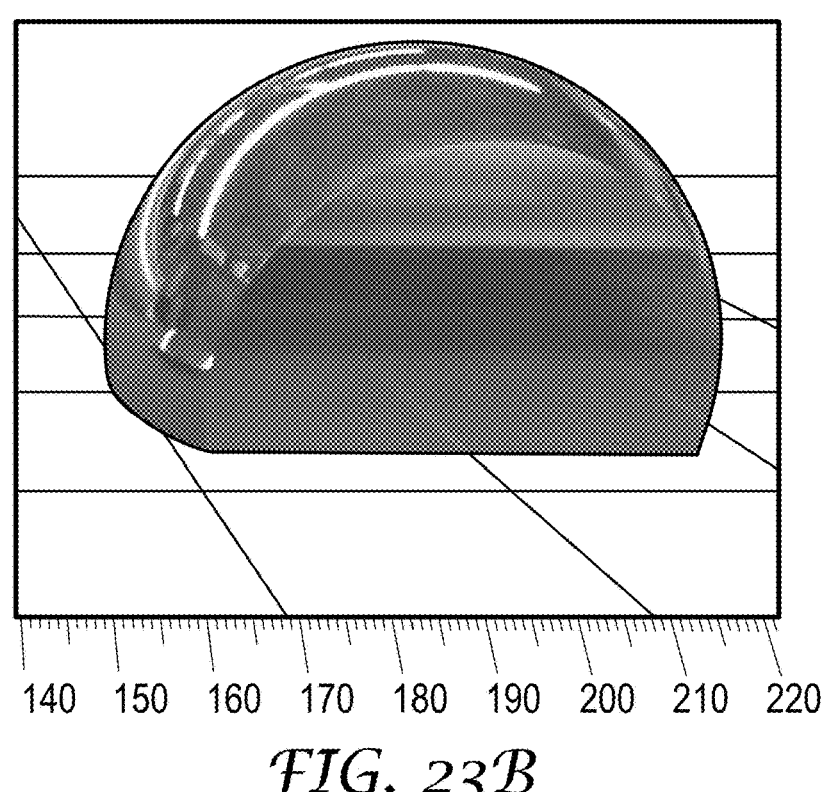

Optical films were shaped using an apparatus similar to that illustrated in FIG. 2. A picture of the mold (corresponding to mold 350) is provided in FIG. 23B. The mold had a spherical radius of curvature of 50 mm, a diameter along a first (long) direction of 100 mm, a diameter along an orthogonal second direction of 50 mm, a maximum angle subtended at the center of curvature of 200 degrees along the first direction and 73.7 degrees along the second direction, a contour length (length along geodesic through apex) along the first direction of 174.5 mm, a maximum sag of 58.7 mm and a corresponding diameter 100 mm along the first direction (a first S/D ratio of 0.587), a maximum sag of 10 mm and a corresponding diameter of 60 mm along the second direction (a second S/D ratio of 0.167), and a total curvature of 4.19.

Figure 32:
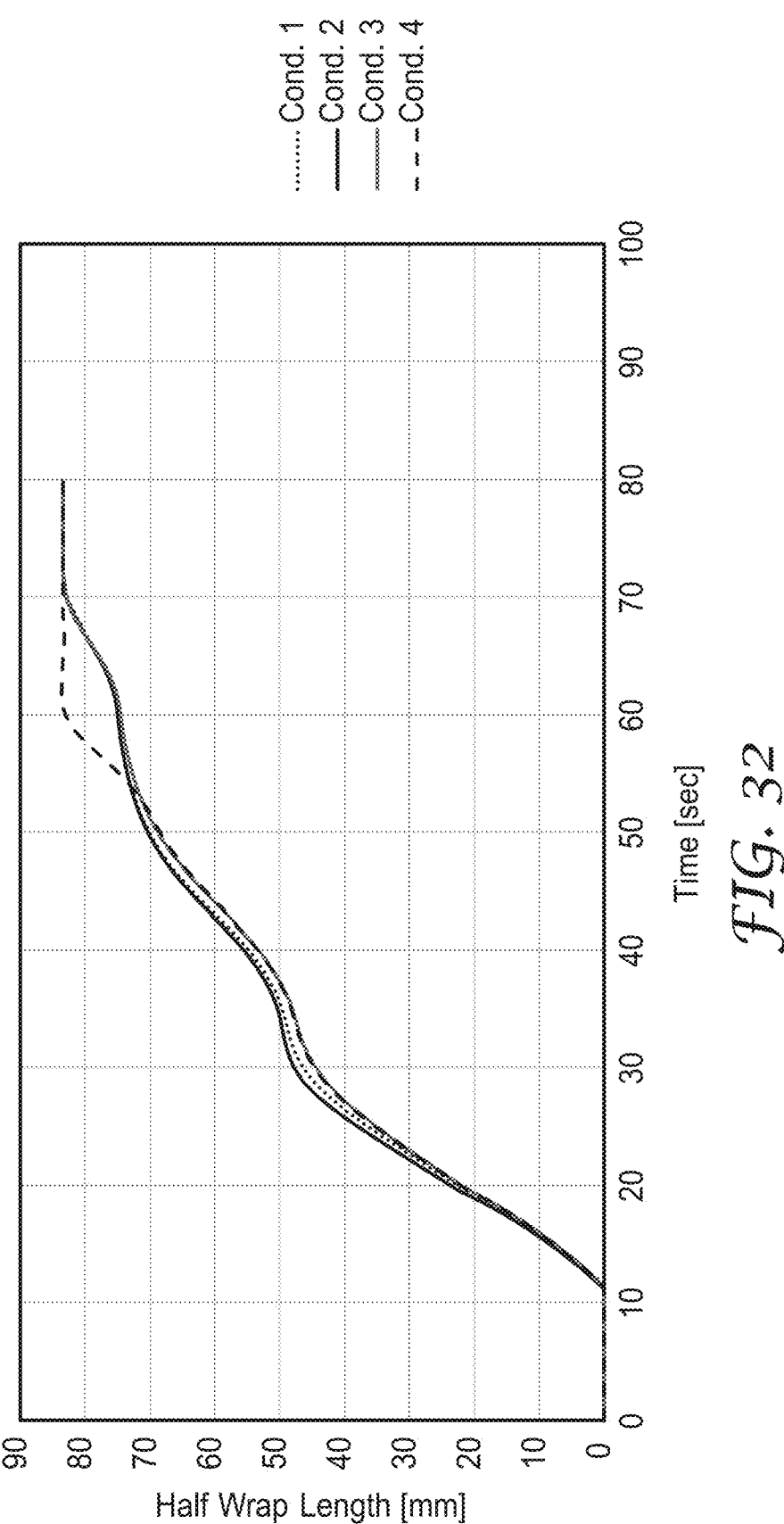
FIG. 32 is a plot of the half wrap length of an optical film on a mold as a function of time during a shaping process for various process conditions.
Figure 33:
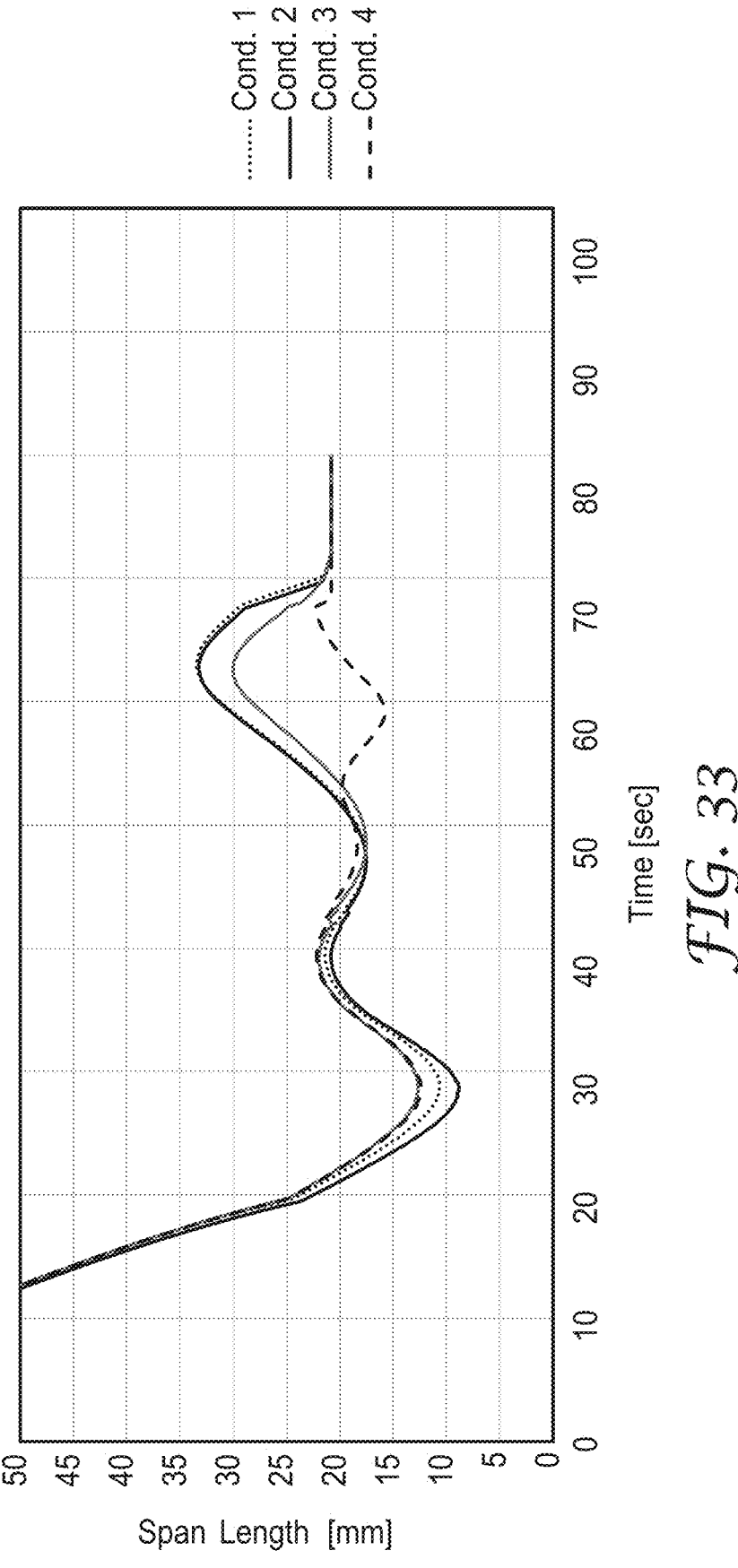
FIG. 33 is a plot of the span length of an optical film between a contact point on a mold and a contact point a roller as a function of time during a shaping process for various process conditions.
Figure 34:
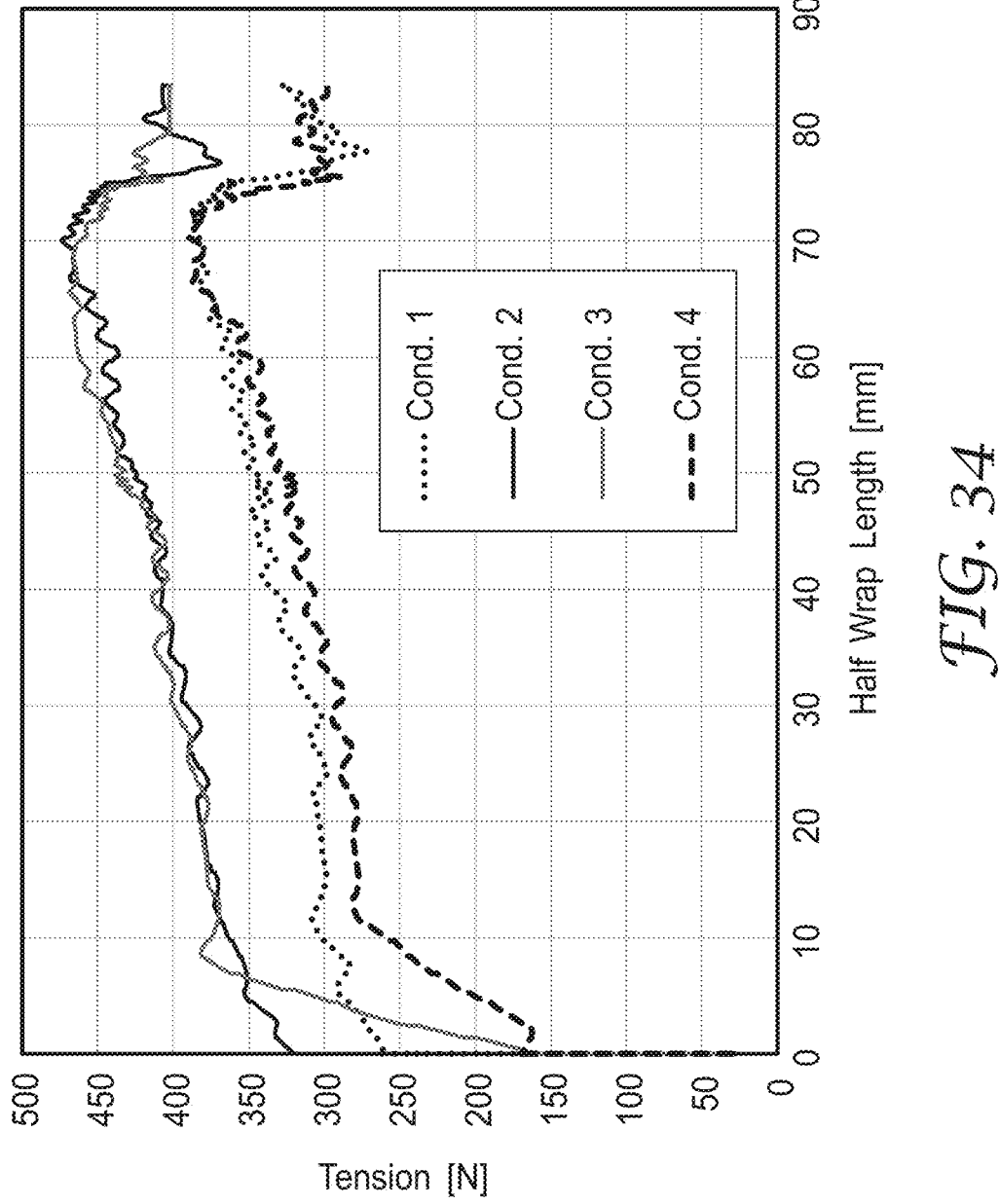
FIG. 34 is a plot of the tension along the length of an optical film as a function of time during a shaping process for various process conditions.
Figure 35:
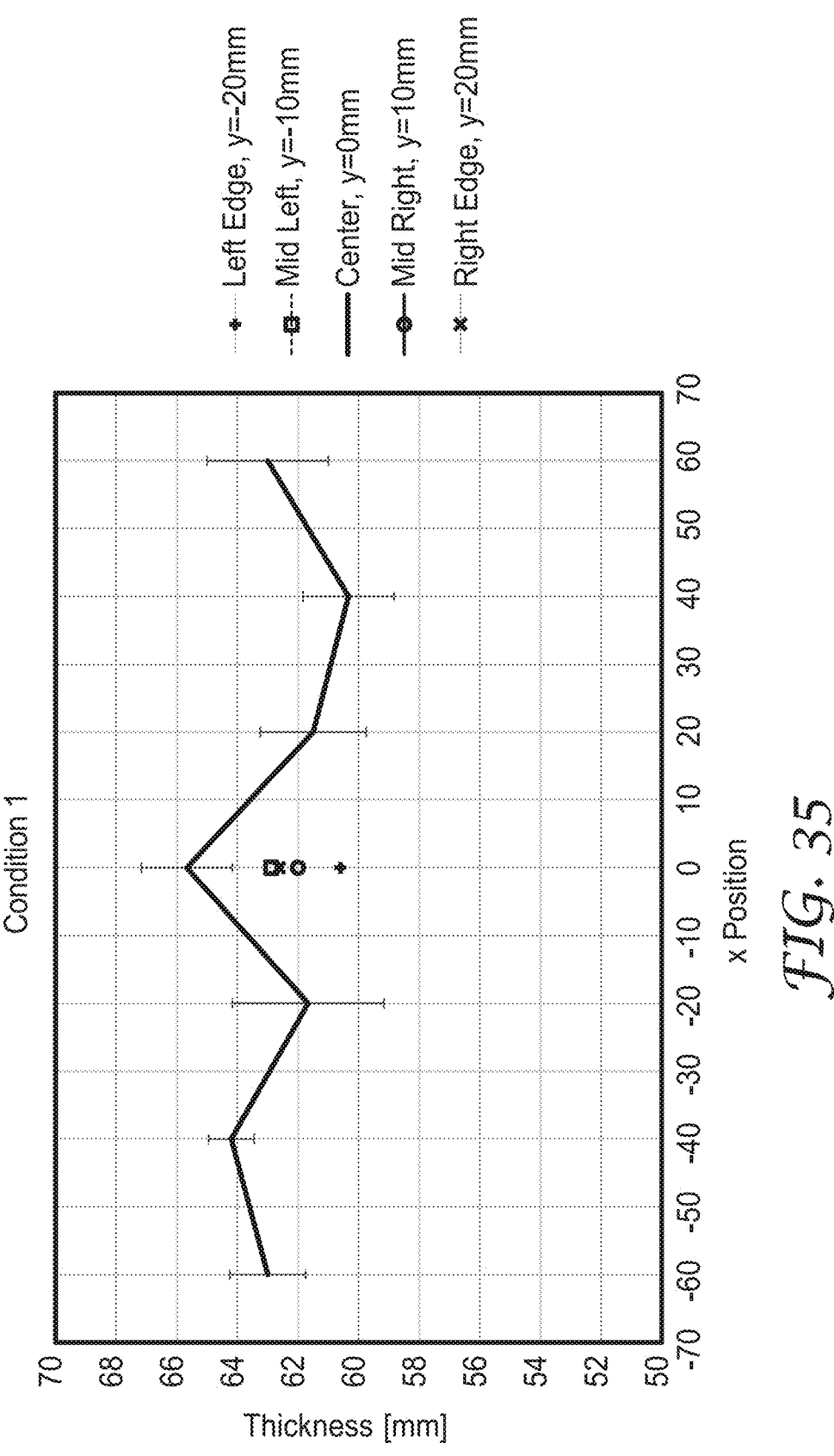
FIGS. 35-38 are plots of the thickness distribution of shaped optical films for various process conditions.
Figure 36:
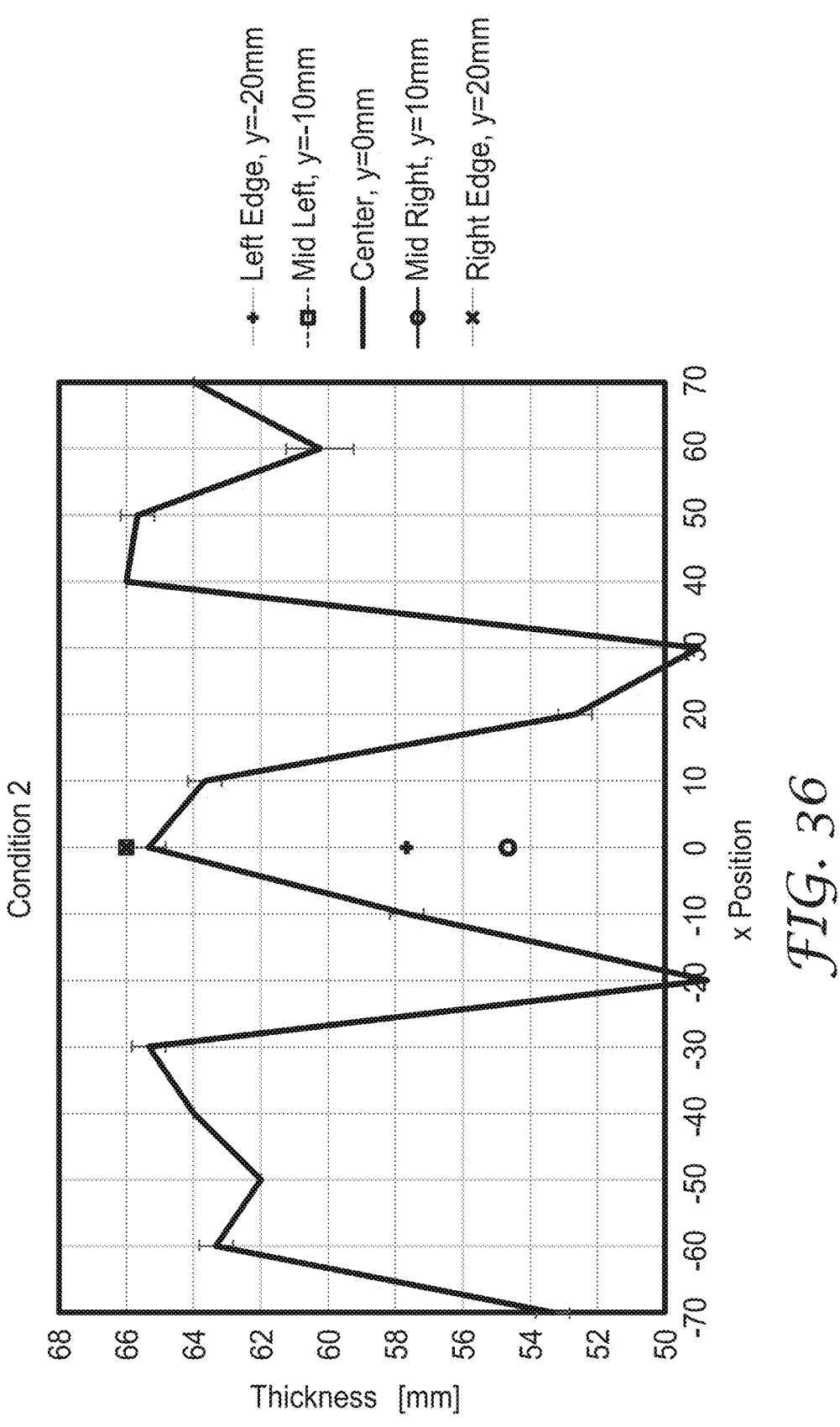
Figure 37:
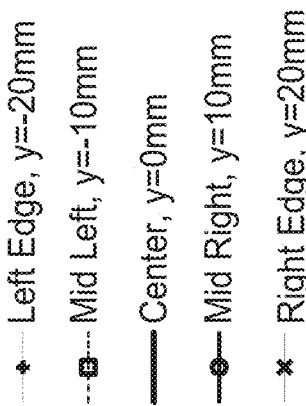
Figure 37:
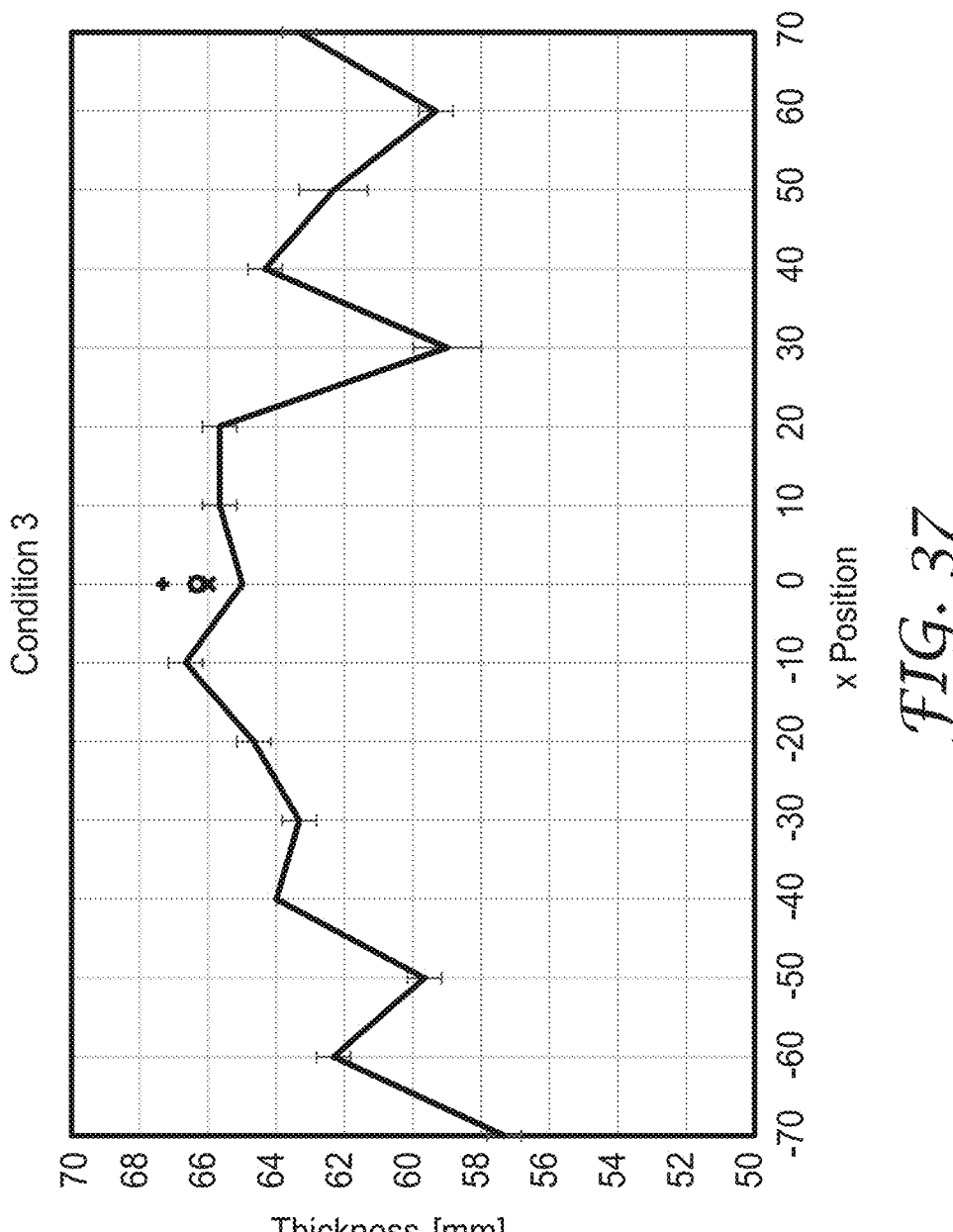
Figure 38:

A 64 mm by 1200 mm wide piece of Reflective Polarizer 1 film was cut with the long direction aligned with the block direction of the film. The grips were set to a distance of 680 mm apart, the inner rollers were set a distance of 230 mm apart (measured from center to center) and the film was loaded into the apparatus with the film passing over the inside rollers and under the outside rollers (the outer rollers centers were positioned 65 mm outside the inner rollers and travel with inner rollers). The olefin liners were then peeled from the film and threaded out through the rollers. A tension of 15N was applied to the film. The film was heated to 170° C. with a 600 W, 125 mm×125 mm Ceramic type IR heater (supplied by WECO International) located ~150 mm below the film. The temperature was monitored using an IR temperature sensor with a 12 mm spot size. When the film reached the set temperature, the tension was increased to 400N and the rollers were moved to a center-to-center separation distance of 105 mm. Once the rollers were in place the mold was plunged (from above) into the film at a rate such that the length of film contacting the form was as shown in FIG. 32 for one of Conditions 1-4 specified in FIGS. 32-34. The positions of the rollers were adjusted so that the free span film length between the point of contact on the form and the point of contact on the roller (corresponding to d1 and d2 in FIG. 1E) was as illustrated in FIG. 33. During this process, the film tension was monitored with two load cells mounted on the grips and the grips were moved to maintain the tension specified in FIG. 34. The IR heat was maintained on the film during this process. Once the form and rollers reached their final positions the part was held over the IR heater for another 60 seconds to help relax any stresses in the film. The heater was then moved away and the film (and form) were allowed to cool for 5 min in ambient air. After cooling, the film tension was removed and the rollers and form moved apart to allow the shaped film to be removed from the machine.

Thicknesses along the first direction (corresponding to thicknesses along the first curve 3010) and thickness along the second direction (corresponding to thicknesses along the second curve 3020) were measured using a Mitutoyo digital micrometer head with a spherical tip mounted on a gage stand and are shown in FIGS. 35-38 for films shaped using Conditions 1-4, respectively.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

All references, patents, and patent applications cited in the foregoing are herein incorporated by reference in their entirety in a consistent manner. In the event of inconsistencies or contradictions between portions of the incorporated references and this application, the information in the preceding description shall control.

What is claimed is:

1. A curved reflective polarizer comprising a plurality of polymeric layers shaped along orthogonal first and second directions such that a total curvature of the reflective polarizer is at least 0.25, the total curvature being a surface integral of a Gaussian curvature of the reflective polarizer over a total area of the reflective polarizer, wherein for normally incident light in a predetermined wavelength range, each location on the reflective polarizer has a maximum average reflectance greater than about 80% and a corresponding minimum average transmittance less than about 2% for a block polarization state, and a maximum average transmittance greater than about 80% for an orthogonal pass polarization state, wherein each location in a region of the reflective polarizer having an area of at least 80% of the total area of the reflective polarizer has a contrast ratio being the maximum average transmittance divided by the minimum average transmittance of at least 500.

2. The curved reflective polarizer of claim 1, wherein a first ratio of a first maximum sag to a corresponding first diameter along the first direction is at least 0.1, and a second ratio of a second maximum sag to a corresponding second diameter along the second direction is at least 0.05.

3. The curved reflective polarizer of claim 1, wherein for a predetermined wavelength in the predetermined wavelength range, each location over at least 80% of the total area of the reflective polarizer has a transmittance less than about 0.2% for normally incident light having the block polarization state.

4. The curved reflective polarizer of claim 1, wherein for a predetermined wavelength in the predetermined wavelength range, each location over at least 80% of the total area of the reflective polarizer has a transmittance less than about 0.10% for normally incident light having the block polarization state.

5. A curved reflective polarizer comprising a plurality of polymeric layers shaped along orthogonal first and second directions such that a total curvature of the reflective polarizer is at least 0.25, the total curvature being a surface integral of a Gaussian curvature of the reflective polarizer over a total area of the reflective polarizer, wherein for normally incident light having a predetermined wavelength, each location over at least 80% of the total area of the reflective polarizer has a maximum reflectance greater than about 80% and a corresponding minimum transmittance less than about 0.2% for a block polarization state, and a maximum transmittance greater than about 80% for an orthogonal pass polarization state.

6. The curved reflective polarizer of claim 5, wherein a first ratio of a first maximum sag to a corresponding first diameter along the first direction is at least about 0.1, and a second ratio of a second maximum sag to a corresponding second diameter along the second direction is at least about 0.05.

7. The curved reflective polarizer of claim 5, wherein for normally incident light having the predetermined wavelength, each location over at least 90% of the total area of the reflective polarizer has a minimum transmittance less than about 0.2% for the block polarization state.

8. The curved reflective polarizer of claim 5, wherein for normally incident light having the predetermined wavelength, each location over at least 90% of the total area of the reflective polarizer has a minimum transmittance less than about 0.1% for the block polarization state.

9. A curved optical film comprising a plurality of polymeric layers, each location across at least 90% of a total area of the optical film having a reflectance greater than about 80% and a transmittance less than about 5% for normally incident light having a same predetermined wavelength and a same first polarization state, wherein for orthogonal first and second planes intersecting the optical film along respective first and second curves, the first and second curves intersecting each other at a center location of the optical film, the optical film has a thickness that decreases from the center location to a first edge location of the optical film along the first curve and that increases from the center location to a second edge location along the second curve.

10. The curved optical film of claim 9, wherein an intersection of the first and second planes define a line normal to the optical film at the center location.

11. The curved optical film of claim 9 being a reflective polarizer, wherein for normally incident light in a predetermined wavelength range comprising the predetermined wavelength, each location on the reflective polarizer has a maximum average reflectance greater than about 80% and a corresponding minimum average transmittance less than about 2% for the first polarization state, and a maximum average transmittance greater than about 80% for an orthogonal second polarization state.

12. The curved optical film of claim 11, wherein each location in a region of the reflective polarizer having an area of at least 80% of the total area of the reflective polarizer has a contrast ratio being the maximum average transmittance divided by the minimum average transmittance of at least 500.

13. The curved optical film of claim 11, wherein each location in a region of the reflective polarizer having an area of at least 80% of the total area of the reflective polarizer has a contrast ratio being the maximum average transmittance divided by the minimum average transmittance of at least 1000.

14. The curved optical film of claim 11, wherein for the predetermined wavelength, each location over at least 80% of the total area of the reflective polarizer has a transmittance less than about 0.2% for normally incident light having the first polarization state.

15. The curved optical film of claim 9, wherein a total curvature of the optical film is at least 0.25, the total curvature being a surface integral of a Gaussian curvature of the optical film over the total area of the optical film.

* * * * *